(12) United States Patent
Matsuura et al.

(10) Patent No.: US 6,332,003 B1
(45) Date of Patent: Dec. 18, 2001

(54) MOVING IMAGE COMPOSING SYSTEM

(75) Inventors: Shun Matsuura, Tokyo; Satoshi Kageyu, Fujisawa; Hitoshi Kato, Tokyo; Kayoko Asai, Tokyo; Hiroaki Yoshio, Tokyo; Tsuyoshi Kato, Tokyo; Yoshihiro Hayakawa, Yokohama; Kensuke Maruya, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/189,868

(22) Filed: Nov. 12, 1998

(30) Foreign Application Priority Data

Nov. 11, 1997 (JP) .................................................. 9-308387
Oct. 28, 1998 (JP) ................................................. 10-321375

(51) Int. Cl.[7] ............................................................ H04N 7/12
(52) U.S. Cl. ................................. 375/240.23; 375/240.26
(58) Field of Search ........................ 375/240.23, 240.24, 375/240.26, 240.29, 240.16, 240.1; 348/420.1, 425.1, 425.3, 575, 580–581; 382/245–246, 276, 284

(56) References Cited

U.S. PATENT DOCUMENTS 5,701,160 * 12/1997 Kimura et al. ........................ 348/413
5,852,469 * 12/1998 Nagai et al. .......................... 348/384
5,883,375 * 3/1999 Narita et al. .......................... 382/232
6,014,095 * 1/2000 Yokoyama .............................. 341/67

FOREIGN PATENT DOCUMENTS 7-298263    11/1995   (JP) ................................. H04N/7/32

* cited by examiner

Primary Examiner—Vu Le
(74) Attorney, Agent, or Firm—Lowe Hauptman Gilman & Berner, LLP

(57) ABSTRACT

A moving image composing system for displaying reduced and encoded images at arbitrary positions on a multi-image raster. The moving image composing system comprises a moving image reducing unit for reducing a moving image inputted, a moving image encoding unit for encoding the reduced moving image to produce an encoded moving image, an accumulating unit for storing and accumulating the encoded image, and a moving image composing unit for combining more-than-one encoded moving images accumulated to produce a multi-image combined moving image. The moving image encoding unit performs the encoding processing to facilitate the change of positional information the reduced moving image has, in consideration with the case that the change of the position information occurs due to the disposition of the reduced moving image at its combination. When there is a need to change the positional information of the reduced moving image due to the combination processing, the moving image composing unit changes the positional information to positional information required for the combination processing.

36 Claims, 58 Drawing Sheets

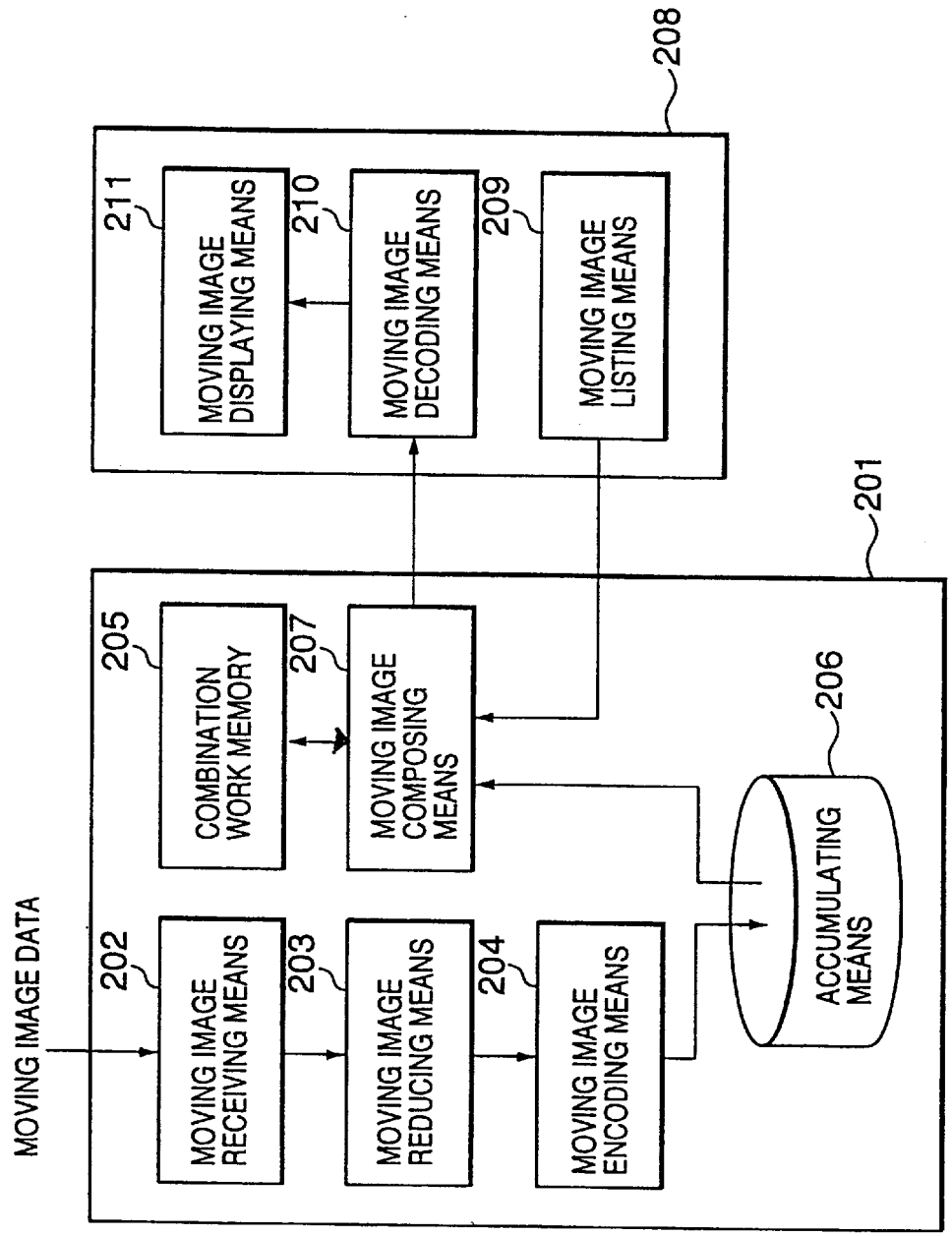

Fig.9

```
FOR (y=1; y<=Y; y++) {
   FOR (n=1; n<=N; n++) {
      FOR (x=1; x<=X; x++) {
         PROCESSING IN STEP 804
         PROCESSING IN STEP 805
      }
   }
}
```

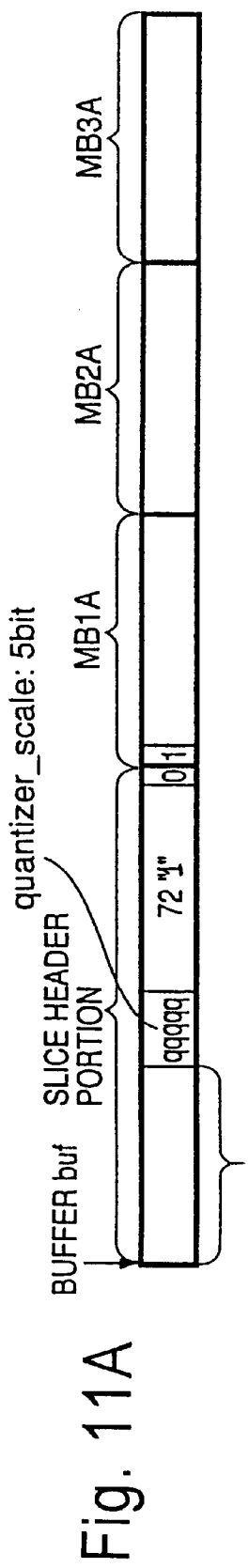
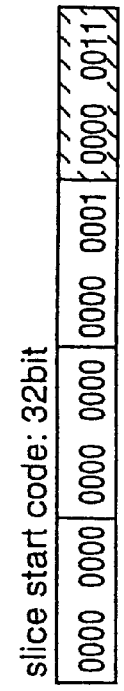
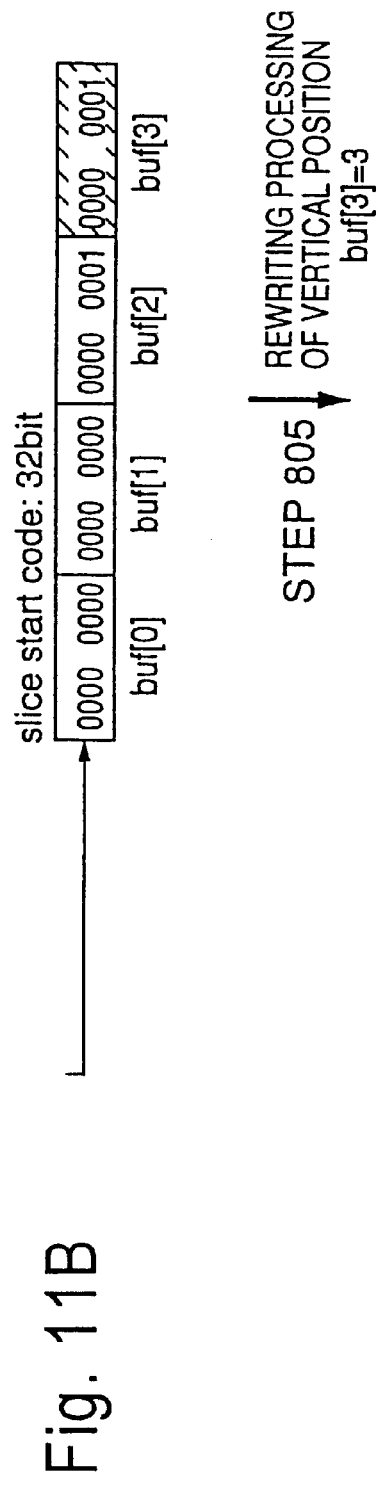
Fig. 11A
Fig. 11B
Fig. 11C

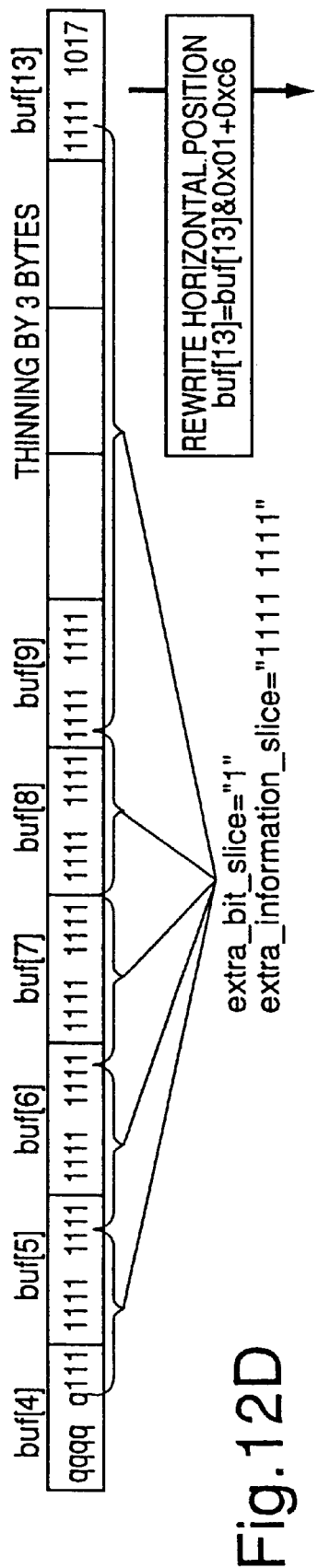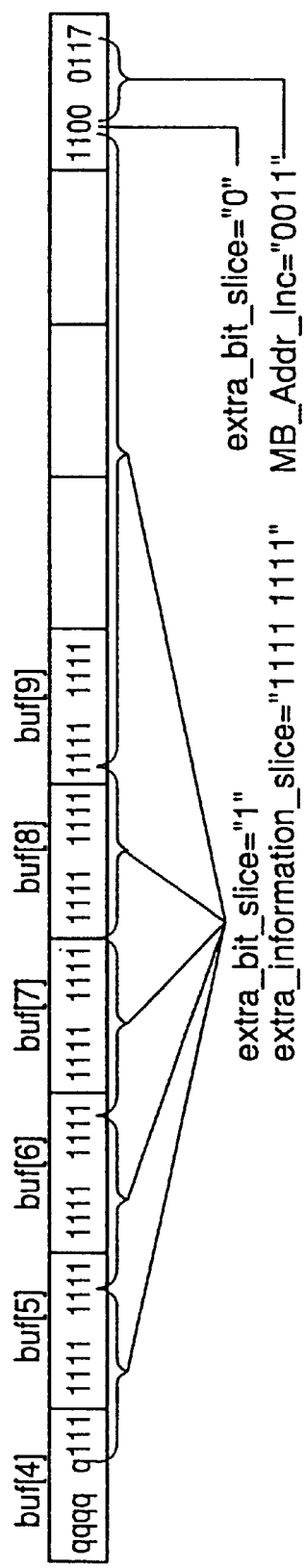

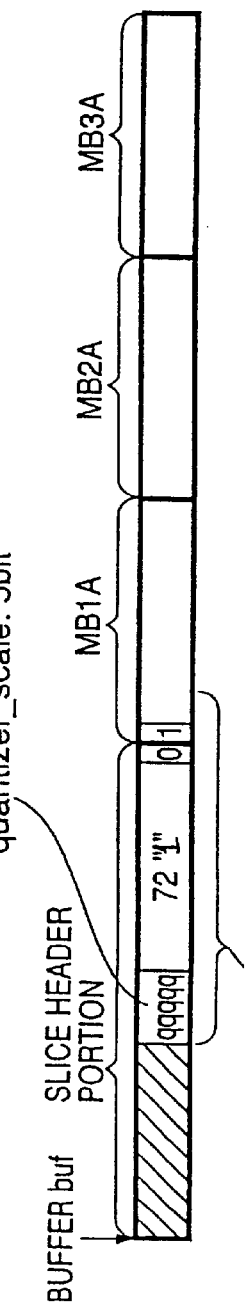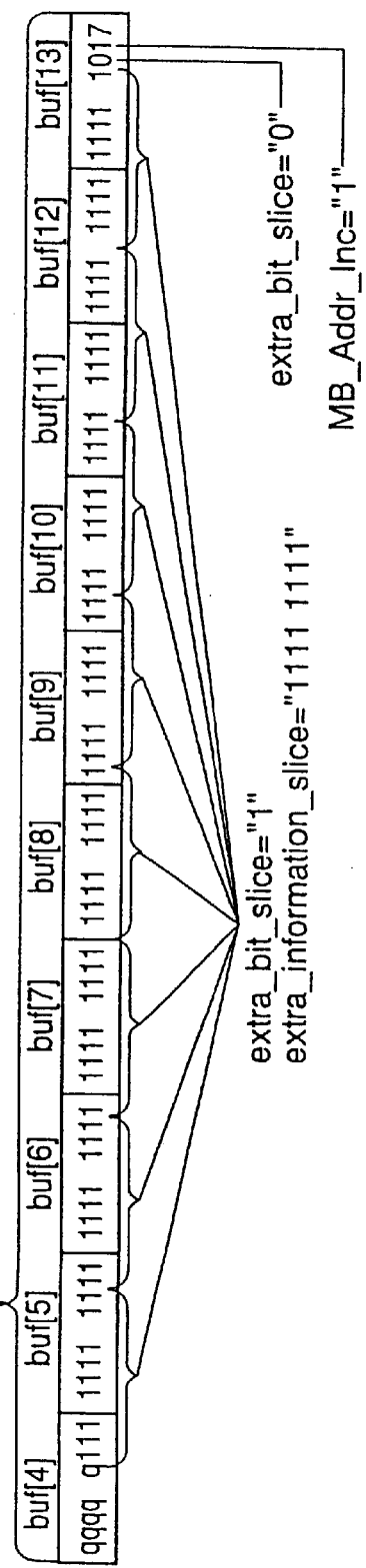
Fig. 13A
Fig. 13B

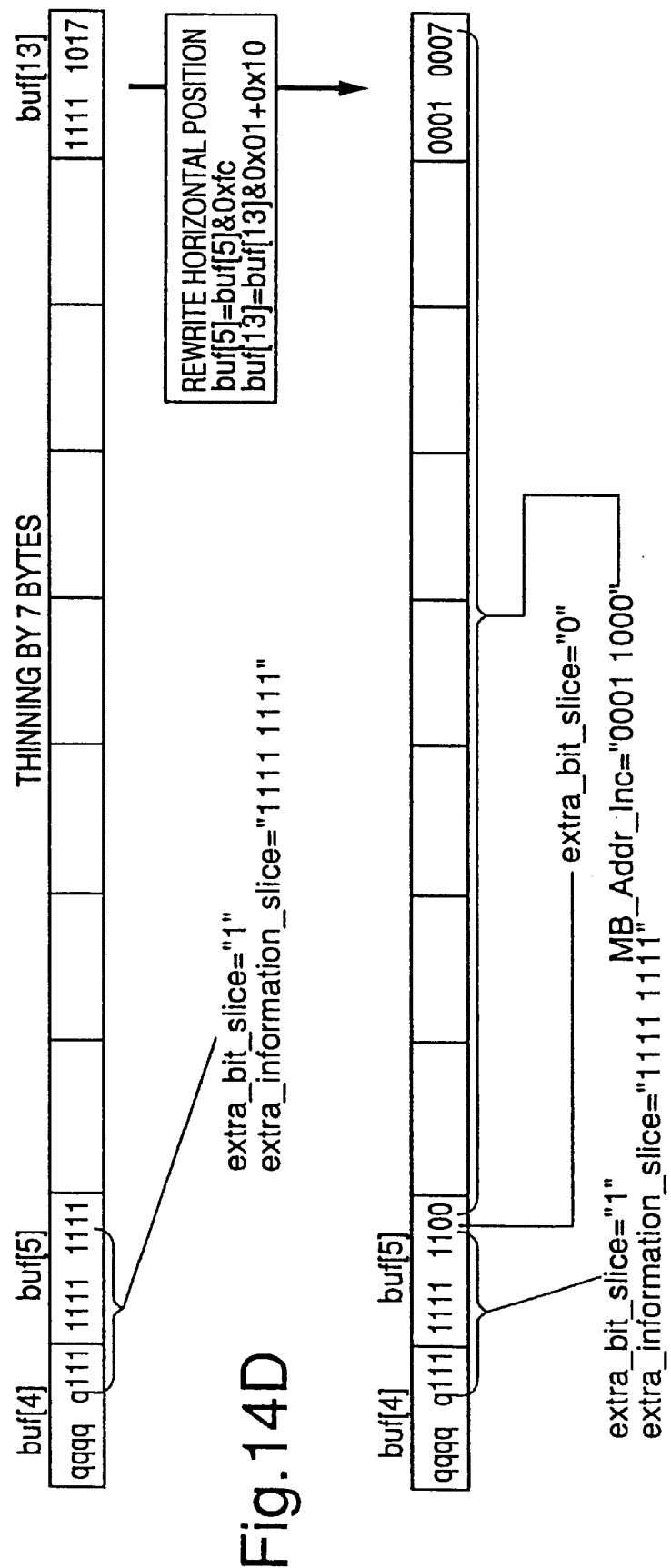

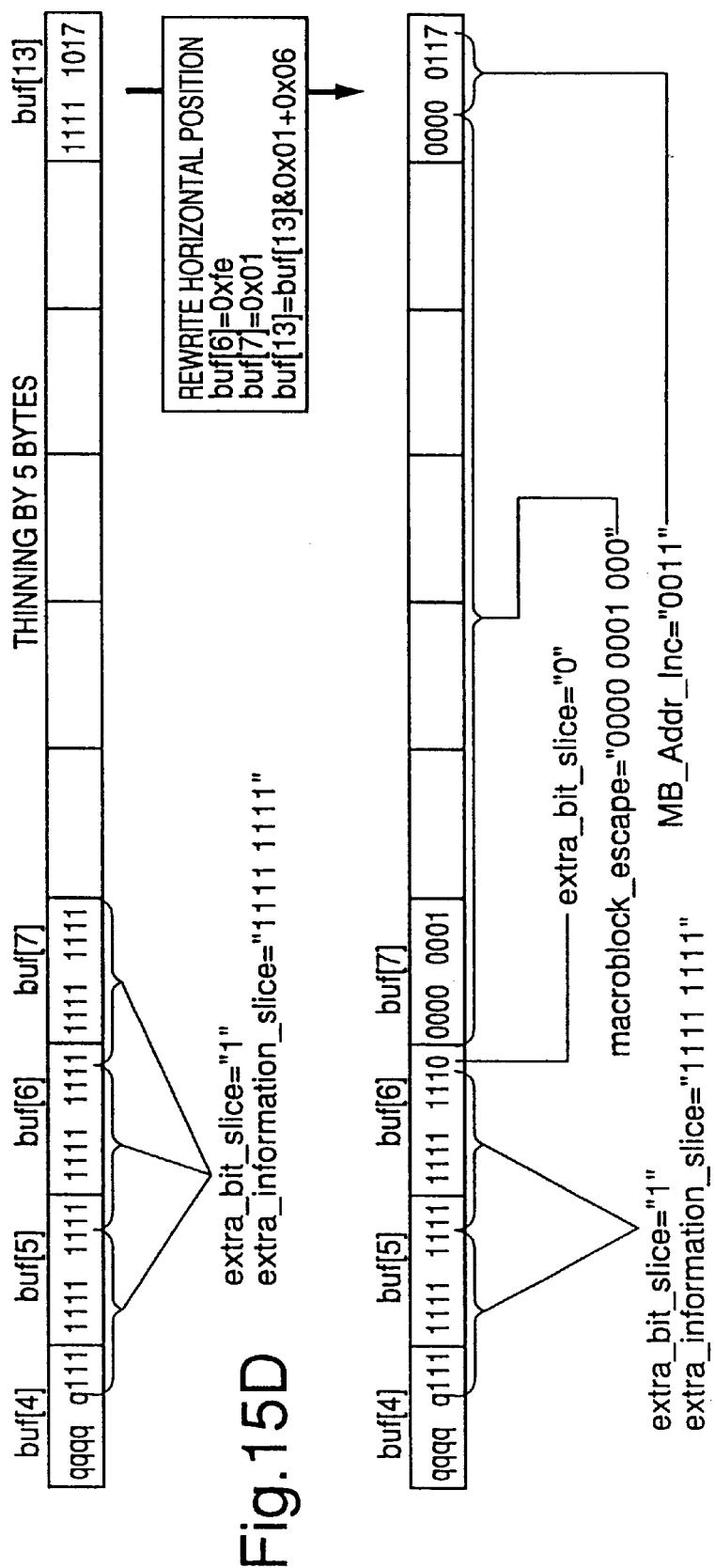

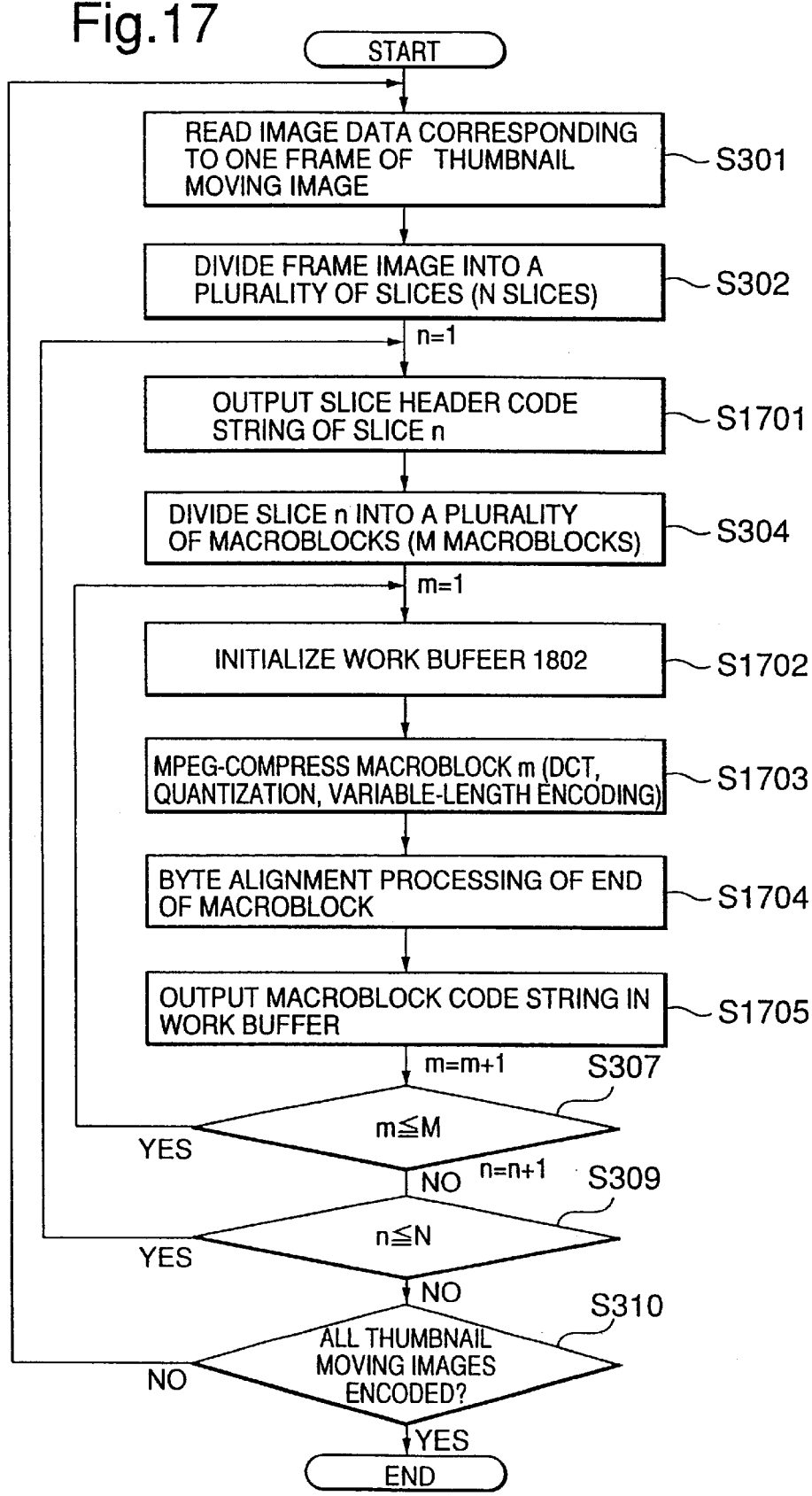

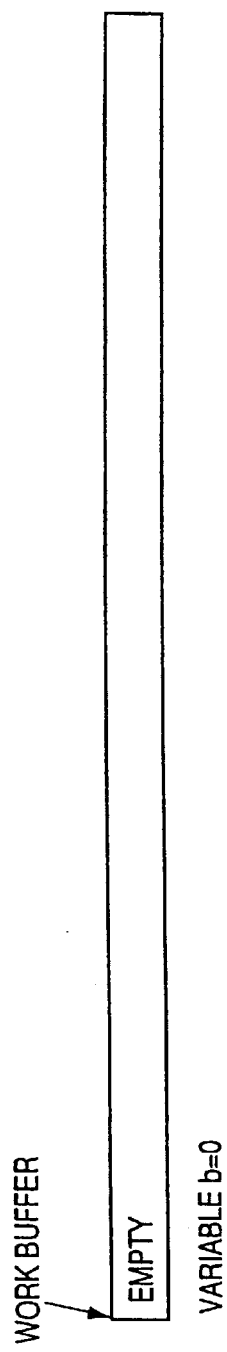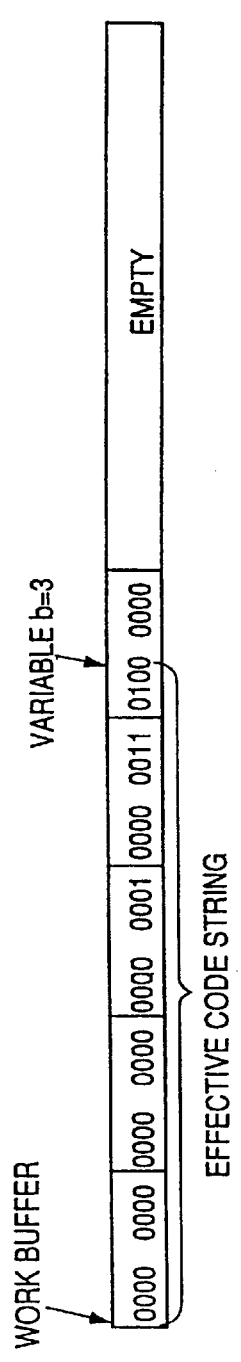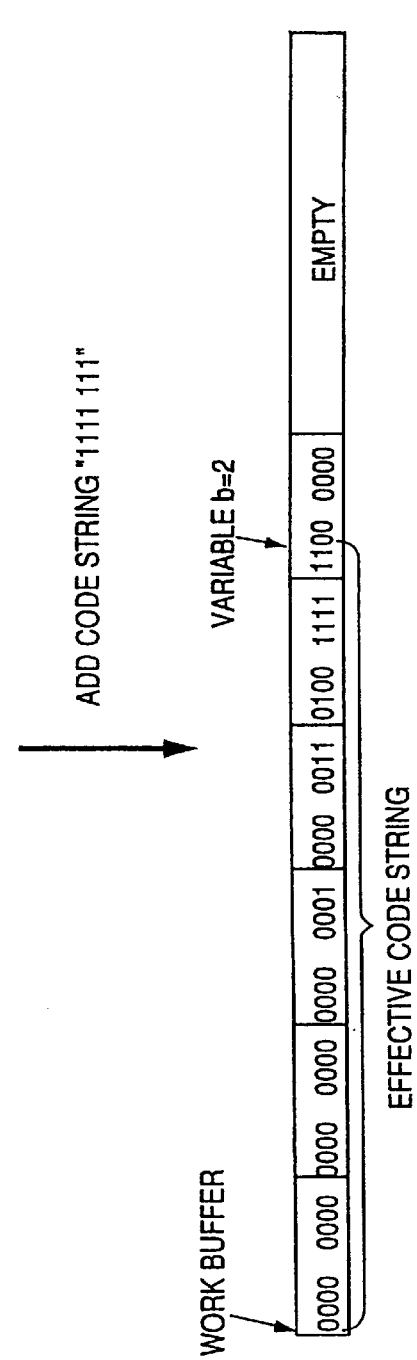

Fig.21

| VALUE OF VARIABLE b | NUMBER OF macroblock_stuffing TO BE INSERTED |
|---|---|
| 1 | 5 |
| 2 | 2 |
| 3 | 7 |
| 4 | 4 |
| 5 | 1 |
| 6 | 6 |
| 7 | 3 |

Fig.23

```
for (y=1; y<=Y; y++) {
    for (n=1; n<=N; n++) {
        for (x=1; x<=X; x++) {
            for (m=1; m<=M; m++) {
                PROCESSING IN STEP 2202
                PROCESSING IN STEP 2203
            }
        }
    }
}
```

```
for (y=1; y<=Y; y++) {
    for (x=1; x<=X; x++) {
        if (T[x,y]=='N')        /* PROCESSING IN STEP 2602
            ;
        else{
            if (T[x,y]=='S')    /* PROCESSING IN STEP 2603
                PROCESSING IN STEP 2604
            else{
                PROCESSING IN STEP 2605
                PROCESSING IN STEP 805
            }
        }
    }
}
```

Fig.33

| MOVING IMAGE HORIZONTAL SIZE | | | |
|---|---|---|---|
| MOVING IMAGE VERTICAL SIZE | | | |
| NUMBER OF IMAGES | | | |
| IDENTIFIER ID OF IMAGE 1 | POSITIONAL INFORMATION ON IMAGE 1 | HORIZONTAL SIZE OF IMAGE 1 | VERTICAL SIZE OF IMAGE 1 |
| IDENTIFIER ID OF IMAGE 2 | POSITIONAL INFORMATION ON IMAGE 2 | HORIZONTAL SIZE OF IMAGE 2 | VERTICAL SIZE OF IMAGE 2 |
| | | | |

Fig.34

| 7 | | | |
|---|---|---|---|
| 6 | | | |
| 6 | | | |
| A | (1, 1) | 5 | 4 |
| B | (6, 1) | 2 | 3 |
| | (6, 4) | 2 | 1 |
| C | (1, 5) | 2 | 2 |
| D | (3, 5) | 2 | 2 |
| E | (5, 5) | 3 | 2 |

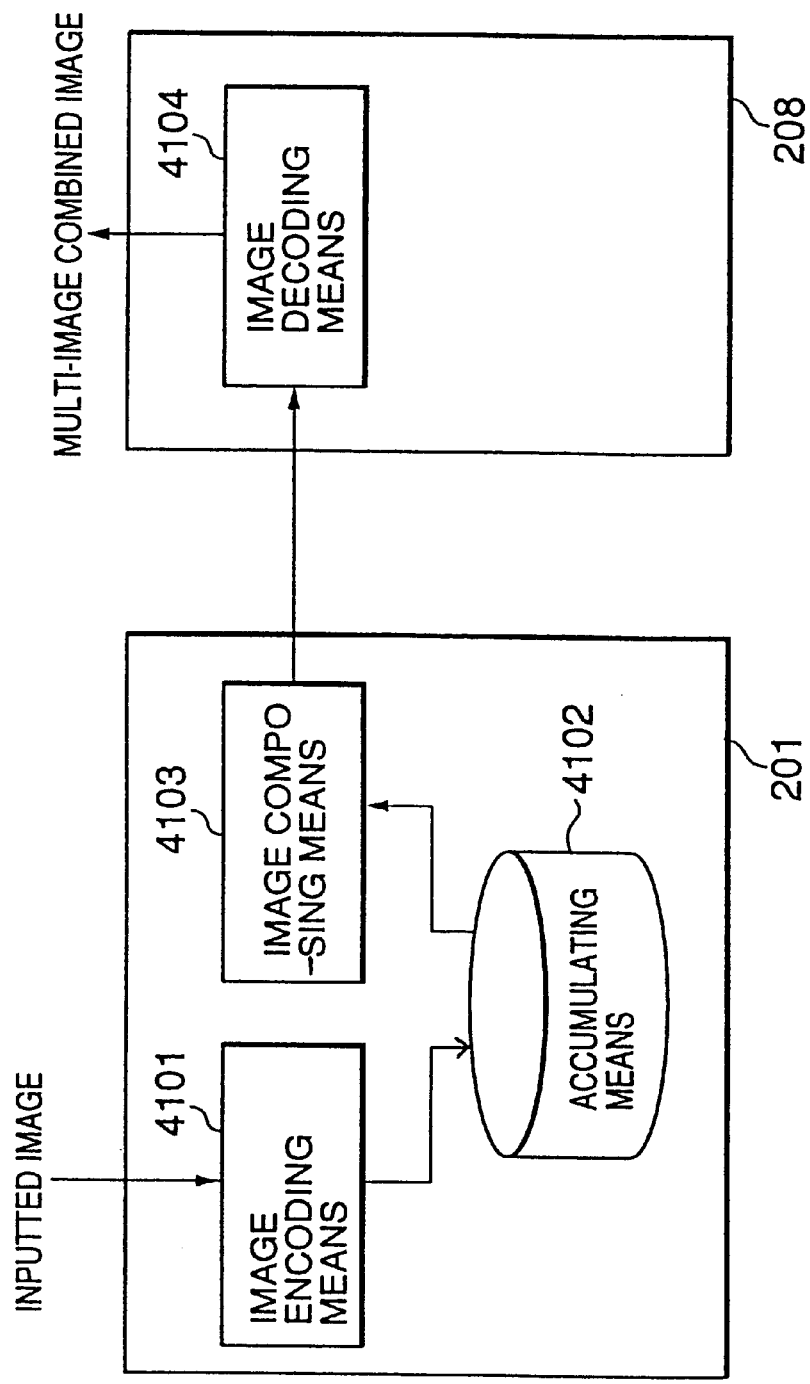

MULTI-IMAGE COMBINED
MOVING IMAGE
(2 IN VERTICAL DIRECTION
AND 2 IN HORIZONTAL DIRECTION)

EACH OF SLICE CODE STRINGS CORRESPONDS
TO FIRST FRAME OF EACH OF ENCODED IMAGES

EACH OF SLICE CODE STRINGS CORRESPONDS
TO SECOND FRAME OF EACH OF ENCODED IMAGES

EACH OF SLICE CODE STRINGS CORRESPONDS
TO THIRD FRAME OF EACH OF ENCODED IMAGES

Fig.44
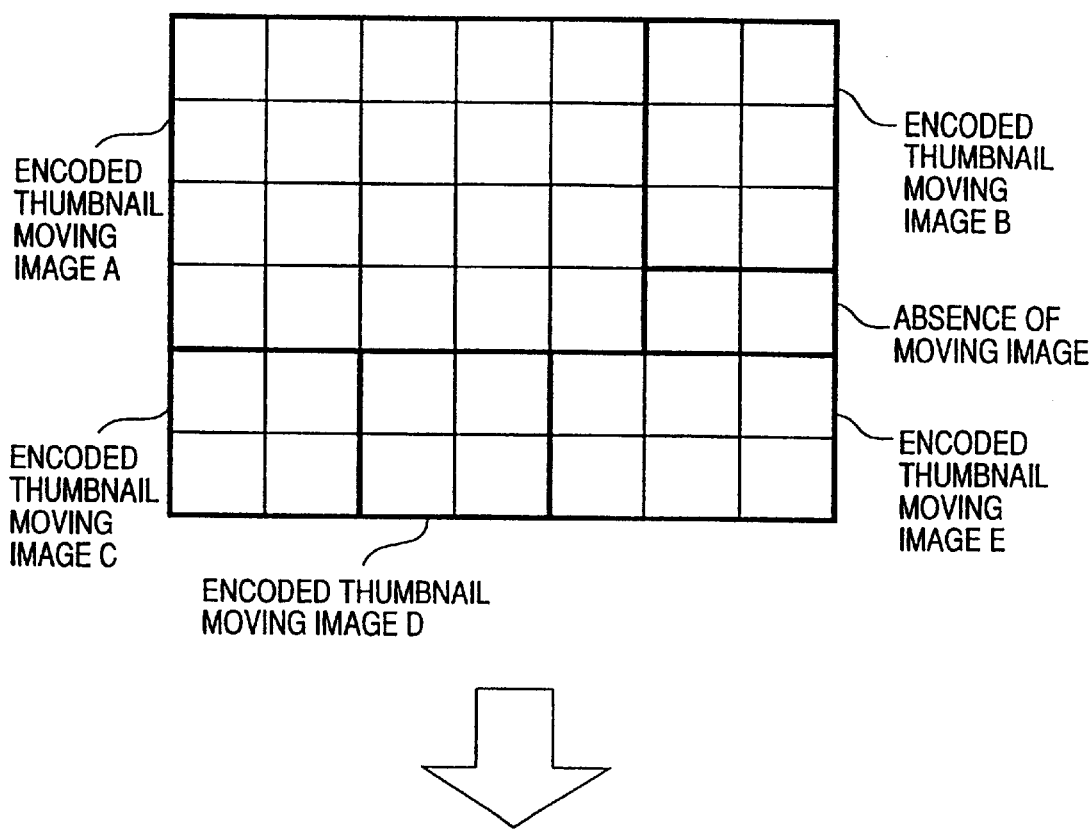
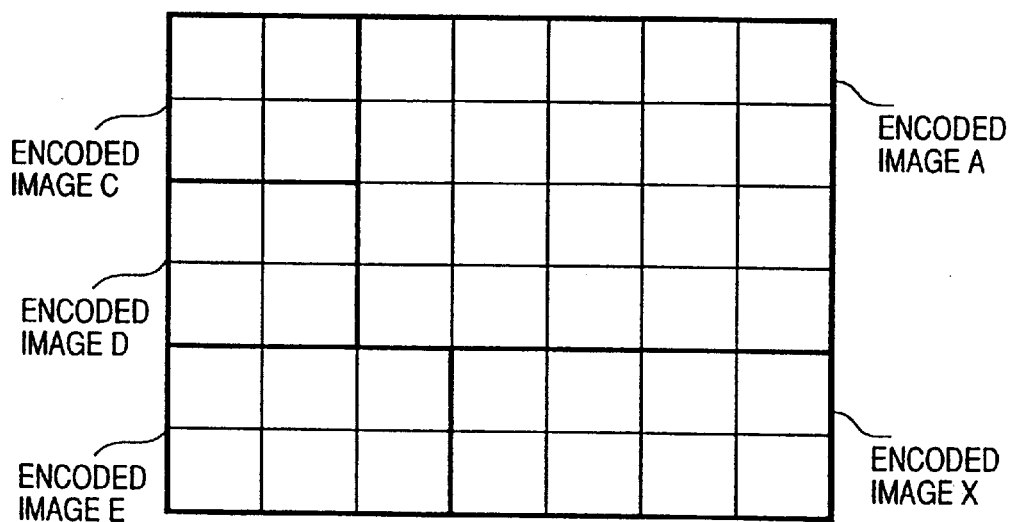

ENCODED IMAGE : V[x, y]
FRAME NUMBER : f
SLICE NUMBER : n

Fig.52A

```
slice ( ) {
    slice_start_code                                32
    quantizer_scale                                  5
    while(nextbits( )=="1" ){
        extra_bit_slice                          1="1"
        extra_information_slice                      8
    }
    extra_bit_slice                              1="0"
    do {
        macroblock( )
    } while( nextbits( ):="000 0000 0000 0000 0000 0000")
    next_start_code( )
}
```

Fig.52B

```
macroblock ( ){
    while( nextbits( )=="0000 0001 111")
        macroblock_stuffing                         11
    while(nextbits ( )=="0000 0001 000")
        macroblock_escape                           11
    macroblock_address_increment                  1-11
    macroblock_type                                1-6
    if (macroblock_quant)
        quantizer_scale                              5
    .
    : OMITTED
    .
    for (i=0; i<6; i++)
        block (i)
    if (picture_coding_type==4)
        end_of_macroblock                        1="1"
}
```

Fig.52C

```
block ( i ) {
    if (pattarn_code (i)  ){
        if (macro_block_intra){
            if (1<4) {
                dct_dc_size_luminance              2-7
                if (dc_size_luminance1=0)
                    dct_dc_differential            1-8
            }
            else {
                dct_dc_size_chrominance            2-8
                if (dc_size_chrominance1=0)
                    dct_dc_differential            1-8
            }
        }
        else
            dct_coeff_first                       2-28
        if (picture_coding_type1=4) {
            while( nextbits( )1="10")
                dct_coeff_next                    3-28
            end_of_block                             2
        }
    }
}
```

Fig.52D

```
next_start_code ( ) {
    if (:bytealigned ( ) )
        zero_bit                                 1="0"
    while(nextbits( )1="0000 0000 0000 0000 0000 0001")
        zero_byte                      8="0000 0000"
```

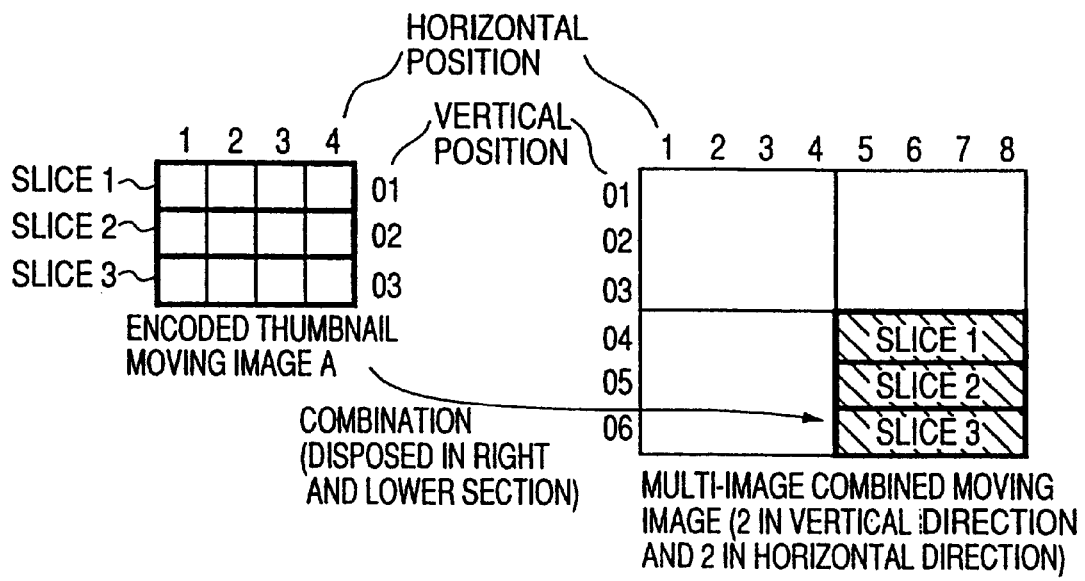

Fig.54A
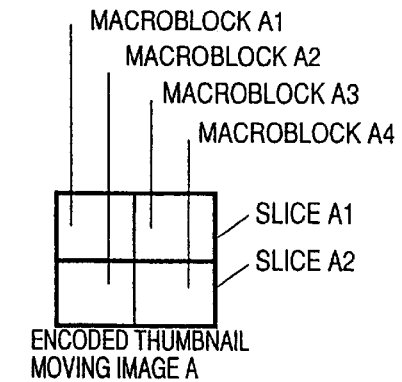
Fig. 54(A-1)
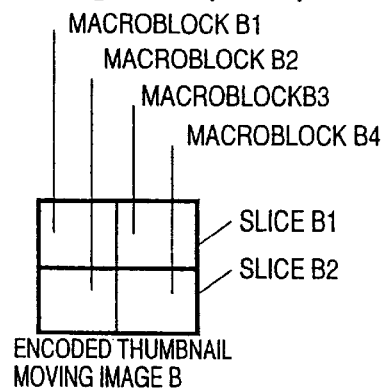
Fig.54B
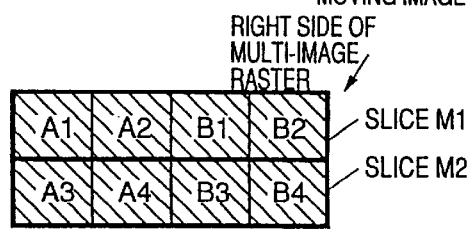
Fig.54C
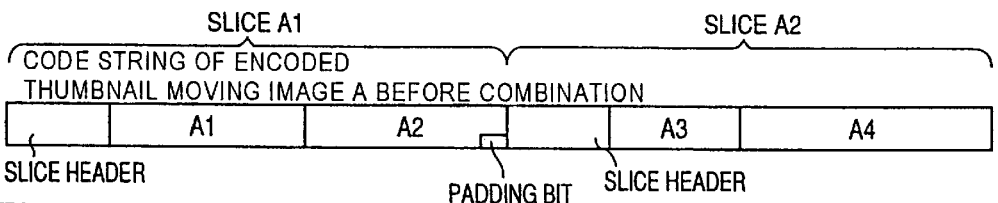
Fig. 54D
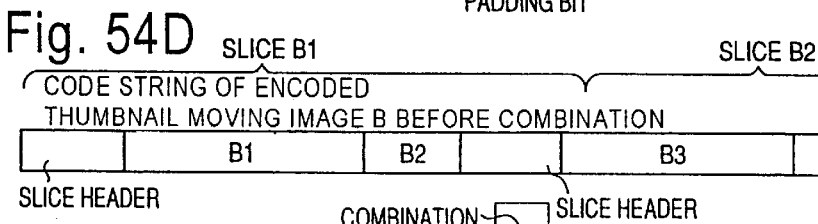
Fig. 54E
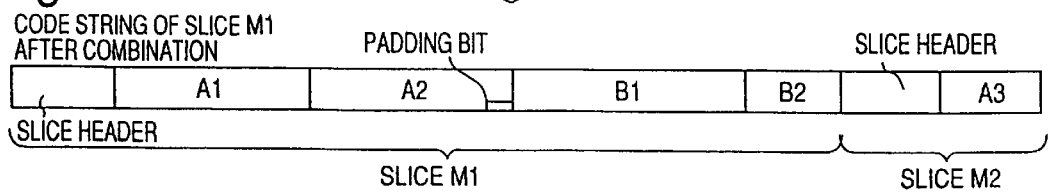

MOVING IMAGE COMPOSING SYSTEM

BACKGROUND OF THE INVENTION

1. Field of the Invention

The present invention relates to a composing system or apparatus, in the case of conducting simultaneous multi-image reproduction of a plurality of moving image (picture) data for one image or picture, using a method of encoding (coding) each of the moving image data and a composing method of producing a multi-image combined moving image corresponding to an arbitrary combination of the moving image data.

2. Description of the Prior Art

As exemplified by Japanese Unexamined Patent Publication No. 7-298263, there has been known a method whereby a synthetic code string obtained in a manner that a frame of a moving image is divided into a plurality of areas and code strings each produced by the encoding of each of the areas are connected to each other becomes identical in syntax with a code string created by encoding the image without the division into the areas.

FIG. 51 is a block diagram showing an arrangement accomplishing this method, and an operation thereof will be described hereinbelow with reference to this illustration.

First of all, a moving image inputted is divided through an image divider 61 into a plurality of areas in units of frame. At this time, the image divider 61 determines a division method on the basis of a image division control signal from a division control unit 75. In this instance, one frame is vertically divided into three areas, and divided-image signals are respectively taken as 77, 78 and 79 in the order from the left-hand area of the original image, and the divided-image signals 77, 78 and 79 are respectively introduced into encoders 62, 63 and 64. Each of the encoders 62 to 64 receives a size of the divided frame and an encoding condition from the division control unit 75 to encode the inputted divided-image signal, and then outputs as a code string 80, 81 or 82 to a code string synthesizer 74. Subsequently, the division control unit 75 outputs a code string synthesis signal which informs the code string synthesizer 74 of the frame division method according to the instruction given to the image divider 61, and in accordance with this code string synthesis signal, the code string synthesizer 74 connects the code strings from the decoders 62 to 64 in a specific sequence to produce the same syntax as that in the case of no frame division, thus finally outputting a synthetic or combined code string.

In the foregoing Japanese Unexamined Patent Publication No. 7-298263, in accordance with the instruction from a division control unit, an image signal originally corresponding to one image is divided into division image signals corresponding to a plurality of areas which in turn, are separately encoded in a plurality of encoders according to MPEG (Moving Picture Experts Group), and the code strings outputted from the plurality of encoders are arranged to produce the original syntax.

At this time, each of the encoders receives the size of the divided frame and the encoding condition to know the image signal, i.e., the area of the original image the encoder itself encodes, in other words, the image area in which the code string outputted by the encoder itself is finally displayed, before the MPEG encoding processing.

However, in the case of displaying reduced moving images (each of which will be referred hereinafter to as a thumbnail moving image) in arbitrary image areas of a multi-image raster (entire frame for multiple images), the displaying position is unknowable at the time that the MPEG encoding processing is conducted of each thumbnail moving image.

For this reason, at the time of combining or integrating multiple images, an operation to designate a displaying position is needed for each of thumbnail moving images encoded (which will be referred hereinafter to as an encoded thumbnail moving image).

Meanwhile, for example, in the MPEG standard (for reference, a portion of a syntax of a video stream in MPEG is shown in FIGS. 52A to 52D), a horizontal position at which a slice is displayed when decoded and reproduced is expressed by a variable-length code bit macroblock__address__increment (which will be referred hereinafter to as MB__Addr__Inc) of a leading macroblock in that slice. If making a change of the value of an MB__Addr__Inc section for the purpose of the disposition of the encoded thumbnail moving image at an arbitrary position, the number of bits of the MB__Addr__Inc section forming a variable-length code varies. Consequently, (in the case of merely applying to MPEG as the processing to designate a displaying position for the encoded thumbnail moving image,) at the combination or integration of moving images in a multi-image raster, a bit shift operation takes place by the bit number variation with respect to all the code strings following the MB__Addr__Inc section, which causes a large amount of calculation.

FIGS. 53A to 53C are illustrations available for describing this event. In the case that an encoded thumbnail moving image is disposed at a right and lower section of a multi-image raster comprising two divisions (two columns) in the vertical direction and two divisions (two rows) in the horizontal direction as shown in FIG. 53A, the code string of the encoded thumbnail moving image A varies as shown in FIG. 53B. When viewing the entire moving image, the vertical position of a slice is specified with the last 1 byte in a slice__start__code section.

On the other hand, the horizontal position of the slice is designated with the MB__Addr__Inc as mentioned above. Although the horizontal position of the slice varies from 1 to 5 due to the combination, if representing as a variable-length code, MB__Addr__Inc=1 signifies "1" being 1 bit, and if expressing as a variable-length code, MB__Addr__Inc=5 signifies "0010" being 4 bits, and hence, after the combination or composition, the bit string extends by 3 bit extra. Accordingly, as shown in FIGS. 53B and 53C, the code strings succeeding MB__Addr__Inc after the combination are located in a state of being shifted by the additionally increased 3 bits. Usually, computers or storage units for common use in the computers gain access in units of bytes. For this reason, as shown in FIG. 53C, all the code strings succeeding MB__Addr__Inc of the leading macroblock require the bit operation.

Furthermore, in the same MPEG standard, there is no guarantee for the code strings of the adjacent macroblocks to be separated (byte-aligned) in units of bytes, while as a solitary instance, the byte alignment is accomplished by next__start__code ( ) in FIGS. 52A to 52D after the code string of the last macroblock of a group of macroblocks constituting a slice. When the macroblocks arranged in the aiming order for the location of an encoded thumbnail moving image at an arbitrary position, the inter-macroblock connection crossing a byte border takes place, so that difficulty is experienced in decoding the code strings into a correct image.

Still further, in terms of the code string in the last macroblock of a slice, the byte alignment is made with padding bits as mentioned above. In the case that another macroblock code string is connected succeedingly to the macroblock code string which contains added padding bits, a decoder decodes code strings on the assumption that there exists no padding bit in the code strings of the adjacent macroblocks except that the code strings form the last of the slice. Thus, the decoder can not achieve the decoding into a correct image by the padding bits in the code strings.

FIGS. 54A to 54C are illustrations available for explaining this situation. In this instance, encoded thumbnail moving images A and B shown in FIG. 54A are combined into a multi-image raster comprising one divisions (one row) in the vertical direction and two divisions (two columns) in the horizontal direction. In the case that this combination processing is realized in a manner that macroblocks organizing each of the encoded thumbnail moving images A and B are disposed at arbitrary positions within the multi-image raster, the disposition of the respective macroblocks within the multi-image raster is as shown in FIG. 54B, and as shown in the lowest portion of FIG. 54C, the arrangement of the code strings thereof is such that the code string corresponding to the slice header section of the slice M1 first appears, and then, is followed by the succeeding macroblock code strings in the order of the macroblocks A1, A2, B1 and B2.

At this time, assuming that the last (end) macroblock A2 of the slice A1 is byte-aligned by padding bits, the code string of the slice M1 goes into a state in which a padding bit string is interposed in between the macroblocks A2 and B1. The result is that difficulty is encountered in correctly decoding an image.

SUMMARY OF THE INVENTION

The present invention is for the purpose of eliminating the above-mentioned problems in a system in which thumbnail. moving images encoded according to various standards are displayed at arbitrary position on a multi-image raster, and it is therefore an object of the present invention to provide a moving-image composing system which is capable of, for example, in the MPEG standard, rewriting or changing a variable-length code bit portion representative of a displaying position of a slice to an arbitrary value at a high speed, combining multiple images by only arranging macroblocks in a raster scanning sequence, simultaneously displaying thumbnail moving images with different sizes on one multi-image raster, and dividing the multi-image raster into encoded thumbnail moving images and then reconstructing a multi-image raster in an arbitrary sequence.

Accordingly, in this invention, in consideration of the case that the location of reduced and encoded images before the combination within the composed or combined image are undecided, the encoding is done to facilitate the change of the positional information thereon, and if the change of the positional information thereof is needed at the combination, that change is facilitated, whereupon various combinations of images become feasible.

Furthermore, in the case of the MPEG standard, in the first place, in preparation for the variation in the number of bits of MB_Addr_Inc resulting from the change of the horizontal coordinate of a slice, a code string (supplementary code string) is preliminarily outputted to make up for the bit shortage so that a moving image combining means completes the rewriting processing of MB_Addr_Inc (horizontal position information on a slice) comprising a variable-length code bit(s) for the multi-image combination in units of slices by performing simple calculations several times, thus enabling the speed-up of the production of a multi-image combined moving image.

Still further, a moving image encoding means is provided which outputs 8 sets or pairs of extra_bit_slice and extra_information_slice as the aforesaid supplementary code string, which allows a moving image composing means to supply an arbitrary number of wanted or lacking bits from the supplementary code string and further to produce a macroblock_escape code string. This permits the rewriting of a variable-length code bit portion indicative of the displaying position of a slice to an arbitrary value.

In the second place, the moving image composing means prevents the head and end of a macroblock code string from crossing a byte border and previously produces a macroblock code string undergoing such processing as to make a correct code string as an MPEG video sequence, whereupon the moving image composing means can produce a code string of a desired multi-image combined moving image by only connecting macroblock code strings in the raster scanning order, which contributes to the speed-up of the multi-image combined moving image production.

In the third place, the moving image composing means is capable of combining encoded thumbnail moving images with different sizes in units of slices, and consequently, the moving image composing system can offer a code string of a multi-image combined moving image in which encoded thumbnail moving images with different sizes mixedly exist.

In the fourth place, an MPEG code string already constructed as a multi-image combined moving image is separated into a plurality of original encoded thumbnail moving images, and the encoded thumbnail moving images separated are again disposed at arbitrary positions, so that a list of combinations and orders of programs desired by viewers can be reconstructed from multi-image combined code strings such as a list of multi-image programs predetermined in a satellite broadcasting or the like.

In the fifth place, an image composing means rewrites an information value on an encoded image to output a multi-image combined image stream in which a code string of each of encoded images is a correct information value as an image encoding format and a code string sequence is a correct sequence as the image encoding format. Whereupon, even when the code length variation of information occurs due to the change of the information value defined with a variable-length code, the change of the information value is made possible without requiring a extremely large amount of processing such as a bit shift operation, which achieves the speed-up of the multi-image combined image stream.

Furthermore, at this time, since the code string sequence of the multi-image combined image produced by the image composing means is correct as the MPEG format, the decoding, the reproduction and the displaying become feasible through the use of an image decoding means for decoding an MPEG code string, or an image decoding unit (generally called MPEG decoder).

In the sixth place, the moving image composing system has a construction in which a delay means does not exist in a process, and the image composing means receives at least one encoded image produced without a single passage through the delay means. Whereupon, a multi-image combined image such as a combination of a real-time live picture such as an image coming as an inputted image from a camera and an accumulated image can be displayed, and the delay reproduction of a live picture portion by the delay means is possible while the reproduction and display of a multi-image combined image undergoing the adjustment of the delay time due to the frame thinning processing are feasible.

In the seventh place, a layout table changing means is provided to change the value of multi-image layout information within a layout table at an arbitrary timing, and the image composing means refers to the value of the multi-image layout information after the change, thereby allowing the dynamic change of the image layout of a multi-image combined image stream to be outputted. Thus, it is possible to dynamically change the disposition of areas of the multi-image combined image, the size of each of the areas, the encoded image to be displayed in each of the areas, and others.

In the eighth place, an image composing means is provided which produces a multi-image combined image stream when receiving at least one encoded image produced by the encoding processing based upon an image encoding format, and when there is a need to change an information value defined as a variable-length code in the image encoding format, the image composing means uses an extended code string portion defined as a code string not affecting the images in the image encoding format to output the extended code string into the multi-image combined image stream, thereby changing that information value in the encoded image to a different value. Whereupon, irrespective of the variation of the information code length occurring due to the change of the information value defined as a variable-length code, the change of the information value becomes feasible without conducting an extremely large amount of processing such as the bit shift operation, which contributes to the speed-up of the multi-image combined image producing processing.

In addition, since there is no need for the image encoding means which produces an encoded image to be inputted to this image composing means to conduct particular processing for realizing the aforesaid speed-up, it is possible to employ a common image encoding means which performs the encoding processing on the basis of the image encoding format. Besides, it is possible to accomplish the speed-up of the combining processing among common encoded images according to the image encoding format.

BRIEF DESCRIPTION OF THE DRAWINGS

The object and features of the present invention will become more readily apparent from the following detailed description of the preferred embodiments taken in conjunction with the accompanying drawings in which:

FIG. 9 is an illustration of an example of loop processing in the interior of the moving image composing means according to the first embodiment of this invention;

FIG. 11 consisting of FIGS. 11A to 11C, is an illustration of an example of slice vertical position information rewriting processing in the first embodiment of this invention (vertical position=3);

FIG. 17 is an operational flow chart showing an operation of a moving image encoding means in the second embodiment of this invention;

FIG. 19 consisting of FIGS. 19A to 19C, is an illustration of an example of an operation of a work buffer in the second embodiment of this invention;

FIG. 21 is an illustration of the relationship between the number of insertion of macroblock_stuffing and the values of a variable b in the second embodiment of this invention;

FIG. 23 is an illustration of an example of loop processing in the interior of the moving image composing means according to the second embodiment of this invention;

FIG. 33 is an illustration of an example of a format of an image layout table in the fourth embodiment of this invention;

FIG. 34 is an illustration of an example of a multi-image combined moving image produced in response to a request a moving image listing means issues to the moving image composing means in the fourth embodiment of this invention;

FIG. 37 is a block diagram showing an construction of a moving image composing system according to a fifth embodiment of this invention;

FIG. 44 is an illustration of image structures of a multi-image combined image before and after the change of the contents of a layout table in the seventh embodiment of this invention;

FIGS. 52A to 52D are illustrations of a portion of a syntax of a video stream in MPEG;

FIGS. 53A to 53C are illustrations of an event occurring at the rewriting of slice horizontal position information; and FIGS. 54A to 54E are illustrations of an event taking place at the connection between macroblocks not undergoing byte alignment.

DETAILED DESCRIPTION OF PREFERRED EMBODIMENTS

Embodiments of the present invention will be described hereinbelow with reference to the drawings. This invention is not limited to these embodiments, but it is intended to cover a variety of embodiments, which do not constitute departures from the spirit and scope of the invention.

Figure 1:
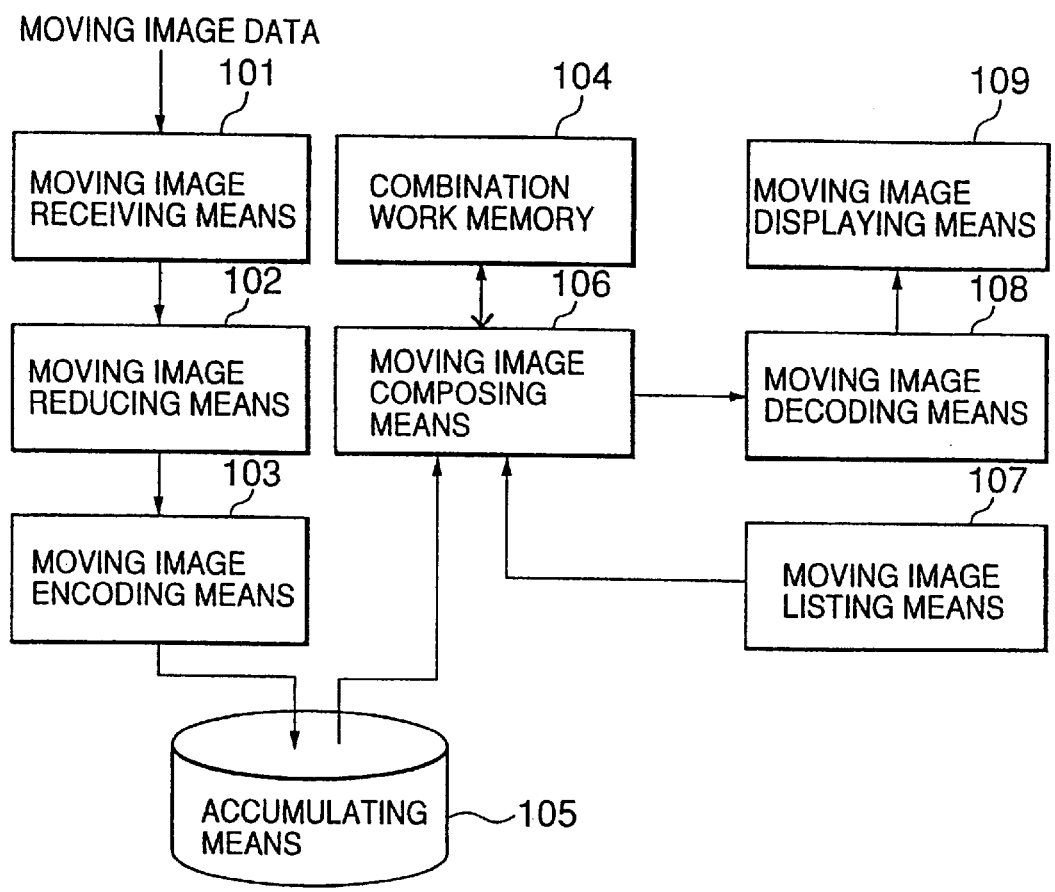
FIG. 1 is a schematic illustration of an arrangement of a moving image composing system according to the present invention.

Prior to describing the embodiment of this invention, a brief description will be made hereinbelow of an arrangement of a moving image composing system according to this invention taken as a whole. FIG. 1 is an illustration of a general construction of the moving image composing system of this invention. In FIG. 1, moving image data is inputted to a moving image receiving means 101, and then put in a moving image reducing means 102 for reducing a moving image to a given size, and further put in a moving image encoding means 103 for encoding a thumbnail moving image into an MPEG code to produce an encoded thumbnail moving image, with the encoded thumbnail moving images being stored and accumulated in an accumulating means 105. A moving image composing means 106 is for combining or integrating a plurality of encoded thumbnail moving image to produce a multi-image combined moving image code string, and is in connection with a combination work memory 104 and a moving image listing means 107. The combination work memory 104 is for temporarily storing a slice code string at the time of rewriting positional information, while the moving image listing means 107 is for drawing up a list of a combination and order of moving images constituting a multi-image raster, that is, for making a request to the moving image composing means 106 for the composition of a given multi-image combined moving image. The multi-image combined moving image composed by the moving image composing means 106 is decided in a moving image decoding means 108 and subsequently displayed on a moving image displaying means 109.

(First Embodiment)

Figure 39A:
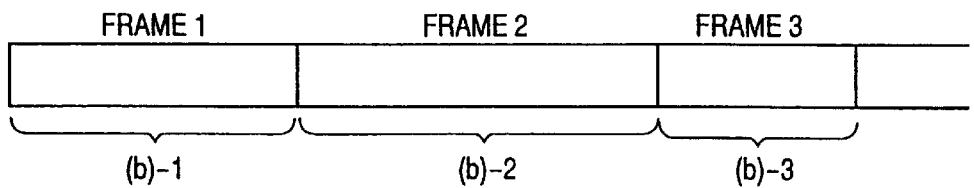
FIG. 39 consisting of FIGS. 39A and 39B-1 to 39B-3, is an illustration of a code string sequence of a multi-image combined image in the fifth embodiment of this invention.
Figures 1, 39B:
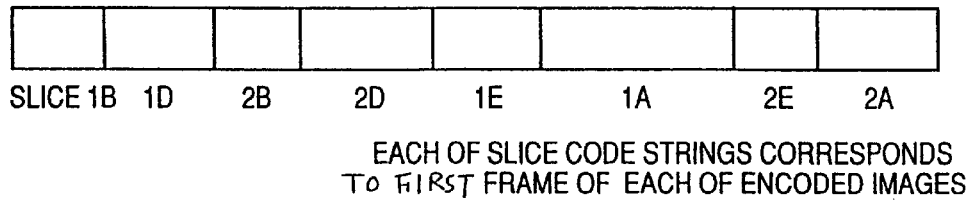
Figures 2, 39B:
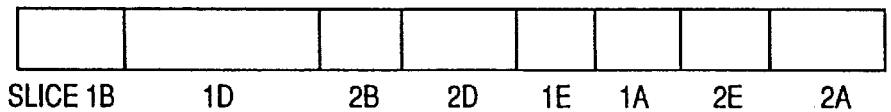
FIG. 2 is a block diagram showing a moving image composing system according to a first embodiment of this invention.
Figures 3, 39B:
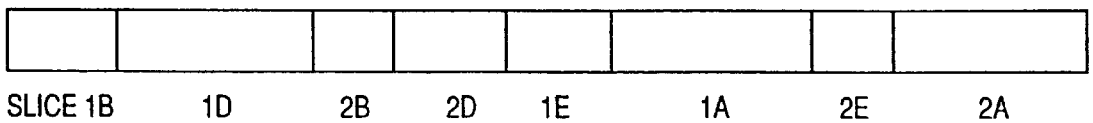

FIG. 2 is a block diagram showing a constructional feature of a moving image composing system according to a first embodiment of this invention.

As shown in FIG. 2, the moving image composing system according to the first embodiment is made up of a moving image composing server 201 for managing a plurality of encoded thumbnail moving images accumulated and for conducting the multi-image composing processing, and a reproduction terminal 208 for reproducing and displaying the multi-image combined moving image from the moving image composing server 201. The moving image composing server 201 comprises a moving image receiving means 202 for receiving moving images to be combined into a multi-image combined moving image, a moving image reducing means 203 for reducing the received moving images to a given or predetermined size to produce thumbnail moving images, a moving image encoding means for MPEG-encoding the thumbnail moving images to create encoded thumbnail moving images, a composition work memory 205 for temporarily storing slice code strings at rewriting of positional information on the encoded thumbnail moving images, an accumulating means 206 for storing and accumulating the encoded thumbnail moving images, and a moving image composing means 207 for combining a plurality of encoded thumbnail moving images to produce a multi-image combined moving image code string. The reproduction terminal 208 comprises a moving image listing means 209 for drawing up a list or table of a combination and order of moving images organizing a multi-image combined moving image, a moving image decoding means 210 for decoding a composed multi-image combined moving image, and a moving image displaying means 211 for displaying the decoded moving image.

For the moving image composing server 201 and the reproduction terminal 208, a common operating system operates, which is, for example, a computer such as a personal computer and a work station, while each of the moving image receiving means 202, the moving image reducing means 203, the moving image encoding means 204, the moving image composing means 207, the moving image listing means 209, the moving image decoding means 210 and the moving image displaying means 211 is constructed as a program or dedicated hardware operable under the control of a general-purpose or dedicated operating system within the computer.

Secondly, a description will be given hereinbelow of a method of encoding moving images and a method of combining a plurality of moving images.

The description will begins with the moving image data encoding processing.

Moving image data to be combined into a multi-image combined moving image is previously taken through the moving image receiving means 202 into the interior of the moving image composing server 201, and then, is reduced to a predetermined size by means of the moving image reducing means 203 to be converted into a thumbnail moving image. Subsequently, this thumbnail moving image is MPEG-encoded in the moving image encoding means 204 in the form allowing the multi-image combination, and is accumulated in the accumulating means 206 as an encoded thumbnail moving image to be used for the multi-image combination.

Figure 3:
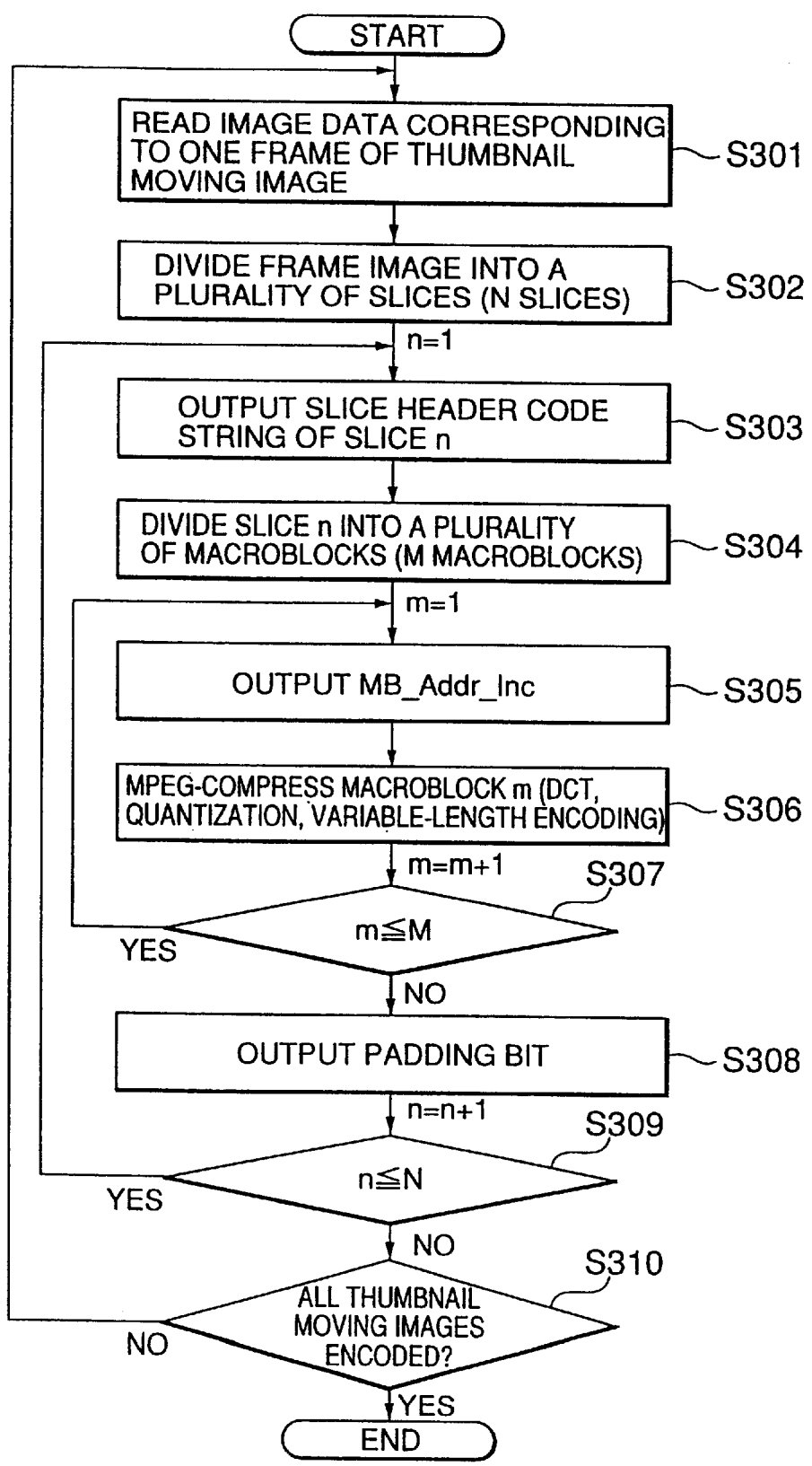
FIG. 3 is an operational flow chart showing an operation of a moving image encoding means according to the first embodiment of this invention.

FIG. 3 illustrates an operational flow taken until a thumbnail moving image is converted into an encoded thumbnail moving image based on MPEG for the multi-image combination.

In FIG. 3, the operational flow proceeds to a step 301 (S301 in the illustration) to read out image data corresponding to one thumbnail moving image frame, then followed by a step 302 to divide the one-frame image data along a horizontal direction into N slices, and further, followed by a step 303 to output a slice header code string of the slice n as a portion of an encoded thumbnail moving image code string. Following this, a step 304 is executed to divide the slice n into M macroblocks, then followed by a step 305 to output the MB_Addr_Inc of the macroblock m as a portion of the encoded thumbnail moving image code string, and further, followed by a step 306 to MPEG-encode (DCT, quantization, variable-length encoding) the macroblock m to output the resultant code string as a portion of the encoded thumbnail moving image code string.

After this, the operational flow advances to a step 307 to check whether or not the encoding of all the macroblocks in the slice n reaches completion. If reaching completion, a step 308 follows to conduct the processing of next_starttcode ( ) in FIG. 52D, and subsequently, a step 309 follows to check whether or not the encoding of all the N slices reaches completion. If reaching completion, a step 310 follows to check whether or not to process all the frames of the thumbnail moving image. In this case, the variable m is used for identifying the macroblock processed, while the variable n is for identifying the slice.

Figure 4:
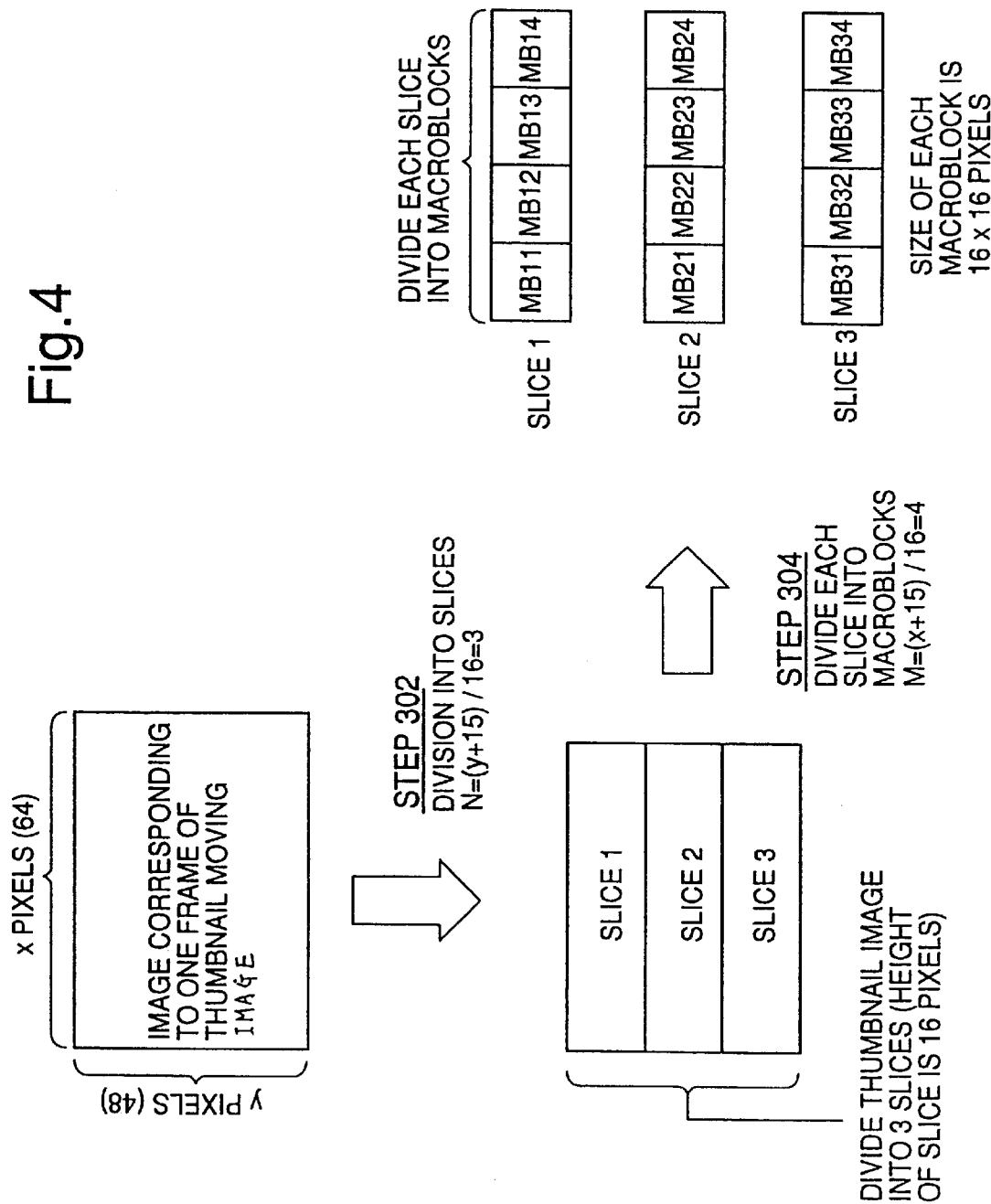
FIG. 4 is an illustration of an example of block division of a thumbnail moving image in the first embodiment of this invention.

FIG. 4 is an illustration of an example of division of each of frame images of a thumbnail moving image into small blocks in the case that the moving image encoding means 204 encodes the thumbnail moving image as encoded thumbnail moving image (steps 302 and 304 in FIG. 3).

Figure 5:
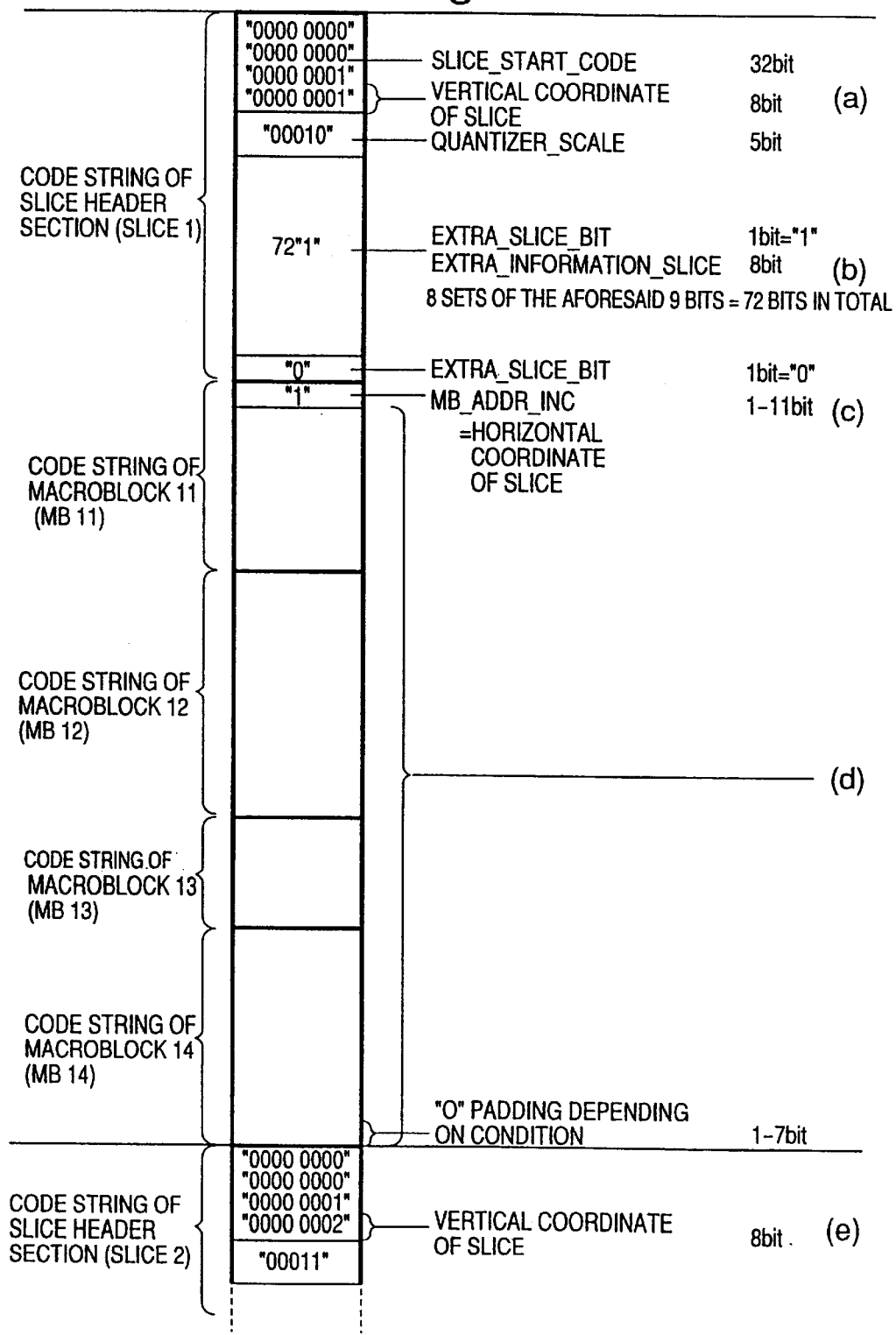
FIG. 5 is an illustration of an example of a code string to be outputted from the moving image encoding means in the first embodiment of this invention.

FIG. 5 is an illustration of a code string outputted to permit the multi-image combination in units of slices when the moving image encoding means 204 MPEG-encodes each of the slices of a thumbnail moving image in the steps 303, 305, 306 and 308 in FIG. 3. Incidentally, the instance shown in FIG. 5 is based upon the division examples into the slices and macroblocks in FIG. 4.

As seen in (a) and (e) of FIG. 5, in the case of outputting a slice code string of the slice n in the step 303, slice_start_code is outputted in a state where the last one byte is set as the value "n".

Furthermore, as shown in (b) of FIG. 5, when multi-image combination is made in units of slices, in preparation for the event that the number of bits of MB_Addr_Inc varies due to the change of horizontal coordinate of the slice, a supplementary code string for supplying the wanted bits is outputted in advance as extra_bit_slice and extra_information_slice. This supplementary code string utilizes a portion prescribed even in the MPEG standard in FIGS. 52A to 52D, and the decoder is capable of normally decoding an encoded thumbnail moving image with such a code string as an MPEG video sequence.

In the example of FIG. 5, as the supplementary code string, 8 sets of extra_bit_slice and extra_information_slice, that is, a code string comprising 72 bits in total, are outputted in a state where all the bits are set as "1" (the reason for the 8 sets of extra_bit_slice and extra_information_slice will be described herein later).

Still further, as shown in (c) of FIG. 5, in the step 305, the value "1" is designated to MB_Addr_Inc of the leading macroblock of the slice, and a variable-length code string "1" of 1-bit length representative of value "1" is outputted. Each of code string shown in (d) of FIG. 5 are a code string obtained by conducting the common MPEG encoding processing (DCT, quantization, movement estimation, variable-length encoding and byte alignment processing) in steps 306 and 308.

Incidentally, when the multi-image combination is made in units of slices, a portion required as an encoded thumbnail moving image is a code string portion following the slice layer in FIG. 5. However, in a manner that code strings (sequence header, GOP header, picture header and others) needed as the MPEG video sequence are outputted in addition to the code strings of the aforesaid slice section, an encoded thumbnail moving image composed of these code strings can be decoded as a single MPEG video sequence and reproduced to be displayed.

In the above description made with reference to (a), (c) and (e) of FIG. 5, although slice_start_code and MB_Addr_Inc are set to the values whereby an encoded thumbnail moving image is decoded as a single MPEG video sequence and reproduced to be displayed, in fact, any value is acceptable at the encoding operation.

Moreover, as described with reference to (b) of FIG. 5, although, in preparation for the case that the number of bits of MB_Addr_Inc varies due to the variation of the slice horizontal coordinate, a code string for supplying wanted bits is outputted in advance as extra_bit_slice and extra_information_slice, it is also appropriate to previously output a code string such as macroblock_stuffing which is available for accomplishing the supplementation processing in connection with the bit number variation in the MB_Addr_Inc section.

Through the above-described process, the moving encoding means 204 outputs an encoded thumbnail moving image code string for the multi-image combination in units of slices.

A description will be taken hereinbelow of the processing to combine a plurality of encoded thumbnail moving images into a multi-image combined moving image.

Figure 6:
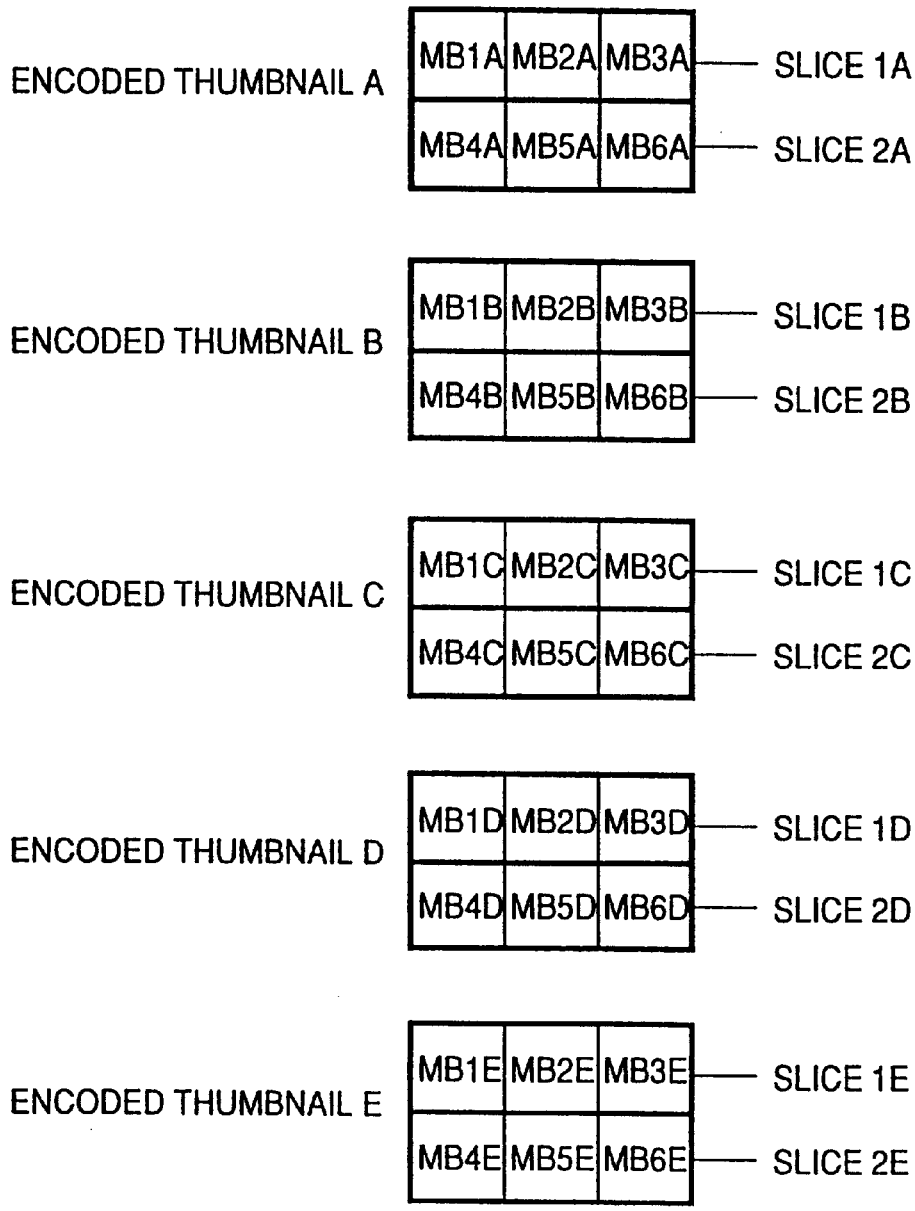
FIG. 6 is an illustration of an example of a list of encoded thumbnail moving images accumulated in an accumulating means in the first embodiment of this invention.

FIG. 6 is an illustration of one example of each of encoded thumbnail moving images accumulated in the accumulating means 206. As shown in FIG. 6, five encoded thumbnail moving images A, B, C, D and E accumulate in the accumulating means 206. At this time, let it be assumed that each of the five encoded thumbnail moving images A, B, C, D and E is divided horizontally into two slices each of which in turn, comprises three macroblocks.

The moving image listing means 209 draws up a list of a combination and order of the encoded thumbnail moving images accumulated in the accumulating means 206. A one example, the moving image listing means 209 produces a list depending upon the hit rate ranking of retrieval keys. A description here will be made assuming that the moving image listing means 209 issues a request to the moving image composing means 207 for the composition of a multi-image combined moving image comprising two divisions (two columns) in the vertical direction and two divisions (two rows) in the horizontal direction as shown in FIG. 7.

Figure 8:
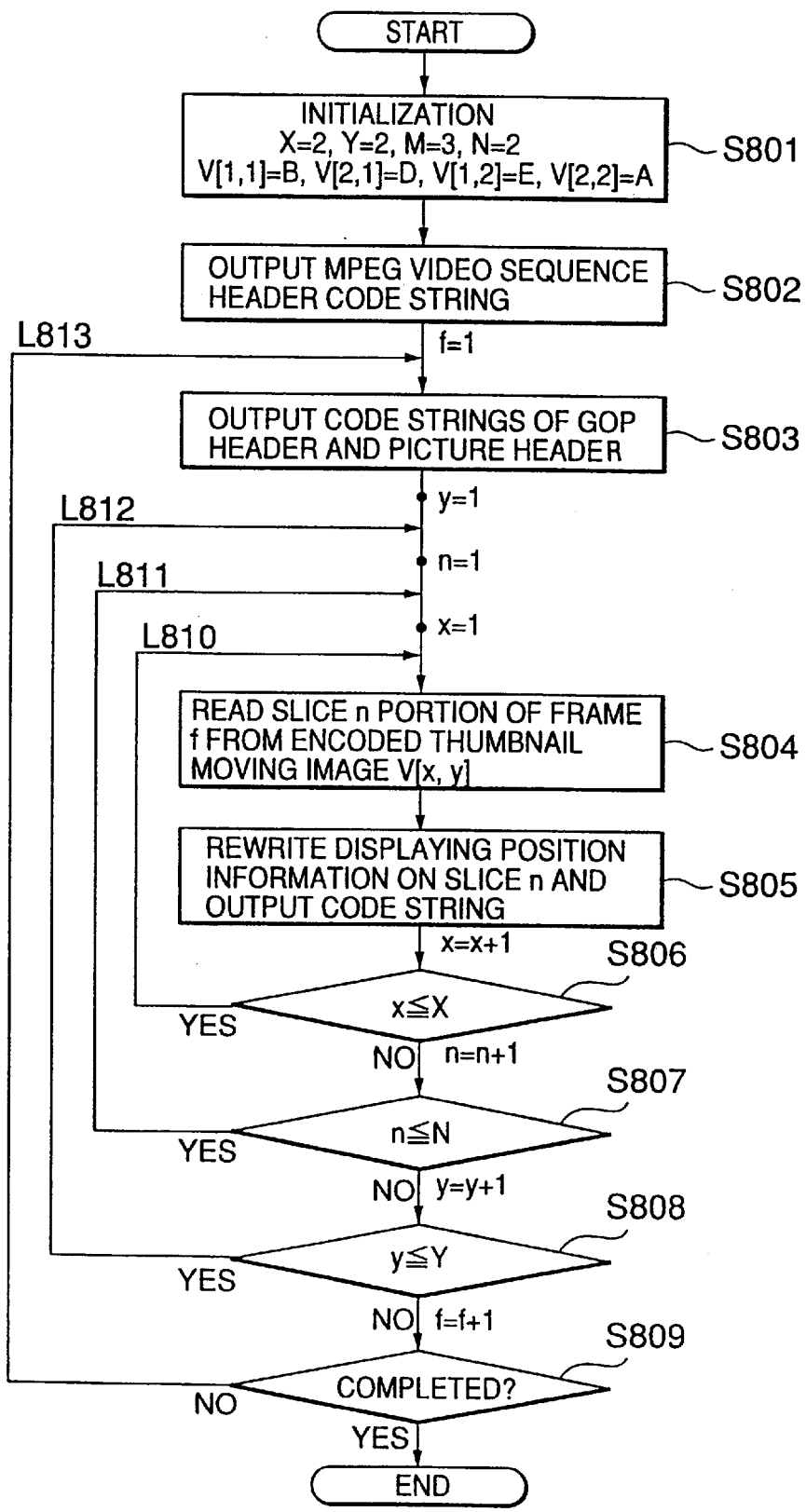
FIG. 8 is an operational flow chart showing an operation of the moving image composing means according to the first embodiment of this invention.

FIG. 8 shows an operational flow to be taken until the moving image composing means 207 combines a plurality of encoded thumbnail moving images into a multi-image combined moving image and outputs an MPEG code string.

The operational flow starts at a step 801 to perform the initialization for the multi-image combination, and then, advances to a step 802 to output an MPEG video sequence header code string so that a multi-image combined moving image can be decoded as an MPEG video sequence, and subsequently, proceeds to a step 803 to output GOP header and picture header code strings so that it can likewise be decoded as the MPEG video sequence. Further, a step 804 follows to read out a slice code string from each of the encoded thumbnail moving images, then followed by a step 805 to rewrite positional information for displaying the read slice at a desired place within the multi-image raster, and further followed by a step 806 to check the counter value for scanning the encoded thumbnail moving image in the horizontal directions. Still further, a step 807 is implemented to check the slice counter value to be used in each of steps 904 and 905, and a step 808 is executed to check the counter value for scanning the encoded thumbnail moving image in the vertical directions, and further, a step 809 is done to check whether the multi-image combination is terminated or not.

Figure 7:
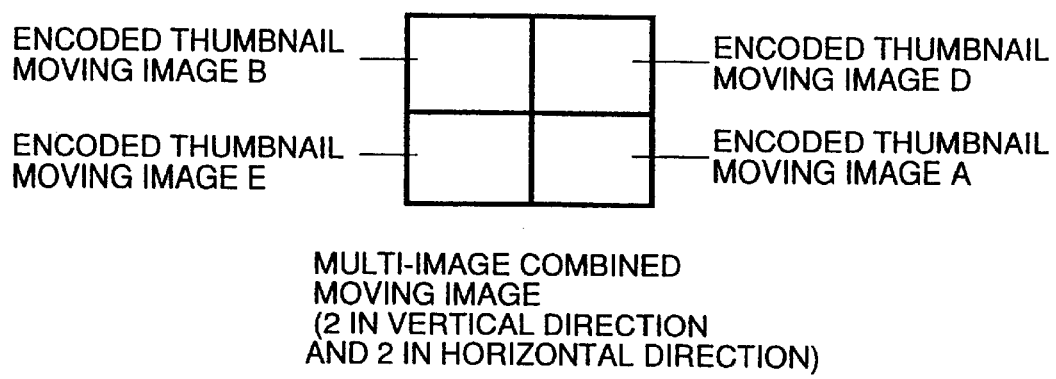
FIG. 7 is an illustration of an example of a multi-image combined moving image produced in answer to a request a moving image listing means issues to the moving image composing means in the first embodiment of this invention.

In response to a request for the multi-image combination shown in FIG. 7, the moving image composing means 207 first undergoes the following initialization processing. That is, because of the multi-image raster comprising two divisions in the vertical direction and two divisions in the horizontal direction, the variable X representative of the number of images in the horizontal direction is set to 2, while the variable Y indicative of the number of images in the vertical direction is set at 2. In addition, the variable N representative of the number of slices of each of encoded thumbnail moving images to be displayed on each of image areas within the multi-image raster is initialized to 2, while the variable M indicative of the number of macroblocks constituting each of the slices is initialized to 3. Moreover, the two-dimensional array variable V (the first subscript represents a horizontal image area of the aforesaid image areas, and the second subscript signifies a vertical image area thereof) indicating which encoded thumbnail moving image is located at one position within the multi-image raster is initialized as follows.

$$V[1,1]=B, V[2, 1]=D, V[1, 2]=E, V[2, 2]=A$$

FIG. 9 is an illustration of expressing loop operations in loops 810, 811 and 812 (L810, L811, L812 in the illustration) in a C language, where the variable x takes the horizontal position of the image, being processed, as a loop counter value, and the variable y takes the vertical position thereof as a loop counter value, while the variable n assumes the slice number of an encoded thumbnail moving image under processing as a loop counter value. In the innermost loop of these three loops, the processing of the steps 804 and 805 are put into practice.

Figure 10A:
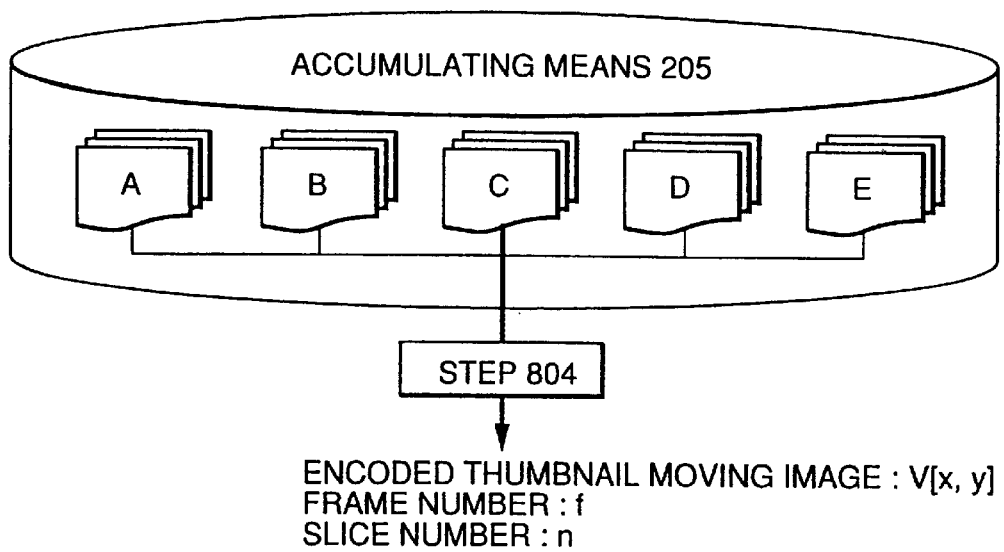
FIGS. 10A and 10B are illustrations of slice code string readout processing from the accumulating means by the moving image composing means according to the first embodiment of this invention.
Figure 10B:
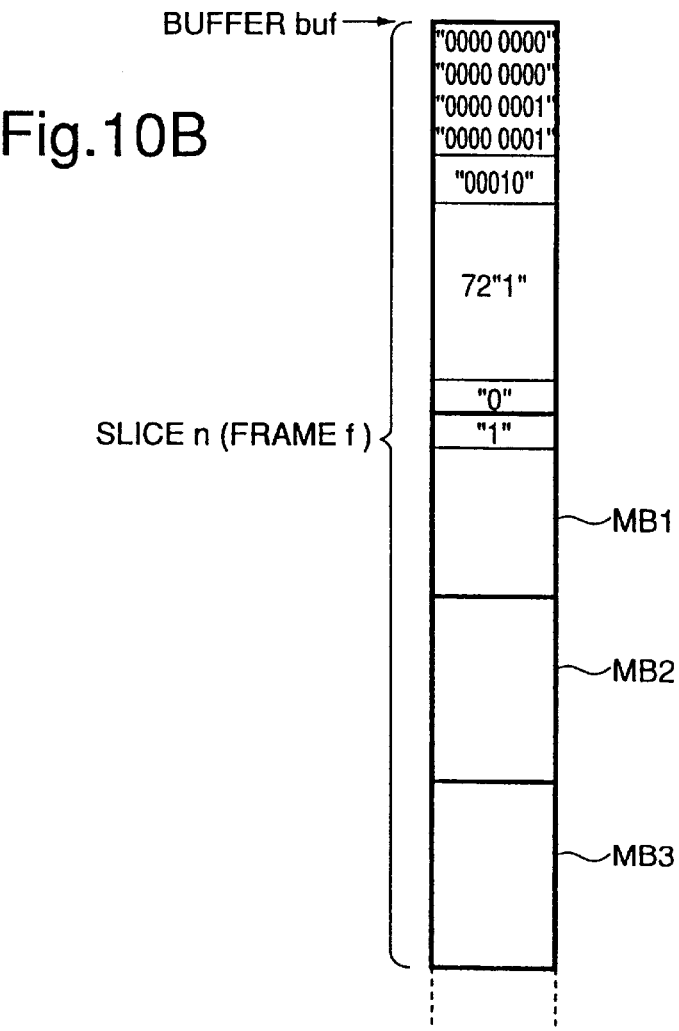

FIGS. 10A and 10B show the slice code string readout processing the moving image composing means 207 performs in the step 804 in FIG. 8. In the step 804, a slice portion code string, designated by the variable n, of a frame specified by the variable f is read out from the encoded thumbnail moving image specified by a variable V[x, y] [(a) of FIG. 12]. For instance, when x=2, y=2 and n=1, the code string of the slice 1A is read out in the step 804. The slice string read out is stored in the composition work memory in which the leading address of the buffer is pointed to by a variable Buf [(b) of FIG. 12].

In the case of the MPEG standard, the code string of the slice layer is prescribed such that the code string starts from a byte border and the end of the code string terminates in a state of being byte-aligned, and the moving image encoding means 204 outputs such a slice code string. For this reason, the slice code string is wholly read from its head to its end in units of bytes and is stored in the composition work memory.

The rewriting processing of the slice displaying position information to be done by the moving image composing means 207 in the step 805 is as follows.

The moving image composing means 207 calculates, in accordance with the following equation, the coordinate in the multi-image raster on which the slice code string within the composition work memory is displayed.

Horizontal Position: $(x-1)*M+1$

Vertical Position: $(y-1)*N+n$

In the case of the aforesaid slice 1A, since x=2, y=2 and n=1, the result is that the horizontal position=4 and the vertical position=3.

FIG. 11 is an illustration of the rewriting processing of the vertical position information on the slice 1A within the composition work memory. In FIG. 11, the section indicated by FIG. 11A shows a state the code string of the slice 1A is stored in the composition work memory in the step 804, while the section of FIG. 11B illustrates a detailed indication of a slice_start_code portion including a code string of the vertical position information on a slice in units of bits. Since the slice vertical position information is represented by the fourth byte of slice_start_code, that is, buf[3], in the step 805, the substitution processing is conducted as follows in order to set the vertical position at 3.

buf[3]=3

In FIG. 11, the section indicated by FIG. 11C denotes the code string of the slice_start_code portion after the rewriting of the vertical position information by the substitution processing.

Figure 12A:
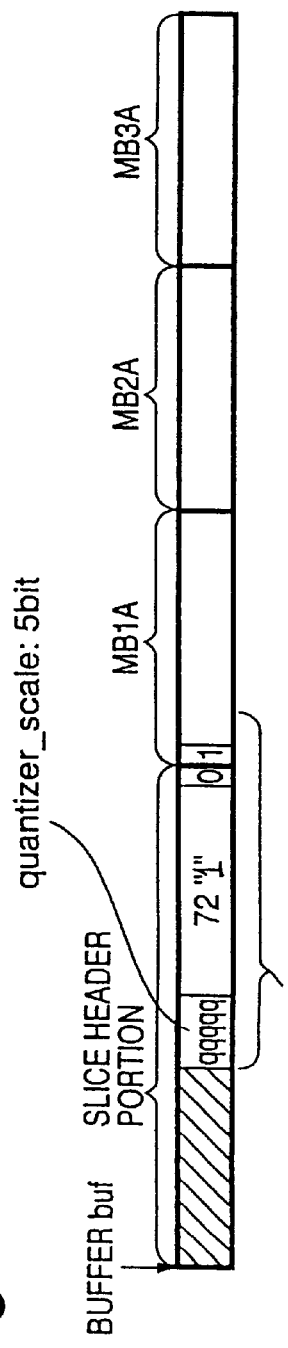
FIG. 12 consisting of FIGS. 12A to 12D, is an illustration of an example of slice horizontal position information rewriting processing in the first embodiment of this invention (horizontal position=4)
Figure 12B:
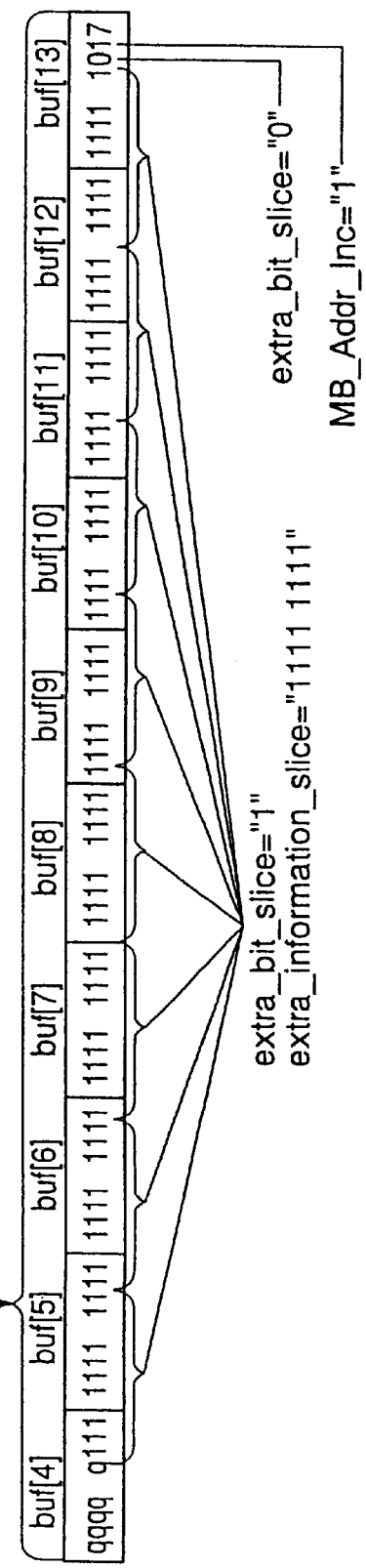

Likewise, FIG. 12 shows one example of the rewriting processing of the horizontal position information on the slice 1A within the composition work memory. In FIG. 12, the section of FIG. 12A illustrates a state where the code string of the slice 1A is read into the composition work memory in the step 804, while the section of FIG. 12B illustrates a detailed indication in units of bits. Although a new horizontal position (MB_Addr_Inc) of the slice 1A assumes 4, if expressing in a variable-length code, the horizontal position 4 is "0011" forming four-bit length. The moving image encoding means 204, which produces encoded thumbnail moving images, outputs MB_Addr_Inc as "1", that is, one-bit length as shown in FIG. 12B of FIG. 12. Thus, the moving image composing means 207 makes up for the wanted three bits from the supplementary code string portion. First, as shown in FIG. 12C of FIG. 12, the bytes identical in number to the wanted bits are thinning-processed (In the instance of the slice 1A, the number of lacking bits is 3, and therefore, three bytes are taken in a thinning way).

Secondly, after the code string corresponding to 10 bytes from buf[0] to buf[9] not undergoing the thinning processing is outputted, new horizontal position information rewriting processing is conducted as shown in the sections FIGS. 12C and 12D of FIG. 12.

buf[13]=buf[13]&0x01+0xc6

In this equation, buf[13]&0x01 is for a filter calculation not to rewrite the lower 1 bit of buf[13].

After the rewriting of the horizontal position, all the slice code strings succeeding buf[13] are outputted so as not to output the code string of the byte portion taken out by the thinning. Following the output of all the slice code strings, the composition work memory is set into a vacant condition.

Through the above-described process, the moving image composing means 207 completes the rewriting processing of the variable-length code bit portion indicative of the slice horizontal position information by only making simple calculation several times, and outputs a multi-image combined moving image code string produced by combining multiple images in units of slice code strings. The multi-image combined moving image code string outputted from the moving image composing means 207 is decoded as a moving image in the moving image decoding means 210, and that picture is displayed on the moving image displaying means 211.

The reason for the use of 8 sets of extra_bit_slice and extra_information_slice will be mentioned hereinbelow.

The extra_bit_slice is 1-bit length while the extra_information_slice is 8-bit length, and when these are paired, the code length reaches 9 bits. When 1 byte (=8-bit length) is taken out from the supplementary code string portion of 9-bit length by means of the thinning, 1 bit remains there. This 1 bit can be allocated for the missing-bit supplementation at the variation in the number of bits of the MB_Addr_Inc portion.

In terms of the aforesaid sets, if 1 byte per 1 set is taken out by the thinning, 1 bit is available for the supplementation, and therefore, when 7 bytes taken out from 8 sets, 8 bits are available for the supplementation. In the case of needing 9 or more supplementry bits, the number of bytes to be taken out by the thinning may be decreased on all such occasions. For instance, if supplying 14 bits, only 5 bytes are first taken out, so that 5 bits are compensable, and then, 9 bits corresponding to 1 set are further allocated as the supplementary bits, so that 14 bits in total are obtainable as the supplementary bits.

Accordingly, since the combinations of extra_bit_slice and extra_information_slice are made by 8 sets, it is possible to supply an arbitrary number of wanted bits, and since 8 sets form a minimum value, the supplementary code string can suppress the increase in the bit rate of the moving image to a minimum.

As described above, according to this embodiment, there is provided a moving image composing system comprising the moving image receiving means for receiving moving images to be combined into a multi-image combined moving image, the moving image reducing means for reducing the received moving images to a predetermined size to produce thumbnail moving images, the moving image encoding means for MPEG-encoding the thumbnail moving images to produce encoded thumbnail moving images, the accumulating means for storing and accumulating the encoded thumbnail moving images encoded according to MPEG, the moving image composing means for combining a plurality of encoded thumbnail moving images accumulated in the accumulating means to produce a multi-image combined moving image code string, the composition work memory to be used for when the moving image composing means temporarily stores slice code strings, the moving image listing means for drawing up a list of a combination and order of moving images constituting a multi-image combined moving image, the moving image decoding means for decoding the multi-image combined moving image code string produced by the composition, and the moving image displaying means for displaying the decoded moving image, wherein, a variation in the number of bits of an MB_Addr_Inc occurs due to a change of the horizontal coordinate of a slice, the moving image encoding means previously outputs a supplementary code string to be used for supplying wanted bits, and the moving image composing means supplies the wanted bits from the supplementary code string and rewrites the value of MB_Addr_Inc, thus producing a multi-image combined moving image code string.

This can omit the bit shift operation for all the succeeding code strings due to the variation in the number of bits at the composition of the multi-image combined moving image, and more specifically, the rewriting processing of the variable-length bit portion representing the slice horizontal position information can be completed by only performing simple calculation several times, and consequently, the multi-image combined moving image is producible at a high speed, which provides a great practical effect.

More concretely, owing to the moving image encoding means having a function to output 8 sets extra_bit_slice and extra_information_slice as a supplementary code string, the moving image composing means can supply an arbitrary number of wanted bits from the aforesaid supplementary code string and can produce a macroblock_escape code string, so that the rewriting of the variable-length code bit portion representing the slice displaying position to an arbitrary value becomes feasible, which offers a great practical effect.

Figure 13C:
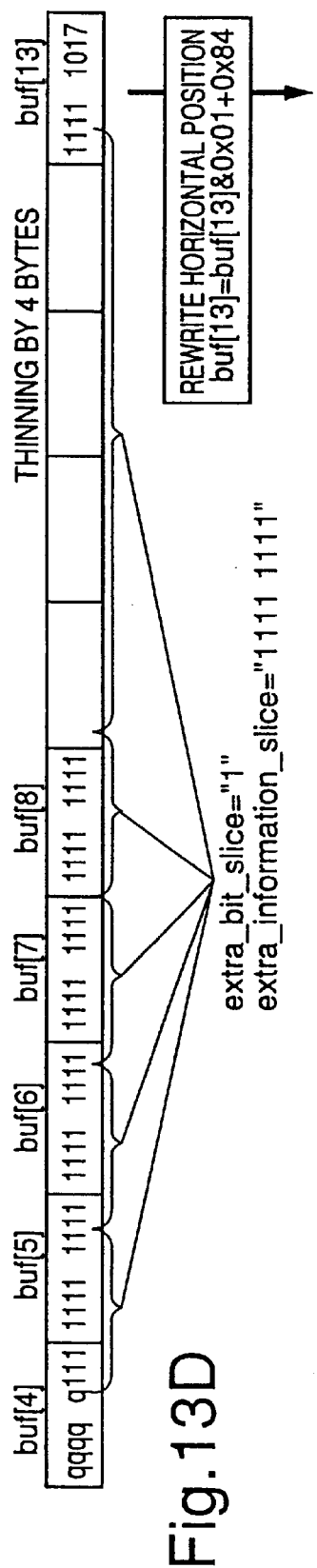
FIG. 13 consisting of FIGS. 13A to 13D, is an illustration of an example of slice horizontal position information rewriting processing in the first embodiment of this invention (horizontal position=7)
Figure 13D:
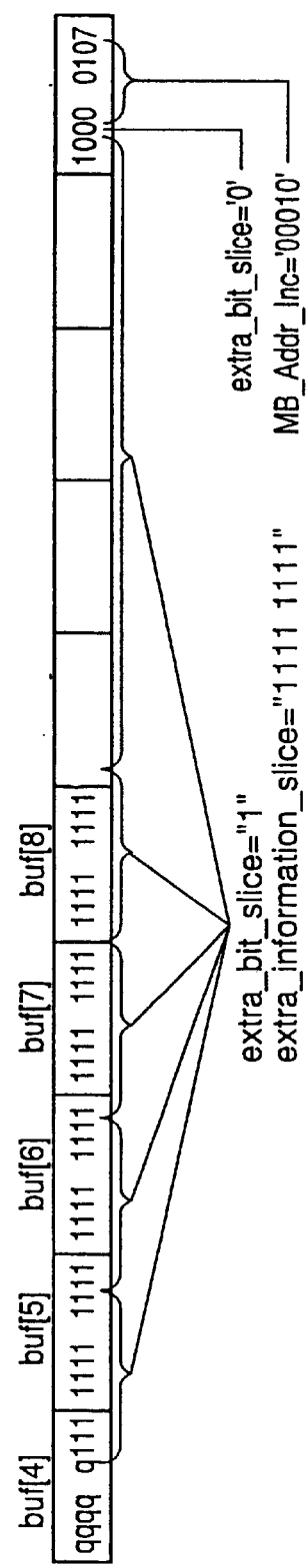
Figure 14A:
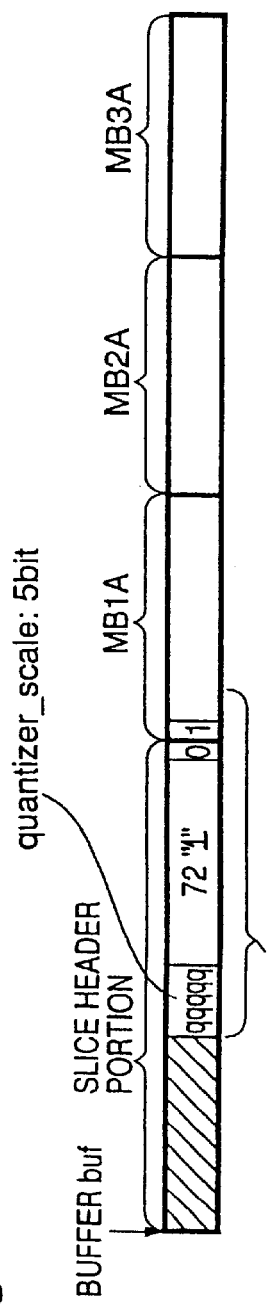
FIG. 14 consisting of FIGS. 14A to 14D, is an illustration of an example of slice horizontal position information rewriting processing in the first embodiment of this invention (horizontal position=13)
Figure 14B:
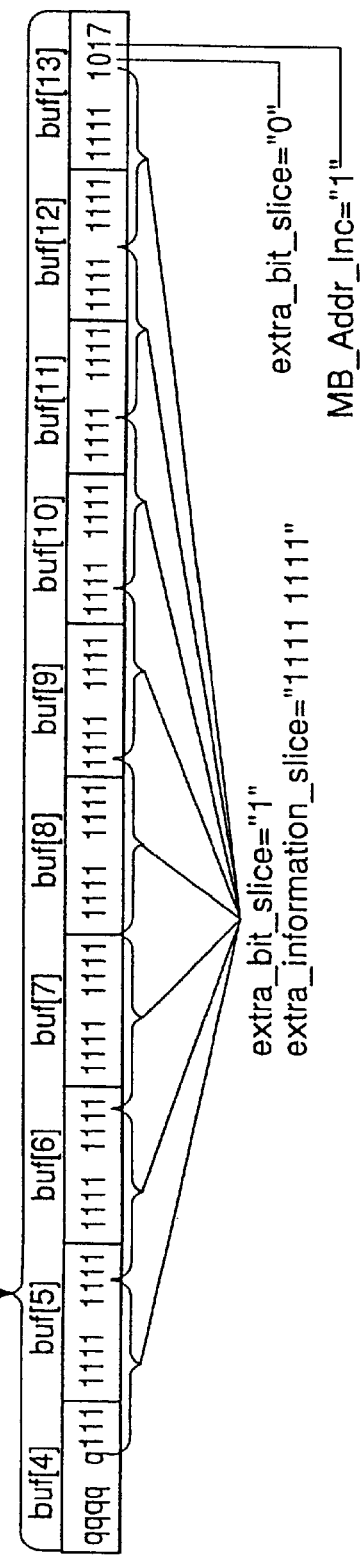
Figure 15A:
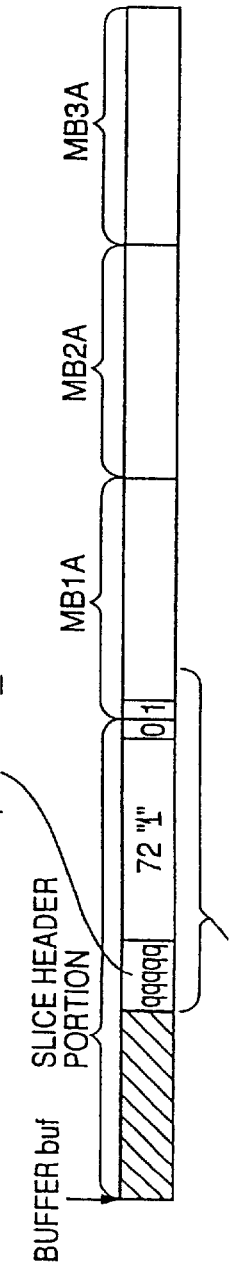
FIG. 15 consisting of FIGS. 15A to 15D, is an illustration of an example of slice horizontal position information rewriting processing in the first embodiment of this invention (horizontal position=37)
Figure 15B:
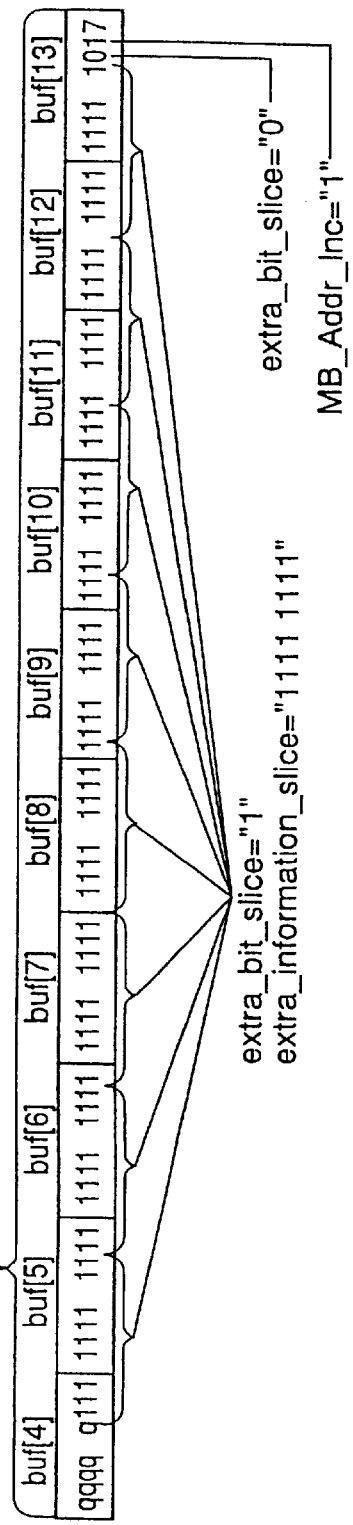

Incidentally, although this embodiment has been described in the case that the horizontal positions of the slice disposition are four in number, the rewriting processing is also possible even in the case of taking a different slice disposition. FIGS. 13, 14 and 15 show the MB_Addr_Inc rewriting processing in the case that the horizontal positions are 7, 13 and 37 in number, respectively. Although a 11-bit code string called macroblock_escape should be outputted in the case that the disposing positions are 34 in number, even in this case, in a manner of making the numerical change of the number of bytes to be taken out by thinning, the filter calculation and others, the same effects are attainable.

Furthermore, although, in the above description of this invention, the variable-length code bit MB_Addr_Inc is used as a portion representative of the horizontal position of a slice code string and a series of processing of supplying wanted bits resulting from the rewriting of the MB_Addr_Inc by simple byte thinning of a supplementary code string outputted in advance to the slice header portion is done taking the MPEG video sequence into consideration, this invention is also applicable to a standard other than the MPEG standard.

That is, in a standard that positional information indicative of a position at which one code string is displayed within the image is given with a variable-length code bit(s) when that code string is decoded into an image, if an area which can output an extended code string not affecting the image at decoding is prescribed as a standard in front or rear of the code string portion representative of the positional information, or in both, that area is used as a supplementary code string, so that the same effects are obtainable even in a standard other than the MPEG standard.

(Second Embodiment)

A description will be made hereinbelow of a second embodiment of this invention. In the explanation of the second embodiment, the same numerals are assigned to the same parts or sections as those described in the first embodiment, and the description thereof will be omitted for brevity.

Figure 16:
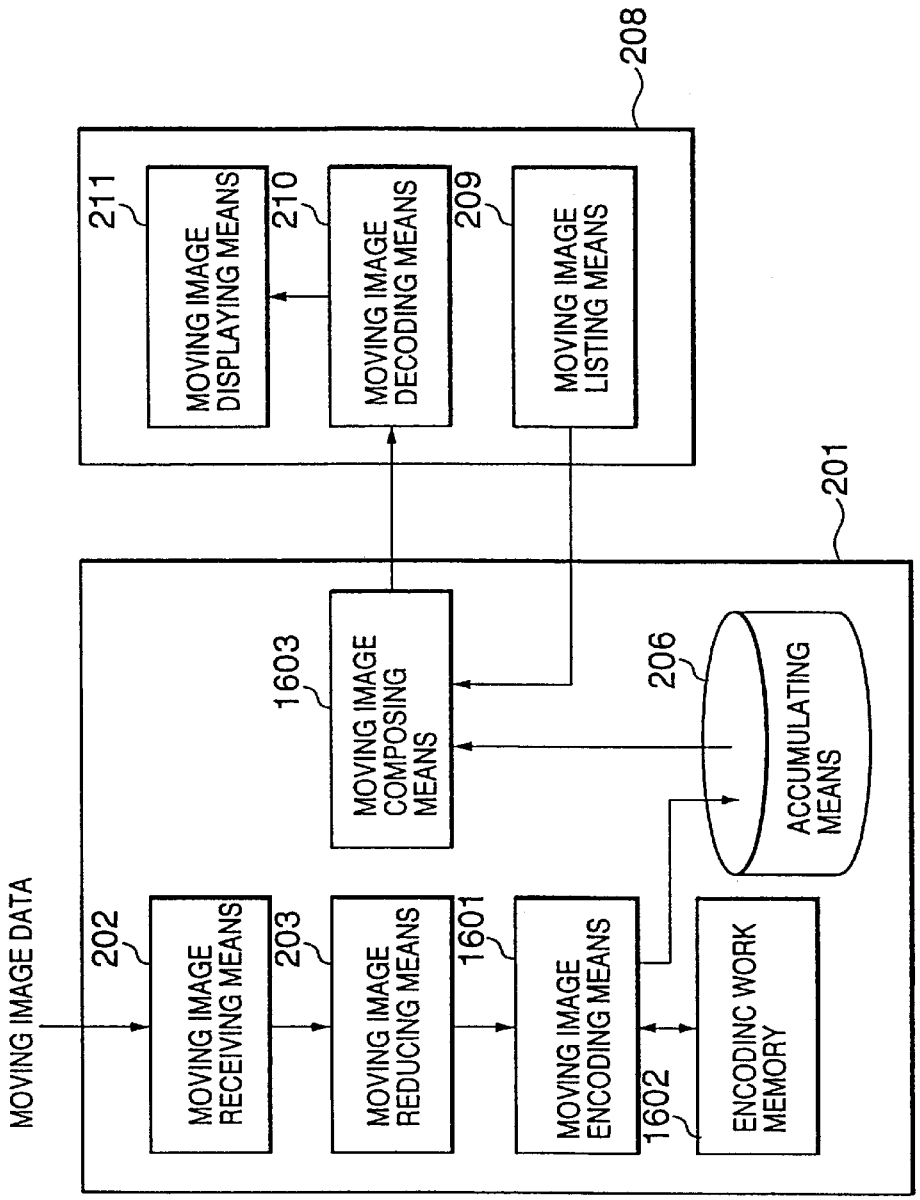
FIG. 16 is a block diagram showing a moving image composing system according to a second embodiment of this invention.

FIG. 16 is a block diagram showing an arrangement of a moving image composing system according to the second embodiment of this invention. In FIG. 16, numeral 1601 represents a moving image encoding means for MPEG-encoding thumbnail moving images to produce encoded thumbnail moving images, numeral 1602 designates an encoding work memory for temporarily storing the code strings produced by the MPEG encoding operation, and numeral 1603 depicts a moving image composing means for combining a plurality of encoded thumbnail moving images to produce a multi-image combined moving image code string.

A description will be given hereinbelow of methods for the moving image encoding and for the combination of a plurality of moving images to be taken in this moving image composing system.

The description begins at the moving image encoding processing.

FIG. 17 shows an operational flow to be taken until the moving image encoding means 1601 converts the thumbnail moving image into an encoded thumbnail moving image based on MPEG for a multi-image combination.

In FIG. 17, in a step 1701, a slice header code string of a slice n is outputted as a portion of an encoded thumbnail moving image code string, and in a step 1702, the contents of the encoding work memory is made empty as the processing for the initialization of the encoding work memory. Further, in a step 1703, a macroblock m is MPEG-encoded (DCT, quantization, variable-length encoding), and a code string produced by the encoding is outputted to the encoding work memory, and in a step 1704, the code string within the encoding work memory is byte-aligned, and in a step 1705, the code string within the encoding work memory is outputted as a portion of an encoded thumbnail moving image code string.

Figure 18A:
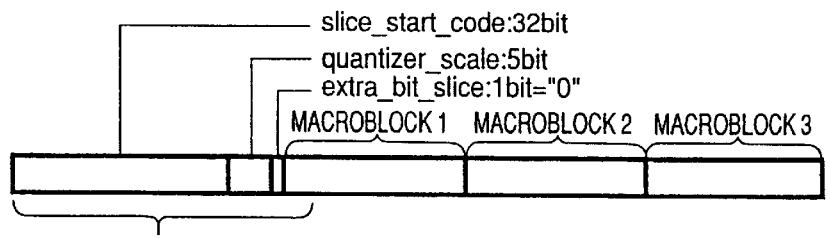
FIG. 18 consisting of FIGS. 18A to 18C is an illustration of an example of a slice header code string in the second embodiment of this invention.
Figure 18B:
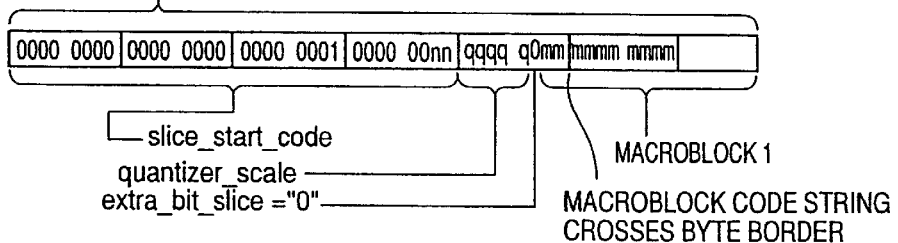
Figure 18C:
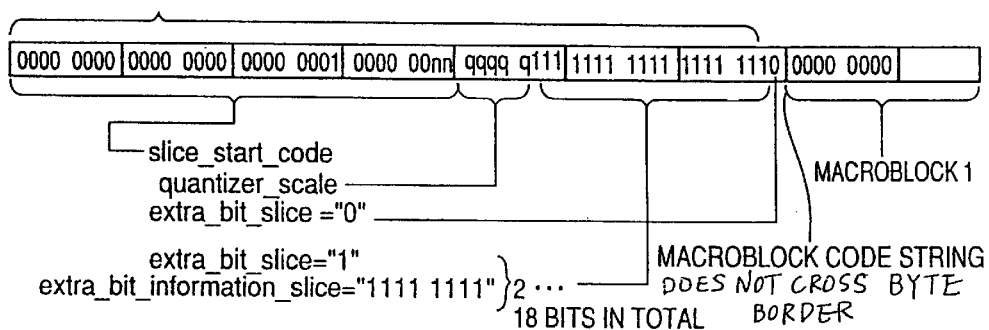

FIG. 18 is an illustration of an example of a slice header code string in the step 1702. In FIG. 18, the sections indicated by FIGS. 18A and 18B illustrate an example of a code string outputted by a common MPEG encoding means. As seen from FIGS. 18A and 18B of FIG. 18, the head of a macroblock 1 crosses the byte border. Thus, in this embodiment, the moving image encoding means 1601 outputs a supplementary code string comprising 2 sets of extra_bit_slice and extra_information_slice, i.e., 18 bits in total as shown in FIG. 18C of FIG. 18. By outputting such a supplementary code string, the head of the macroblock code string starts correctly from the byte border.

Incidentally, since the supplementary code string is outputted utilizing a portion prescribed even in the MPEG standard, the decoder can correctly decode an encoded thumbnail moving image with such a code string as an MPEG video sequence. Further, although, in FIG. 18C of FIG. 18, "1111 1111" is outputted as extra_information_slice, a different value is also acceptable.

As described above, the processing of the step 1701 ensures that a macroblock code string constituting a slice starts from a byte border position.

A description will be given hereinbelow of an operation of the encoding work memory 1602.

FIG. 19 shows an operation of the encoding work memory 1602. The processing of the step 1702 makes the contents of the encoding work memory 1602 empty [see FIG. 19A of FIG. 19]. Meanwhile, an encoding work memory is also a portion of a computer, and the readout and writing access thereto are made in units of bytes. Thus, a bit-length effective within the byte is taken through the use of a variable b. As shown in FIG. 19B of FIG. 19, the effective code string is constructed to be 35 bits, and hence, when 35 is divided by 8, the residual 3 bits are expressed using bits of a portion of the fifth byte in the encoding work memory 1602. Accordingly, the effective bit-length of the fifth byte is expressed in a manner that the variable b is set to 3. The section FIG. 19C of FIG. 19 shows the variation in the contents of the encoding work memory 1602 occurring when a 7-bit-length code string "1111 111" is added to the encoding work memory 1602.

As described above, the code string is maintainable in units of bits by using the variable b in the encoding work memory 1602.

Figure 20A:
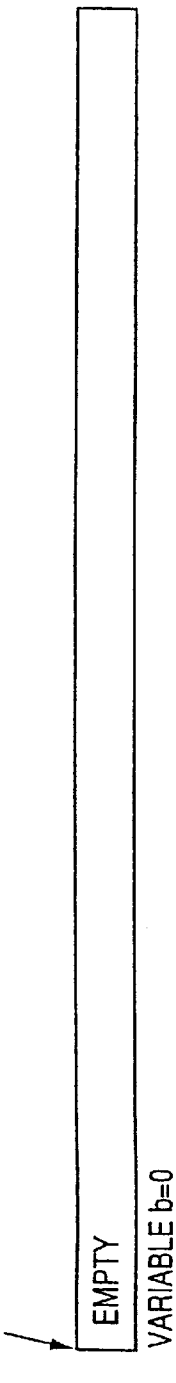
FIG. 20 consisting of FIGS. 20A to 20C is an illustration of an example of an operation of the work buffer at the MPEG encoding processing by the moving image encoding means in the second embodiment of this invention.

FIG. 20 is an illustration of the contents of the encoding work memory 1602 in the case that the moving image encoding means 1601 conducts the MPEG encoding processing (DCT, quantization, movement estimation, variable-length encoding) in the steps 1703 and 1704 in FIG. 17. As shown in FIG. 20A of FIG. 20, the contents of the encoding work memory 1602, when being in the initial condition, is vacant due to the processing of the step 1702.

Figure 20B:
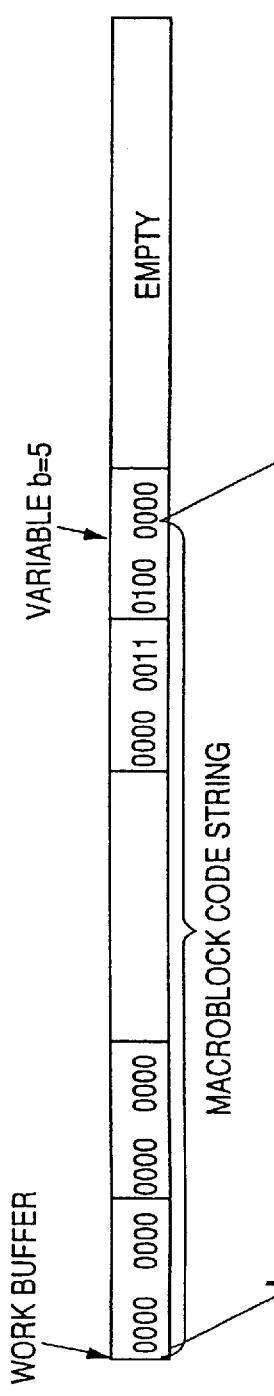
Figure 20C:
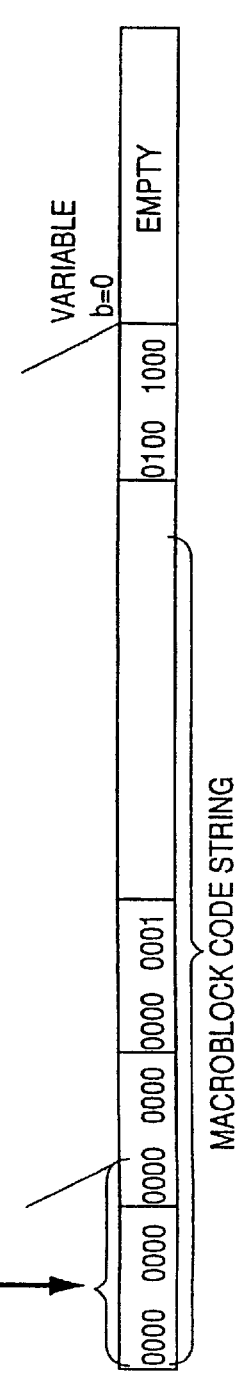

When the code string obtained by the MPEG encoding processing for a macroblock m in the next step 1703 is added to the encoding work memory 1602, the contents of the encoding work memory 1602 becomes as shown in FIG. 20B of FIG. 20. In FIG. 20B of FIG. 20, since the value of the variable b is 5, the end of the macroblock crosses a byte border by 5 bits. Thus, macroblock_stuffing is inserted into the head portion of the macroblock code string so that the end of the macroblock comes into contact with the byte border. As shown in FIG. 20B, macroblock_stuffing is a code string having an 11-bit length, and whenever one macroblock_stuffing is inserted into the head of the encoding work memory 1602, the code strings already existing within the encoding work memory 1602 can be shifted by 11 bits in the backward direction. In the case of crossing the byte border by 5 bits, when one macroblock_stuffing is inserted thereinto, the variable b becomes 0, so that the end of the macroblock goes into a byte-aligned condition [see FIG. 20C of FIG. 20].

The code string undergoing the macroblock_stuffing insertion processing into the head portion of the macroblock takes a correct arrangement as an MPEG video sequence as shown in FIG. 52B.

FIG. 21 shows the relationship between the value of the variable b before the insertion of macroblock_stuffing and the number of macroblock_stuffing to be inserted at that time.

As described above, the macroblock code string is made so that its head and end come into contact with the byte border within the encoding work memory 1602. The moving image encoding means 1601 outputs the macroblock code string within the encoding work memory 1602 as a portion of an encoded thumbnail moving image code string.

Incidentally, in the case of accomplishing a multi-image combination in units of macroblocks, the portion necessary as an encoded thumbnail moving image is a macroblock code string in which the head and end of the code string come into contact with a byte border. Although the slice header code string is outputted in the step 1701, there is no need to always output the slice header code string into the code strings of an encoded thumbnail moving image.

Furthermore, by outputting a code string (sequence header, GOP header, picture header and others) required as the MPEG video sequence, the encoded thumbnail moving image can be decoded as a single MPEG video sequence, and further reproduced and displayed.

A description will be made hereinbelow of the processing of combining a plurality of encoded thumbnail moving images into a multi-image combined moving image. In this case, as well as the first embodiment, let it be assumed that the moving image listing means 209 issues a request to the moving image composing means 1603 for composing a multi-image combined moving image comprising two divisions in the vertical direction and two divisions in the horizontal direction shown in FIG. 7.

Figure 22:
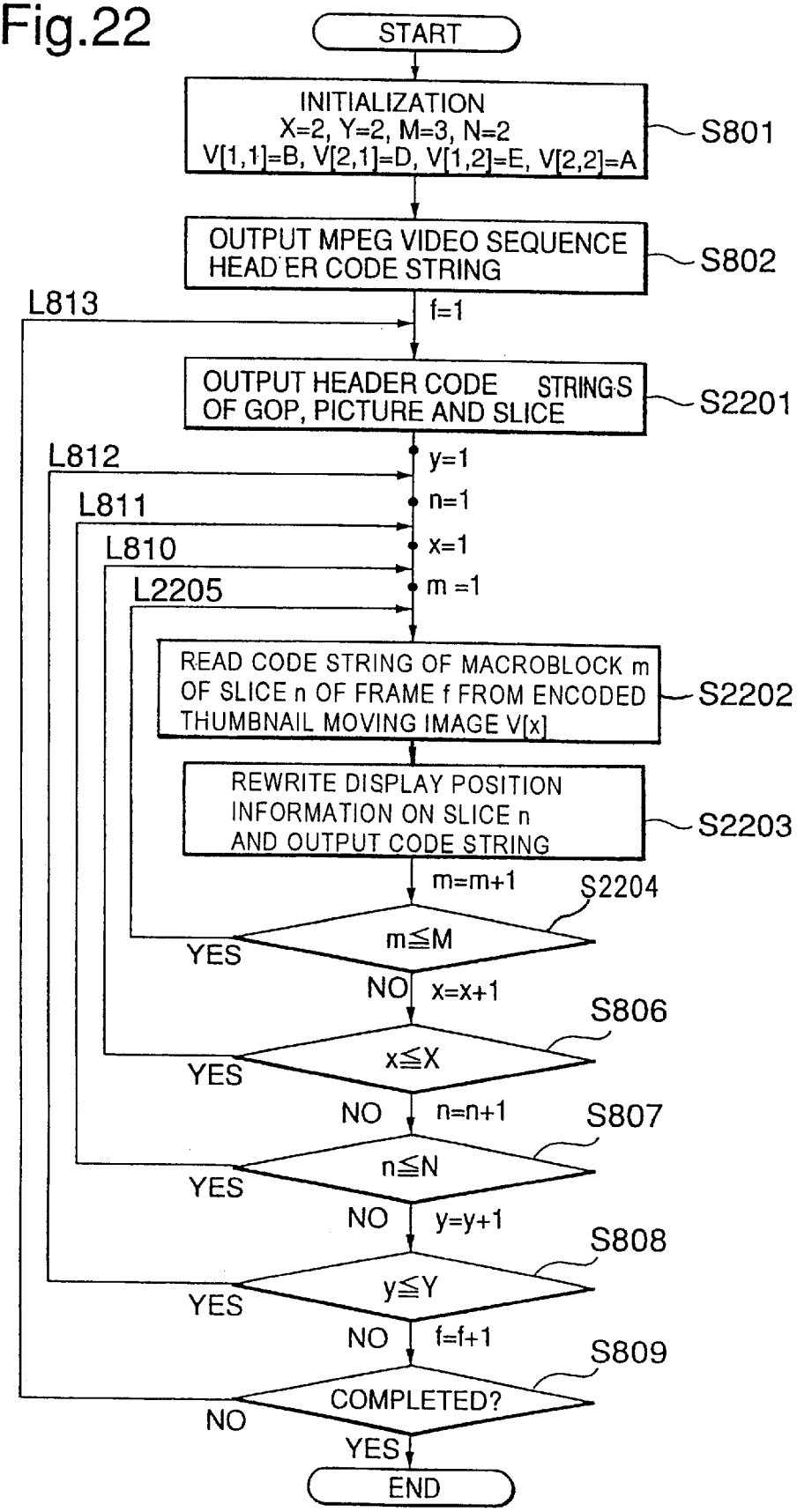
FIG. 22 is an operational flow chart showing an operation of a moving image composing means according to the second embodiment of this invention.

FIG. 22 shows an operational flow to be conducted until the moving image composing means 1603 combines a plurality of encoded thumbnail moving images into as multi-image combined moving image and outputs its MPEG code string.

In FIG. 22, in a step 2201, a header code string of each of a GOP header, a picture header and a slice header is outputted to allow a multi-image combined moving image to be decoded as an MPEG video sequence, and in a step 2202, a macroblock code string is read out from each of encoded thumbnail moving images. Subsequently, in a step 2203, the macroblock code strings read out therefrom are outputted as a multi-image combined moving image code string, and in a step 2204, the value of a macroblock counter m is checked.

FIG. 23 is an illustration of expressing loop processing of loops (L) 810, 811, 812 and 2205 in the operational flow of FIG. 22 in C language, where the variable x takes the horizontal position of the image, being processed, as a loop counter value, and the variable y takes the vertical position thereof as a loop counter value, while the variable n assumes the slice number of an encoded thumbnail moving image under processing as a loop counter value and the variable m assumes the macroblock number of the encoded thumbnail moving image, being processed, as a loop counter value.

Figure 24:
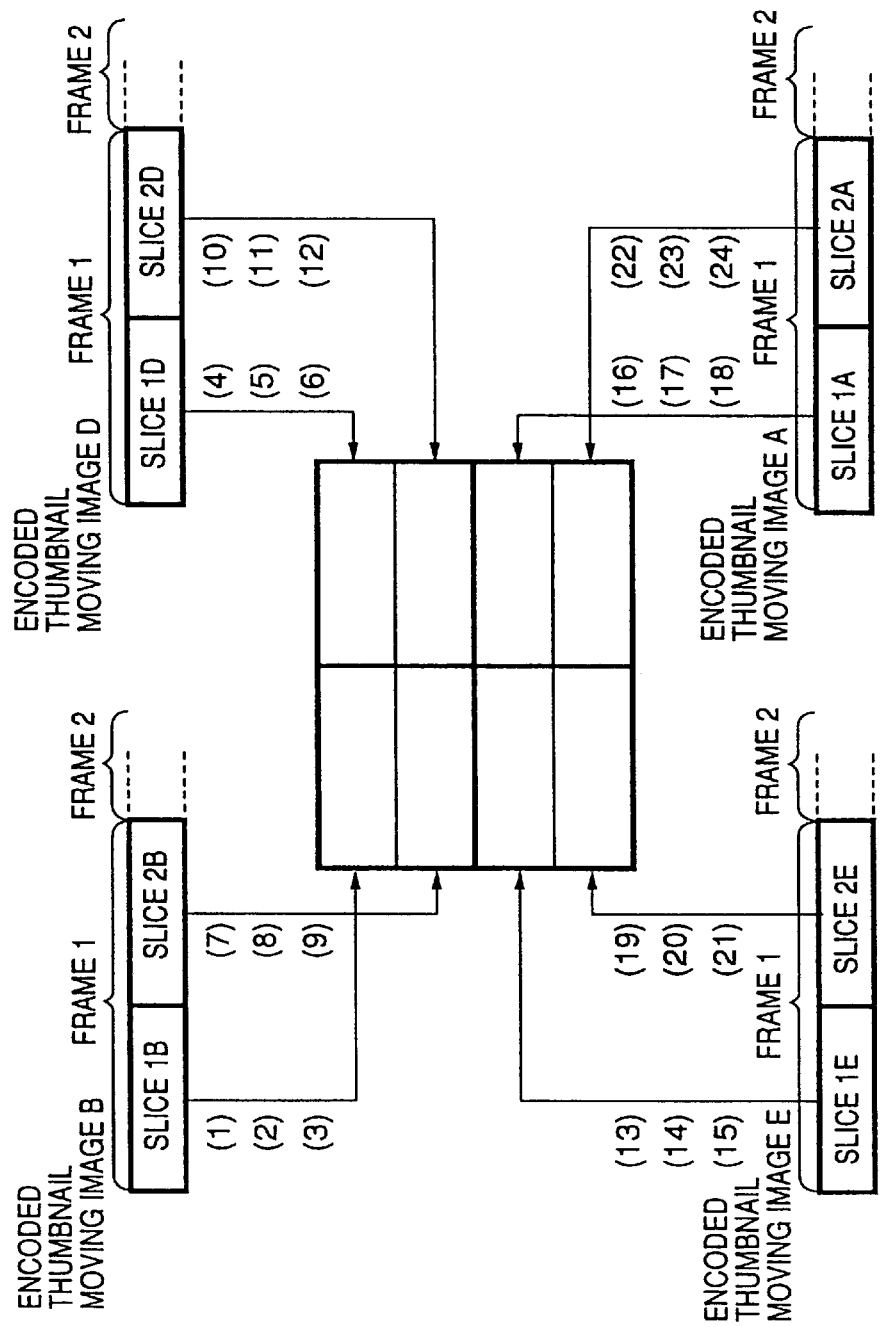
FIG. 24 is an illustration of an example of an image composing processing sequence corresponding to one multi-image raster in the second embodiment of this invention.

FIG. 24 shows an image composing processing sequence for one multi-image frame in this embodiment. The readout of the macroblock code string of each of the encoded thumbnail moving images in the step 2202 and the outputting of the multi-image combined moving image code string in the step 2203 are done in the raster scanning order (the order of numerals within parentheses in FIG. 24). That is, the macroblock code strings read out are successively connected in the raster scanning order, thereby producing a multi-image combined moving image code string.

As described above, the moving image encoding means 1601 produces macroblock code strings whose head and end do not cross a byte border, and hence, the moving image composing means 1603 can create a desired multi-image combined moving image code string by only connecting the macroblock code strings in the raster scanning order, which achieves the speed-up of the production of a multi-image combined moving image.

Although, in the operational flow of this embodiment shown in FIG. 22, one picture in the MPEG video sequence of the multi-image combined moving image is constructed with only one slice, even if it is constructed with a plurality of slices, likewise, a desired multi-image combined moving image is producible in a manner of only connecting the macroblock code strings in the raster scanning order. At this time, in order for each of the slice head code strings and each of the macroblock code strings to be correctly connected to each other at a byte border, the slice header code string is required to undergo the byte alignment by the supplementary code string shown in FIG. 18C of FIG. 18.

As described above, according to this embodiment, here is provided a moving image composing system comprising the moving image receiving means for receiving moving images to be combined into a multi-image combined moving image, the moving image reducing means for reducing the received moving images to a predetermined size to produce thumbnail moving images, the moving image encoding means for MPEG-encoding the thumbnail moving images to produce encoded thumbnail moving images, the encoding work memory to be used for when the moving image encoding means temporarily stores the microblock code strings, the accumulating means for storing and accumulating the encoded thumbnail moving images encoded according to MPEG, the moving image composing means for combining a plurality of encoded thumbnail moving images accumulated in the accumulating means to produce a multi-image combined moving image code string, the moving image listing means for producing a list of a combination and order of moving images constituting a multi-image combined moving image, the moving image decoding means for decoding the multi-image combined moving image code string produced by the composition, and the moving image displaying means for displaying the decoded moving image, wherein the encoding work memory has a means to store and retain code strings in units of bits, and the moving image encoding means inserts a supplementary code string so that the head and end of the macroblock code string take a contacting condition with a byte border, and further, the moving image composing means arranges the macroblock code strings in the raster scanning order to produce a multi-image combined moving image code string for making a desired multi-image combined moving image.

Whereupon, the multi-image combination for the moving image composition by the moving image composing system depends upon only arranging the macroblocks in order, and therefore, the speed-up of the multi-image combined moving image production is achievable, which offers great practical effects.

(Third Embodiment)

A description will be made hereinbelow of a third embodiment of this invention. In the explanation of the third embodiment, the same numerals are given to the same parts or sections as those in the above-described embodiments, and the description thereof will be omitted for brevity.

Figure 25:
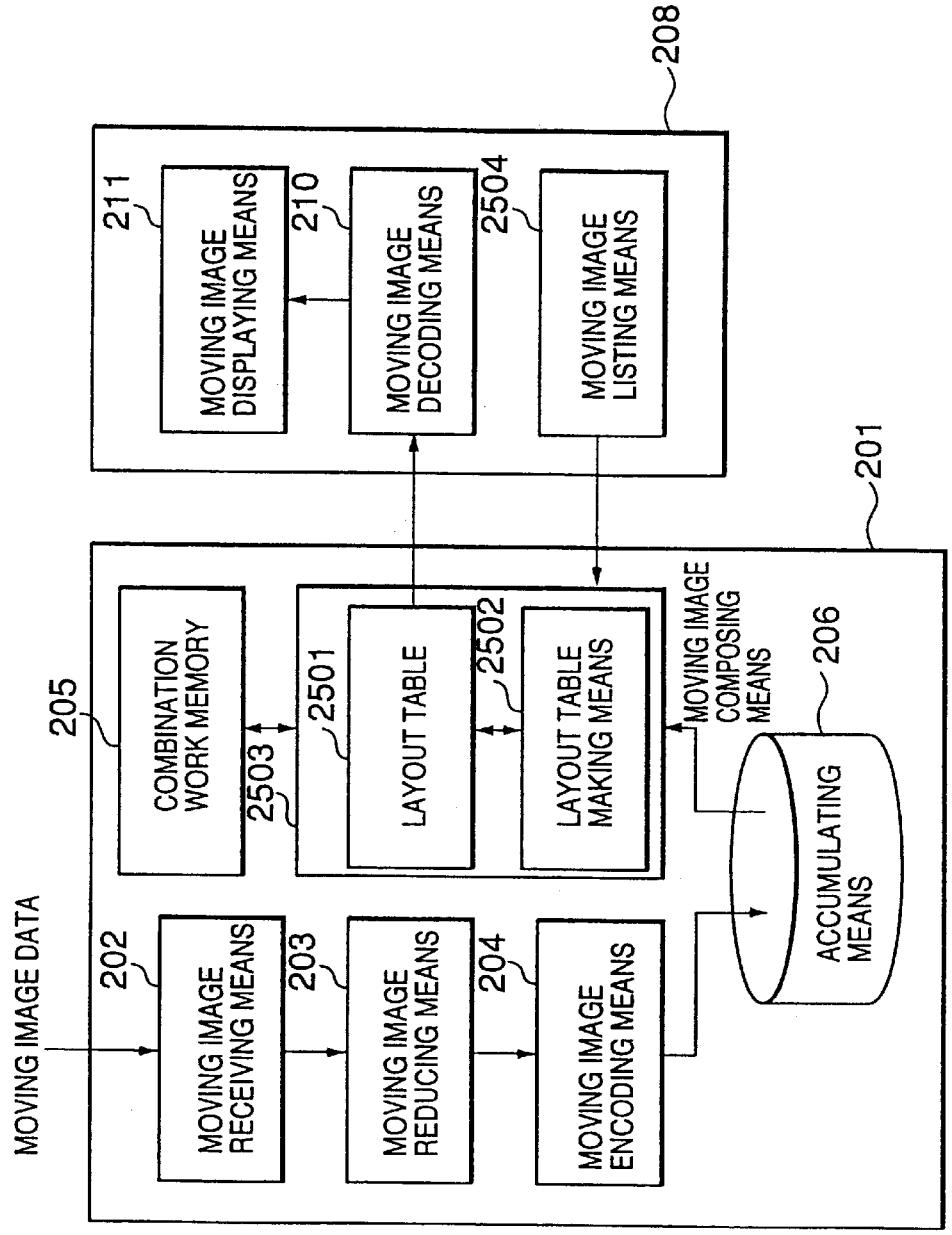
FIG. 25 is a block diagram showing a moving image composing system according to a third embodiment of this invention.

FIG. 25 is a block diagram showing a construction of a moving image composing system according to a third embodiment of this invention.

In FIG. 25, numeral 2501 depicts a layout table for, when a multi-image raster is divided in a macroblock size into areas, retaining multi-image layout information on each of the areas, numeral 2502 designates a layout table making means for drawing up the layout table in response to a request from a moving image listing means, numeral 2503 denotes a moving image composing means for combining a plurality of encoded thumbnail moving images with different image sizes to create a multi-image combined moving image code string, and numeral 2504 signifies a moving image listing means for drawing up a list of a combination and order of moving images organizing a multi-image combined moving image having different sizes of image areas.

Figure 26:
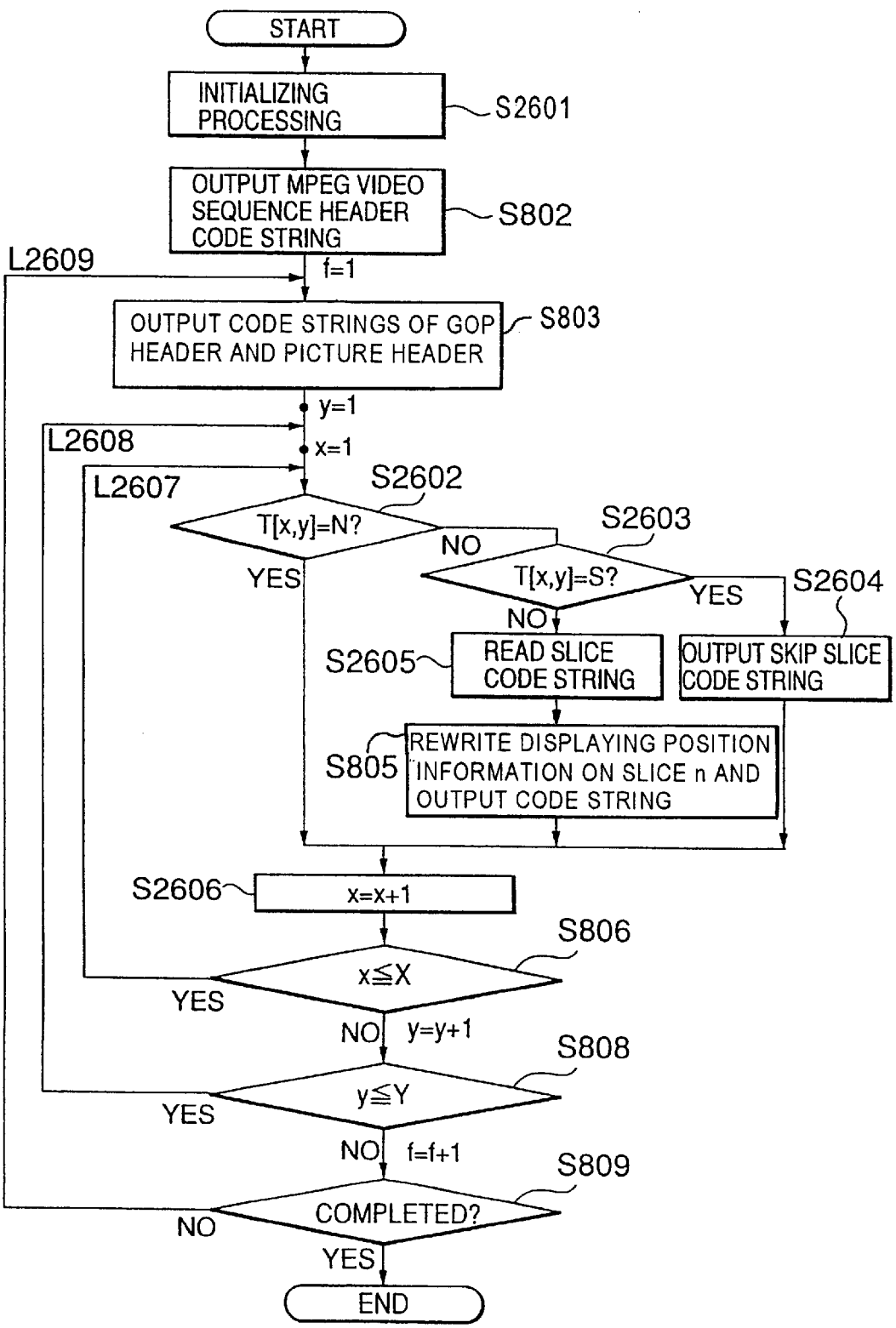
FIG. 26 is an operational flow chart showing an operation of a moving image encoding means in the third embodiment of this invention.

FIG. 26 shows an operational flow to be conducted until the moving image composing means 2503 combines encoded thumbnail moving images with different image sizes into a multi-image combined moving image and outputs an MPEG code string thereof.

In FIG. 26, the operational flow starts at a step 2601 to draw up a layout table as the initializing processing for the multi-image combination, then followed buy a step 2602 to check whether the composition processing is conducted or not when the counter values assume x and y, and further followed by a step 2603 to check whether a skip macroblock code string is outputted or not when the counter values assume x and y. Thereafter, the operational flow advances to a step 2604 to output a skip slice code string, and proceeds to a step 2605 to read a slice code string from an encoded thumbnail moving image expressed with a layout table T[x, y], and further goes to a step 2606 to increment the loop counter value x by one.

Figures 27, 28:
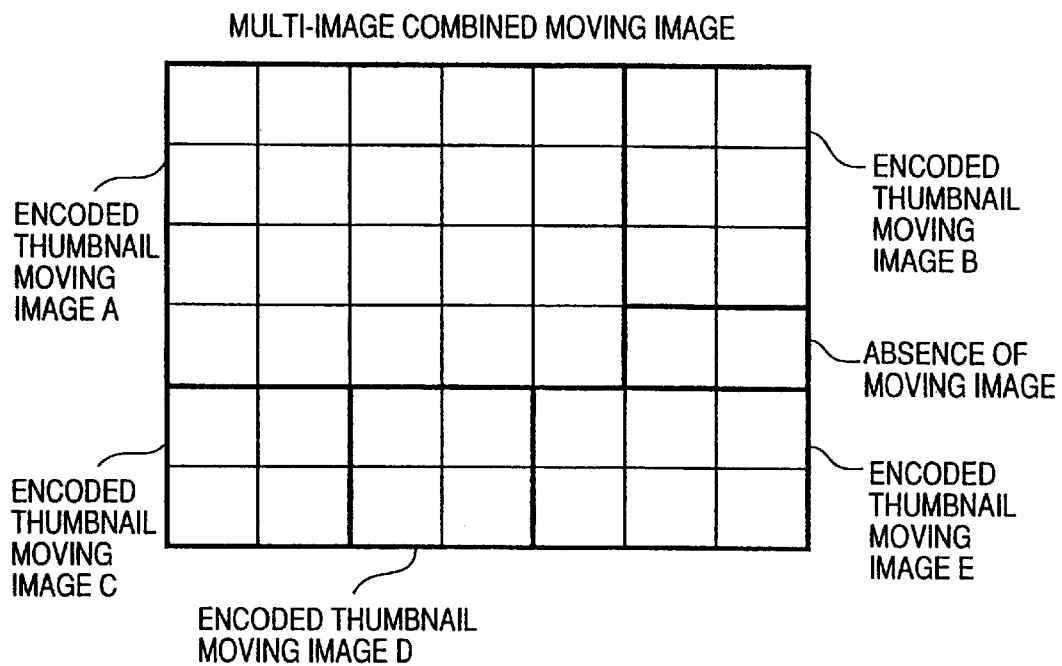
FIG. 27 is an illustration of an example of a multi-image arrangement in the third embodiment of this invention.
FIG. 28 is an illustration of an example of initialization of a two-dimensional array variable V in the third embodiment of this invention.

FIG. 27 is an illustration of an example of a multi-image raster composed of encoded thumbnail moving images with different image sizes in this embodiment. In this instance, a description will be made on the assumption that the moving image listing means 209 issues a request to the moving image composing means 2503 for the composition of a multi-image combined moving image shown in FIG. 27. In FIG. 27, the image size of each of the encoded thumbnail moving images is determined by arranging macroblocks by the following numbers in the vertical and horizontal directions (the size of a common macroblock is 16 pixels*16 pixels).

encoded thumbnail moving image A: (5, 4)
encoded thumbnail moving image B: (2, 3)
encoded thumbnail moving image C: (2, 2)
encoded thumbnail moving image D: (2, 2)
encoded thumbnail moving image E: (3, 2)

Let it be assumed that, as described in the first embodiment, each of the encoded thumbnail moving images is made in the moving image encoding means 204 and accumulated in the accumulating means 206.

In response to a request for the multi-image combination shown in FIG. 27, in the step 2601, the moving image composing means 2501 performs the following initializing processing through the use of the layout table making means 2502. That is, a variable X representative of the number of macroblocks of the multi-image combined moving image in the horizontal direction is set to 7, while a variable Y representative of the number of macroblocks thereof in the vertical direction is set to 6. Further, in terms of each of array elements of the layout table 2501 notated as a two-dimensional array T[x, y] (the first subscript represents a horizontal image area in the case that a multi-image raster is divided in macroblock size into areas, and the second subscript signifies a vertical image area in this case), if an area corresponding to the coordinate (x, y) is an area in which no moving image is displayed, a symbol S is given to that area, and if an area corresponding to the coordinate (x, y) is not the leftmost area of the image areas constituting a multi-image raster, a symbol N is given thereto, while if an area corresponding to the coordinate (x, y) is the leftmost area of the image areas constituting the multi-image raster, the area is taken as a symbol comprising an identification (ID) symbol (identifier) of the corresponding encoded thumbnail moving image and a vertically varying coordinate value which starts from 1 at the uppermost image area, thus accomplishing the initialization.

FIG. 28 is an illustration of the contents of the layout table 2501 to be taken in the case of conducting the multi-image combination shown in FIG. 27. In FIG. 28, the ID symbols used for the aforesaid encoded thumbnail moving images are A, B, C, D and E within the measures, and the vertically varying coordinate values are the numerals within the measures.

Figures 29, 30:
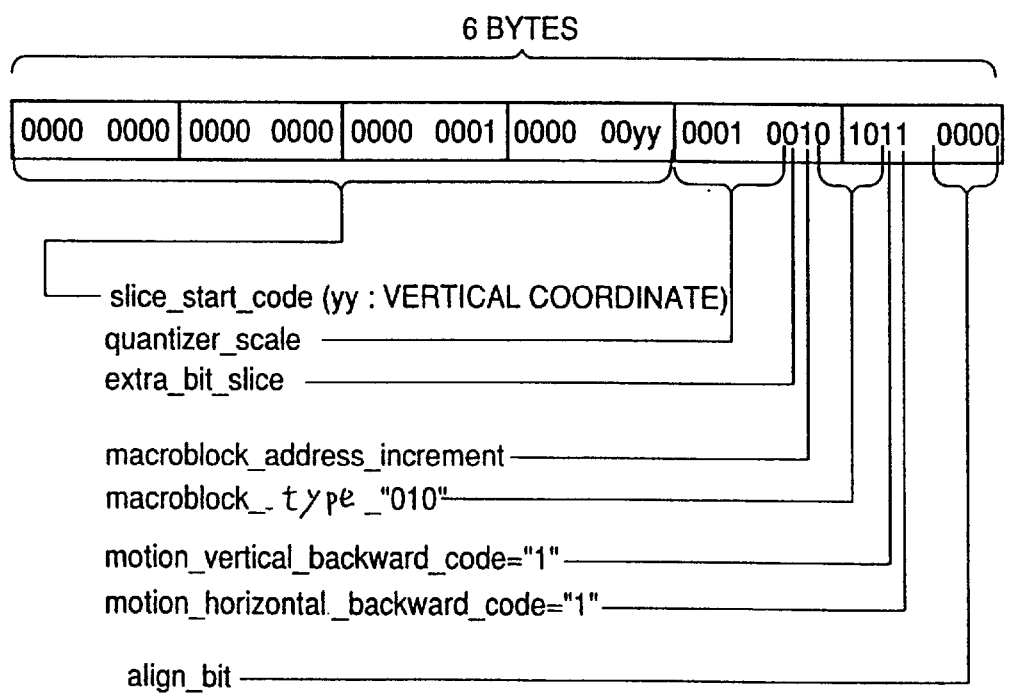
FIG. 29 is an illustration of an example of loop processing in the interior of the moving image composing means according to the second embodiment of this invention.
FIG. 30 is an illustration of a skip slice code string in the third embodiment of this invention.

FIG. 29 is an illustration of the loop processing of loops 2607 and 2608 in the operational flow of FIG. 26 expressed with a C language.

In the step 2602 of FIG. 26, if the value of T[x, y] corresponds to the symbol N, the moving image composing means 2501 conducts no processing. In the step 2603, if the value of T[x, y] corresponds to the symbol S, the moving image composing means 2501 outputs a skip slice code string.

FIG. 30 is an illustration of an example of a slice code string skipping by one macroblock. The moving image composing means 2501 outputs 6 bytes, shown in FIG. 30, as a code string to thereby skip one-macroblock area, which creates an area where no moving image is displayed.

In the step 2605, the identification symbol and vertically varying coordinate value of the encoded thumbnail moving image are obtained on the basis of the symbol the value of T[x, y] represents. The ID symbol of the encoded thumbnail moving image is used for the purpose of identifying the encoded thumbnail moving image within the accumulating means 206, while the vertically varying coordinate value is used as the number given to the slice code string of the encoded thumbnail moving image to be read. In the step 805, the rewriting processing of the displaying position information described in the first embodiment is conducted so that he slice code string read in the step 2605 is displayed at the position of the coordinate (x, y).

Through the repetition of the loops 2607 and 2608, the moving image composing means 2501 successively rewrites slice_start_code and MB_Addr_Inc of the slice code strings read from the encoded thumbnail moving images expressed with T[x, y], and outputs the resultant code strings as a multi-image combined moving image code string.

As described above, according to this embodiment, a moving image composing system comprises the moving image listing means for drawing up a list of a combination and order of multiple images made up of encoded thumbnail moving images with different image sizes, and the moving image composing means including the layout table for, when the multi-image raster is divided in macroblock size into areas, retaining multi-image layout information on the respective areas and the layout table making means for making this layout table, and therefore, the moving image composing means determines, referring to the layout table, the slice code string of the encoded thumbnail moving image to be processed with respect to each of the coordinates on the multi-image raster. The layout table includes information on the position of each of the image areas on the multi-image raster corresponding to each of the coordinates on the multi-image raster and information on the encoded thumbnail moving image to be located at that image area.

Through this process, the moving image composing means 2501 can combine a plurality of encoded thumbnail moving images with different image sizes to provide a multi-image combined moving image code string in which the encoded thumbnail moving images with different image sizes exist mixedly. This offers great practical effects.

(Fourth Embodiment)

A description will further be made hereinbelow of a fourth embodiment of this invention. In the explanation of the fourth embodiment, the same numerals are given to the same parts or sections as those in the above-described embodiments, and the description thereof will be omitted for simplicity.

Figure 31:
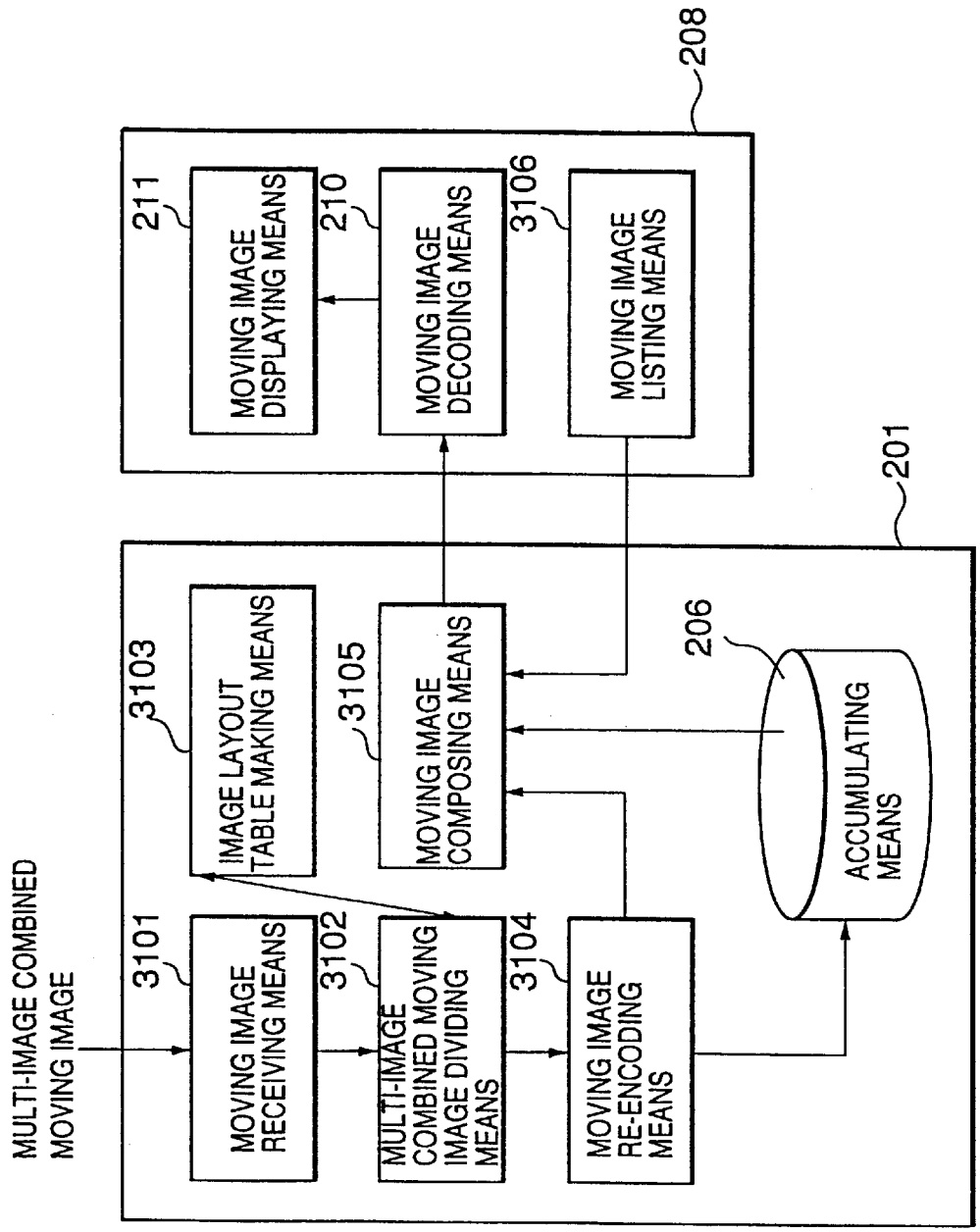
FIG. 31 is a block diagram showing a moving image composing system according to a fourth embodiment of this invention.

FIG. 31 is a block diagram showing a construction of a moving image composing system according to the fourth embodiment of this invention.

In FIG. 31, numeral 3101 represents a moving image receiving means for receiving a multi-image combined moving image code string to hand it over to a moving image composing server 201, numeral 3102 designates a multi-image combined moving image dividing means for extracting a moving image code string of each of image area sections from the received multi-image combined moving image code string, numeral 3103 denotes an image layout table making means for making an image layout table which retains the aforesaid multi-image combined moving image, a size of each of area portions of a multi-image raster and positional information, numeral 3104 depicts a moving image re-encoding means for converting the extracted moving image code strings into code strings (encoded thumbnail moving image) which are allowed to be re-composed within another multi-image raster, numeral 3105 signifies a moving image composing means for combining the re-encoded thumbnail moving images and the encoded thumbnail moving images accumulated in the accumulating means 206 into a multi-image combined moving image code string, and numeral 3106 indicates a moving image listing means for drawing up a list of a combination and order of multiple images to be reconstructed.

First, a description will be made herinbelow of the processing of dividing code strings of image area portions from an inputted multi-image combined moving image code string.

Figure 32:
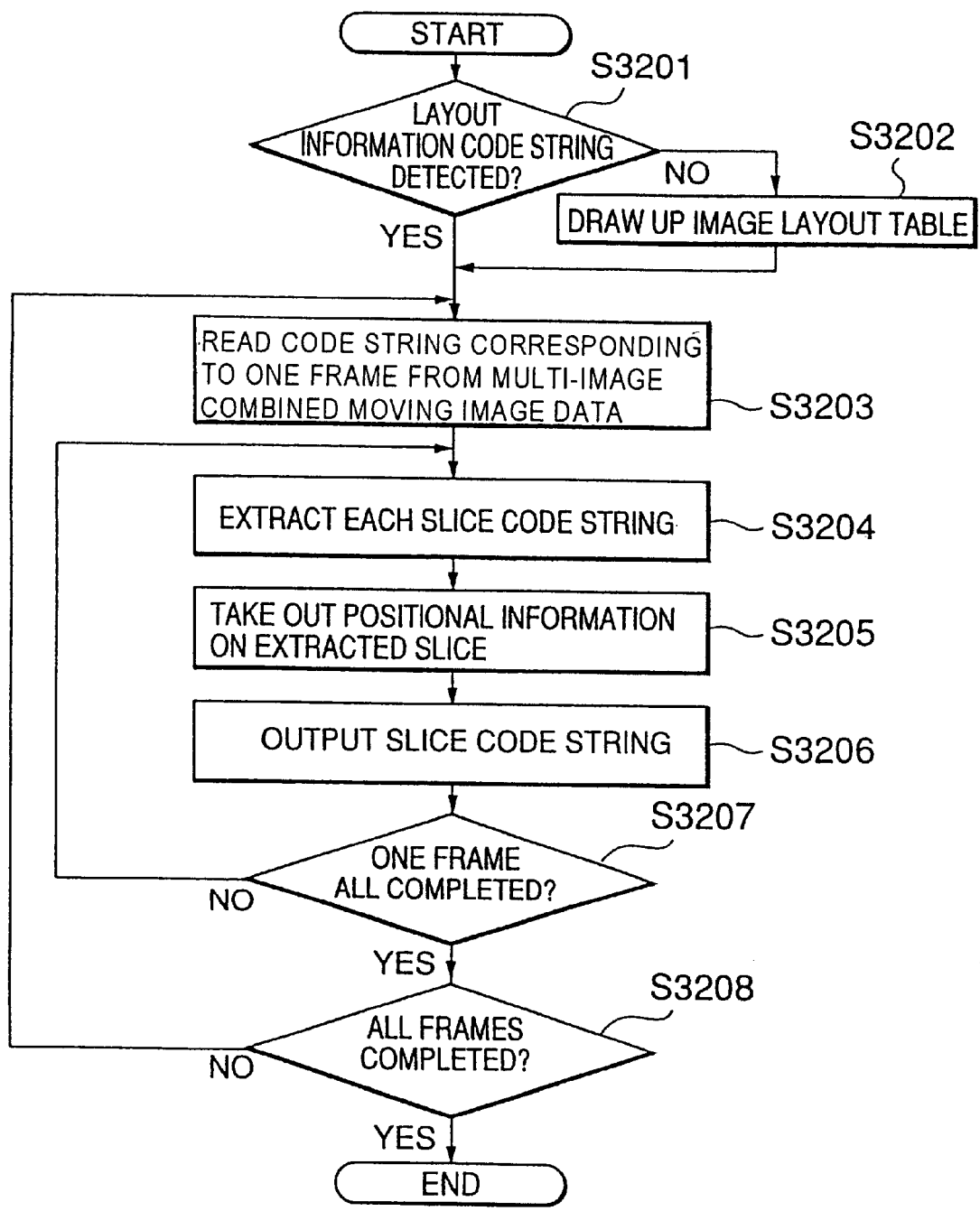
FIG. 32 is an operational flow chart showing an operation of a multi-image combined moving image dividing means in the fourth embodiment of this invention.

FIG. 32 shows an operational flow to be conducted until the multi-image combined moving image dividing means 3102 extracts a moving image code string of each of image area portions constituting a multi-image raster from a multi-image combined moving image code string and outputs the extracted moving image code strings as different moving image code strings.

In FIG. 32, the operational flow begins at a step 3201 to check whether or not layout information indicative of an image configuration (layout) in that multi-image raster is included within a multi-image combined moving image data code string, and then, advances to a step 3202 to draw up an image layout table if the layout information is included therein, and further, proceeds to a step 3203 to read a code string corresponding to one frame from the multi-image combined moving image data code string, and still further, goes to a step 3204 to search slice_start_code (see FIG. 52A) for extracting each of the slice code strings. Subsequently, a step 3205 is implemented to take the positional information on the slice undergoing the extraction, and then followed by a step 3206 to output to the moving image re-encoding means 3104 the extracted slice code string together with the identification symbol ID of the encoded thumbnail moving image, the positional information on the slice in the multi-image raster and the positional information on the slice in each of the image areas. After this, a step 3207 is executed to check whether all the slices in the code string corresponding to one frame are processed or not, and subsequently, a step 3208 is implemented to check whether all the frames of the inputted multi-image combined moving image data are processed or not.

FIG. 33 is an illustration of a format of an image layout table.

In the image layout table of FIG. 33, the size of the inputted multi-image combined moving image data in units of macroblocks is stored in "moving image horizontal size" and "moving image vertical size", the number of image areas constituting a multi-image raster is stored in "number of images", the identification symbol ID of an encoded thumbnail moving image located in the image area m is stored in "identification symbol ID of image m", the coordinate position of the left and upper corner of the image area m is put in "positional information on image m", and the size of the image area m is put in "horizontal size of image m" and "vertical size of image m".

FIG. 34 is an illustration of an example of an image layout table made out when inputted is multi-image combined moving image data having an image configuration shown in FIG. 27. The following description will be made in the case that the inputted multi-image combined moving image data has an image configuration shown in FIG. 27.

The production of an image layout table is made by an image layout table making means, and in the step 3201, a check is made as to whether or not an image layout table encoded is outputted into an extended code area of each of header portions (sequence header, GOP header, picture header) of the multi-image combined moving image data code string or a user data area thereof. If outputted, in the step 3202, that code string is read, thereby drawing up the image layout table.

Besides, for outputting an image layout table into a multi-image combined moving image code string, the moving image composing system for producing and outputting a multi-image combined moving image code string performs processing to output an image layout table into a code string. For instance, the moving image composing means 2503 in the third embodiment converts the layout table shown in FIG. 28 into the image layout table shown in FIG. 34, and encodes and outputs the image layout table.

The extraction of each of slice code strings is accomplished by searching slice__start__code representing the head of the slice. The positional information (information on a position in a multi-image raster) on the extracted slice code string is obtained as follows in the step 3205.

horizontal position=value of MB__Addr__Inc of head macroblock vertical position=value of fourth byte of slice__start__code The multi-image combined moving image dividing means 3102 obtains the identification symbol ID of an encoded thumbnail moving image and the positional information on a slice in each of image areas on the basis of the image layout table and the positional information on slice code strings in a multi-image raster, and outputs them to the moving image re-encoding means 3103.

Figure 35:
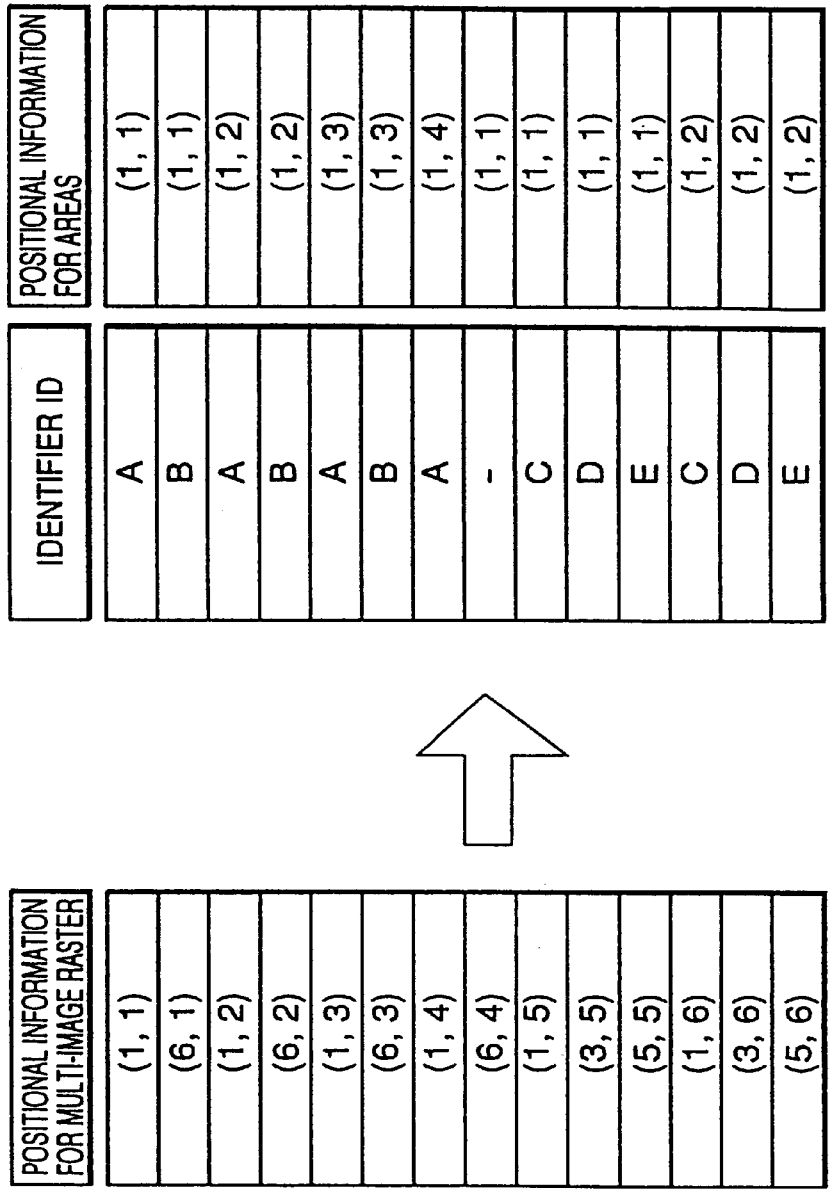
FIG. 35 is an illustration of an example of the progress of an operation of the multi-image combined moving image dividing means in the fourth embodiment of this invention.

FIG. 35 shows identification symbols ID of encoded thumbnail moving images and positional information on slices in each of image areas, obtained from the examples of the image layout table and positional information shown in FIG. 34. In FIG. 35, they are arranged in the order processed in the operational flow shown in FIG. 32.

A description will be given hereinbelow of the processing of converting a slice code string, divisionally extracted by the multi-image combined moving image dividing means 3102, into a code string to be re-combined in a different multi-image raster.

Figure 36A:
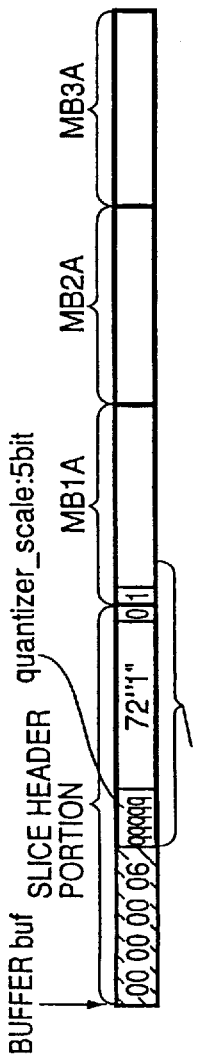
FIG. 36 consisting of FIGS. 36A to 36D, is an illustration of an example of slice code string conversion processing by a moving image re-encoding means in the fourth embodiment of this invention.

FIG. 36 is an illustration of an example in which the moving image re-encoding means 3104 converts a slice code string into a code string to be re-combined in a different multi-image raster on the basis of a slice code string, positional information on a multi-image raster and positional information on each image area handed over by the multi-image combined moving image dividing means 3102. In this instance, the values the moving image re-encoding means 3104 receives from the multi-image combined moving image dividing means 3102 are as follows.

slice code string: code strings shown in FIG. 36A and FIG. 20B of FIG. 36 positional information on multi-image raster: (5, 6)

positional information on image area: (1, 2)

identification symbol ID: E

In other words, FIG. 36 shows the conversion of the second slice code string of the encoded thumbnail moving image E disposed at the coordinate (5, 6) in the multi-image combined moving image shown in FIG. 27.

Figure 36B:
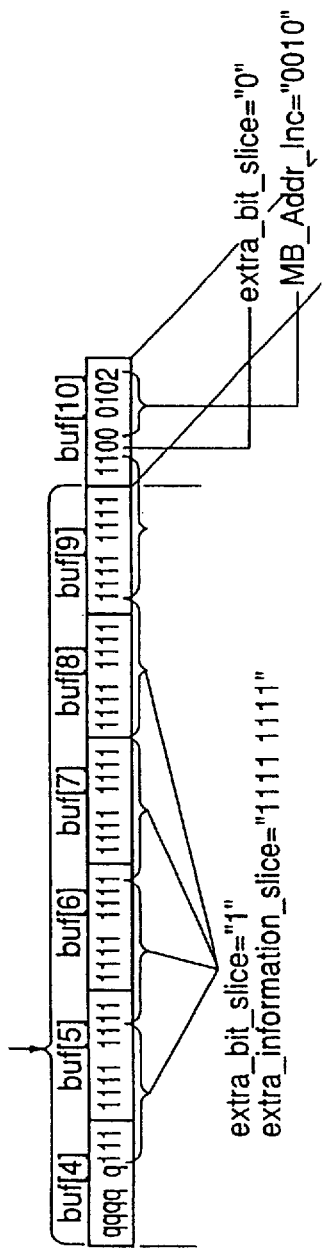

In FIG. 36, the section FIG. 36A shows a slice code string handed over by the multi-image combined moving image dividing means 3102, while the section FIG. 36B of FIG. 36 illustrates a detail construction in units of bits. Since the vertical position information on the slice code string is stored in the fourth byte of slice__start__code, that is, buf[3], the substitution processing for buf[3]=2 is made in order to set the value of buf[3] to the vertical position "2" indicated with the positional information on the image area.

Figure 36C:
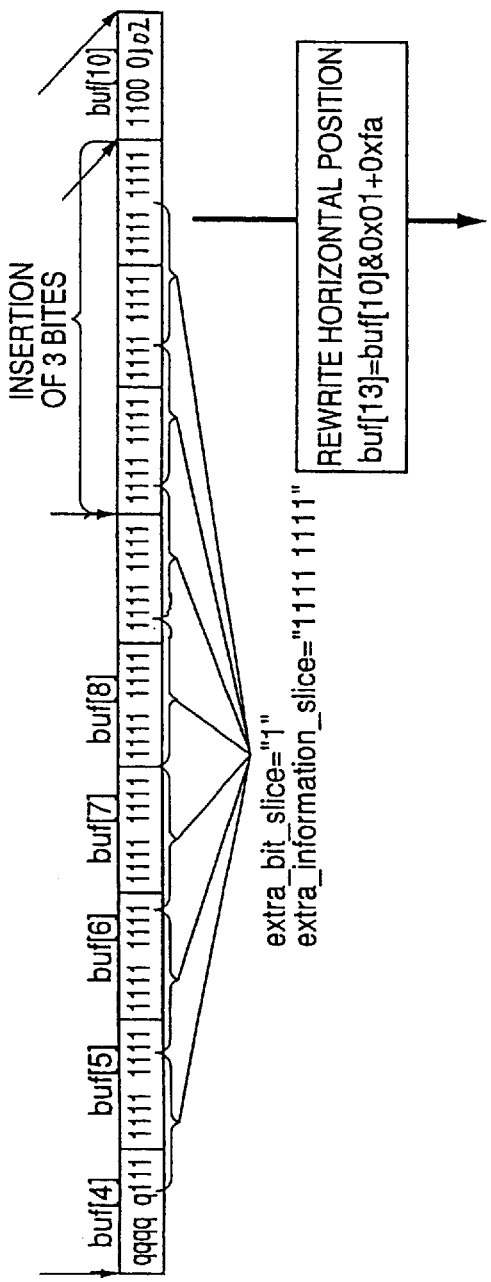
Figure 36D:
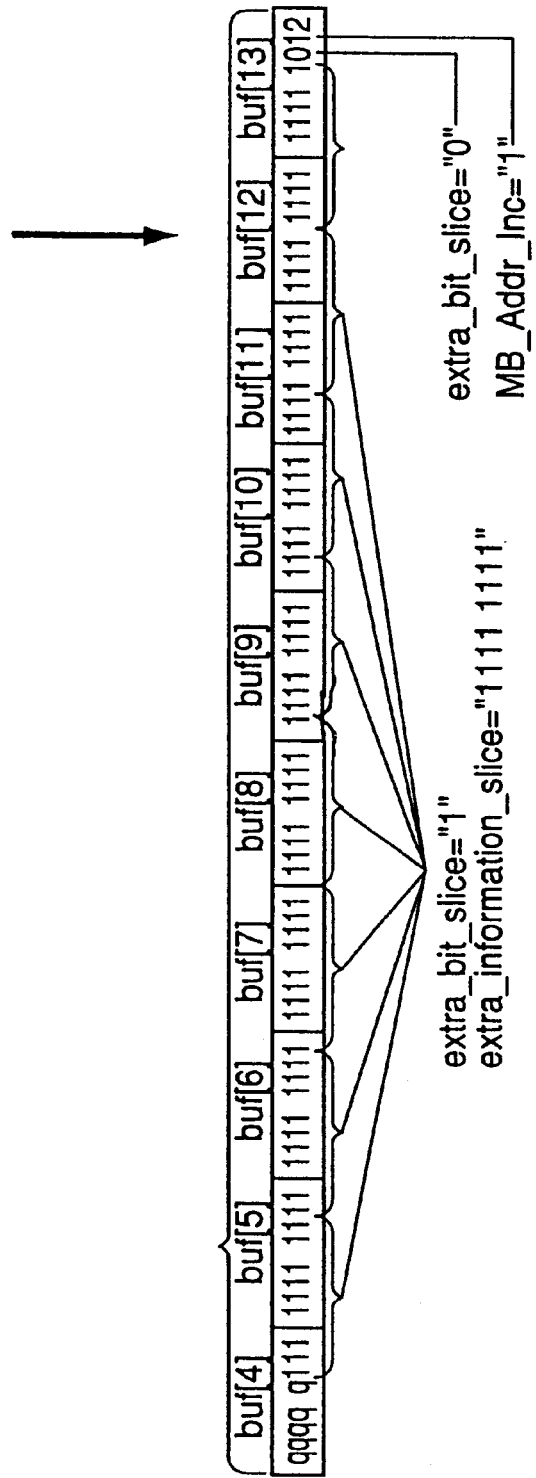

Furthermore, although the horizontal position of the slice code string is required to be rewritten from 5 to 1, because of being a variable-length code bit MB__Addr__Inc portion, if expressing as a variable-length code, the horizontal position 5 is "0010", and the horizontal position 1 is "1" in variable-length code. Accordingly, although 3 bits are left in the MB__Addr__Inc portion when the horizontal position is rewritten from 5 to 1, these bits are absorbed in a manner that 3 padding bytes are inserted as shown in FIG. 36C of FIG. 36. Further, as shown in FIGS. 36C and 36D of FIG. 36, the rewriting operation is made to set the horizontal position to 1.

The slice code string that the slice position information is rewritten in this way is sent as a code string of the encoded thumbnail moving image E, which can be combined in units of slices, to the accumulating means 206 or directly to the moving image composing means 3104 to be used for the composition of a multi-image combined moving image.

As described above, according to this embodiment, there is provided a moving image composing system comprising the moving image receiving means for receiving a multi-image combined moving image, the multi-image combined moving image dividing means for extracting a slice code string of each of image area portions from the received multi-image combined moving image code string, the image layout table making means for drawing up an image layout table retaining a size of each of the image areas of a multi-image raster and positional information in corresponding relation, the moving image re-encoding means for converting the slice code string into a slice code string which can be combined in a different multi-image raster, and the moving image composing means for recombining the re-encoded slice code strings to produce a multi-image combined moving image code string with a different image configuration, wherein the moving image dividing means fetches positional information from the header portion of the extracted slice code string and refers to the image layout table on the basis of this positional information to take out the identification symbol ID of the corresponding encoded thumbnail moving image and the positional information on each of the image areas thereof, and receiving this taken results, the moving image re-encoding means converts the positional information on the slice code string from information on the multi-image raster into information on each image area so that the slice code string is converted into a code string which is allowed to be combined in a different multi-image raster.

Through the above-described process, it is possible to re-construct a multi-image combined moving image into a multi-image combined moving image with a different image configuration. Particularly, since the moving image re-encoding means 3103 outputs a slice code string identical in format with that of an encoded thumbnail moving image to be outputted from the moving image encoding means 204 described in the first embodiment, the slice code string outputted can be re-combined in units of slices in the moving image composing means, which offers a great effect.

(Fifth Embodiment)

A description will be made hereinbelow of a fifth embodiment of this invention. In the explanation of the fifth embodiment, the same numerals are given to the same parts or sections as those in the above-described embodiments, and the description thereof will be omitted for simplicity.

FIG. 37 is a block diagram showing a construction of a moving image composing system according to the fifth embodiment of this invention.

In FIG. 37, numeral 4101 designates an image encoding means for conducting the encoding processing of an inputted image on the basis of an image encoding format, numeral 4102 denotes an accumulating means for storing and accumulating the encoded images, numeral 4103 depicts an image composing means for receiving at least one encoded image to produce a multi-image combined image stream, and numeral 4104 signifies an image decoding means for decoding the multi-image combined image stream to produce and display a multi-image combined image.

Secondly, a description will be give hereinbelow of an operation of the moving image composing system according to this embodiment.

In this embodiment, since an example of an MPEG format is used as the inputted image encoding format, the image encoding means 4101 is the same as the moving image encoding means 204 according to the above-described first embodiment, and hence, its internal operation is the same as that described in the first embodiment. That is, the inputted image is a thumbnail image and the encoded moving image is an encoded thumbnail moving image.

Accordingly, the image encoding means 4101 outputs, to the accumulating means 4102, an image compression-encoded according to an MPEG format as described in the first embodiment.

The accumulating means 4102 is the same as that of the accumulating means 205 in the first embodiment, and its internal operation is as described. In addition, this accumulating means 4102 stores and accumulates the encoded images and, at this time, allocates a singly distinguishable image ID for each of the encoded images for the accumulation management. In FIG. 10A, 5 encoded images are accumulated, and the image IDs A, B, C, D and E are given to the encoded images, respectively, for the accumulation management. A given encoded image can be fetched from the accumulating means on the basis of the image ID designated. Each of the encoded images has a construction equal to that of the encoded thumbnail image shown in FIG. 6.

The image composing means 4103 takes out at least one encoded image from the accumulating means 4102 and conducts the image combining processing thereof to produce and outputs a multi-image combined image stream. Incidentally, in this embodiment, the image composing means is identical in structure with the moving image composing means 207 in the first embodiment, and its internal operation is as described above.

A description of this embodiment will be made in the case of producing a multi-image combined image shown in FIG. 38. That is, the image composing means 4103 composes a multi-image combined image in a manner that each of the encoded images stored in the accumulating means 4102 is displayed in each of a total of four areas obtained by dividing a multi-image raster into two in the vertical direction and two in the horizontal direction.

Figure 38:
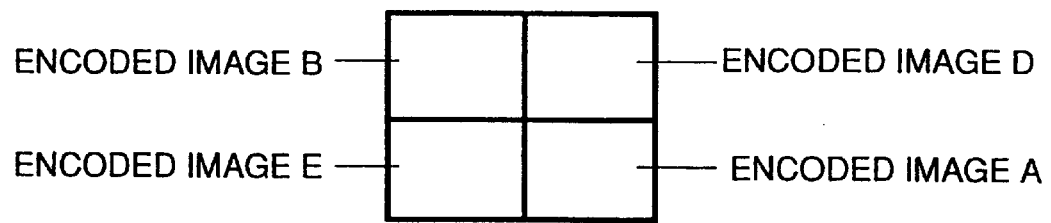
FIG. 38 is an illustration of an example of a multi-image combined image in the fifth embodiment of this invention.

For displaying the multi-image combined image shown in FIG. 38, the multi-image combined image stream to be outputted from the image composing means 4103 must be a code string sequence, for example, shown in FIG. 39. For this reason, the image composing means 4103 conducts the code string producing processing shown in FIG. 39 through the steps shown in FIG. 3. A multi-image combined image stream produced through this code string producing processing shows a correct code string as the MPEG format, so that the MPEG reproduction becomes possible in the image decoding means 4104.

The above-described construction of the moving image composing system allows the information value to be changed without the need for an extremely large amount of processing such as the bit shift operation in connection with the code length variation of the information occurring due to the change of the information value defined as a variable-length code, which contributes to the speed-up of the multi-image combined image stream.

Furthermore, in this case, since the code string sequence of the multi-image combined image stream produced by the image composing means 4103 is correct as the MPEG format, the reproduction and display become feasible in the image decoding means 4104 for decoding the MPEG code string, or an image decoding unit (generally called MPEG decoder).

In this embodiment, the image to be inputted to the image encoding means can be either a static picture or a moving image. In the case of the still picture, the processing in this embodiment is equivalent to the case that the inputted image is only one frame in the portion to be processed on frame levels (see the operation of the image encoding means in the first embodiment).

Furthermore, it is also acceptable that the inputted image is encoded in advance through the use of some image encoding format. In this case, the image encoding means 4101 performs the converting processing of the image encoding format with respect to the inputted image.

Still further, in this embodiment, although the MPEG format is used as the image encoding format for the inputted image and the multi-image combined image stream, in terms of the image encoding format standards, this invention is applicable to all the image encoding formats each having information defined as a variable-length code.

Still further, in the description of this embodiment, although the basic operation unit length in the image composing means for rewriting the information defined as a variable-length code is 8 bits (which are currently and generally referred to as one byte), it is also possible to employ an arbitrary basic unit length not less than 1.

Still further, in the example of this embodiment, although the horizontal position information is used as the information to be rewritten, in terms of the image encoding format standards, it is also possible to use any information defined as a variable-length code. In addition, it is also acceptable that a plurality of information are changed at a time.

Moreover, in this embodiment, although a combination of extra_bit_slice and extra_information_slice is used as an extended code string to be used when supplying wanted bits, it is also appropriate that a portion defined as a code string which does not affect the image in the image encoding format or which hardly has influence thereon is outputted in advance into the encoded image.

(Sixth Embodiment)

A description will be given hereinbelow of a sixth embodiment of this invention. In the explanation of the sixth embodiment, the same numerals are given to the same parts or sections as those in the above-described embodiments, and the description thereof will be omitted for simplicity.

Figure 40:
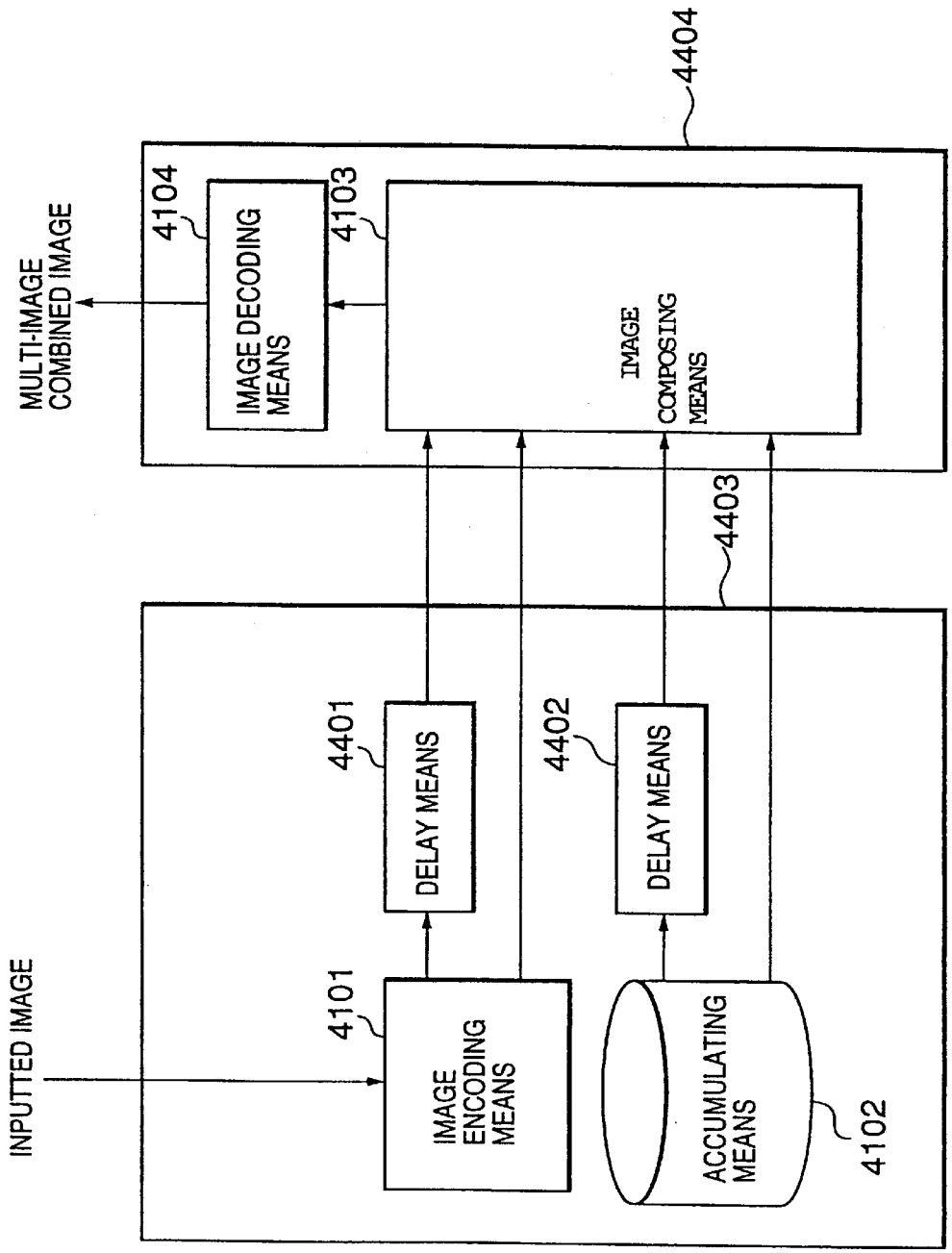
FIG. 40 is a block diagram showing a construction of a moving image composing system according to a sixth embodiment of this invention.

FIG. 40 is a block diagram showing a construction of a moving image composing system according to this embodiment.

In FIG. 40, numerals 4401 and 4402 denote delay means for temporarily or long accumulating inputted data, retaining it or conducting some processing therefor, and then outputting it, numeral 4103 depicts a composition server for accumulating and managing encoded images, and numeral 4104 signifies a reproduction terminal for conducting the processing for the composition of a multi-image combined image stream and further for reproducing and displaying the resultant.

A description will be made hereinbelow of an operation of the moving image composing system according to this embodiment.

The delay means 4401 and 4402 output data inputted thereto in a delayed condition through the use of a storage means including a magnetic disk and a memory device, or adjusts the delay time resulting from the frame thinning processing.

In this case, the delay means 4401 (which will be referred hereinafter to as a delay means 1) delays a code string of an encoded image from an image encoding means by a constant time and then outputs it. This delay time can be designated from the external of the delay means 1, and for example, the reproduction terminal 4104 can give an instruction for a delay of 5 seconds. In addition, the delay time is changeable. For example, it is also possible to perform a catch-up reproduction in a manner that the delay time is gradually reduced from the initial state in which the delay time is 10 seconds so that no delay time takes place (the delay time reaches zero) 1 minute after the initial state, and this processing is also included in the processing of the delay means 1.

On the other hand, the delay means 4402 (which will be referred hereinafter to as a delay means 2) outputs a code string at every four frames in connection with the encoded images fetched from the accumulating means 4102 (that is, outputs code strings of frames whose numbers are 1, 5, 9, 13 . . . ). Thus, the encoded image outputted from the delay means 2 is an image whose reproduction rate is increased to four times.

Figure 41:
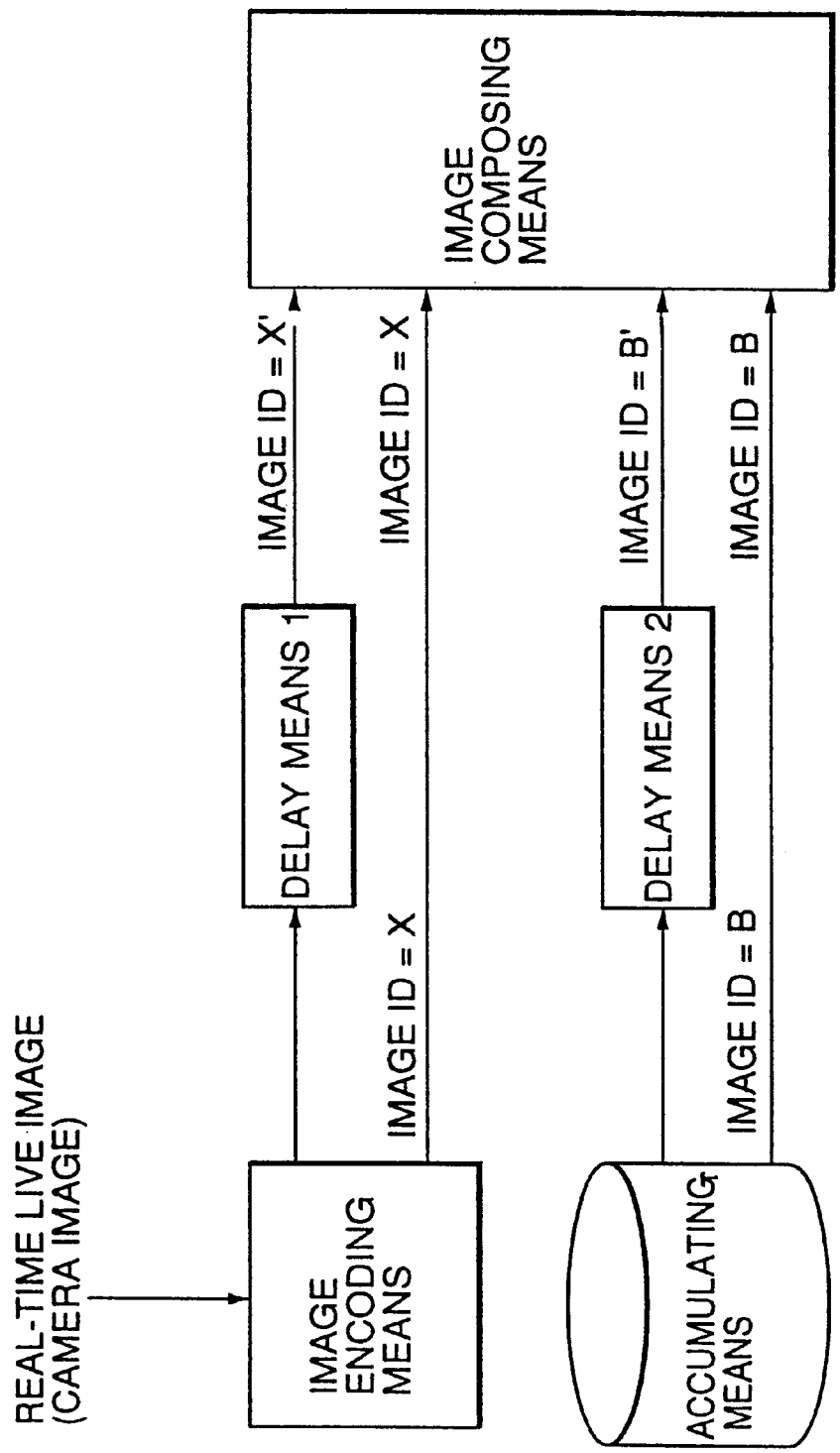
FIG. 41 is an illustration of input paths of encoded images to an image composing means in the sixth embodiment of this invention.

In this embodiment, the image composing means 4103 receives encoded images through four paths as shown in FIG. 41.

In FIG. 41, the image encoding means 4101 receives a real-time live picture from a camera as an inputted image and conducts the MPEG encoding processing thereof to output an encoded image whose image ID is X.

Furthermore, the delay means 1 conducts the change of the image ID in addition to performing, the aforesaid delay processing, and in this instance, changes it to X'. Further, an encoded image whose image ID is B is taken out from the accumulating means 4102. The delay means 2 changes the image ID to B' in addition to conducting the aforesaid delay processing.

Accordingly, the image composing means 4103 performs the combining processing of four encoded images whose image IDs are X, X', B and B'.

As a construction of the moving image composing system, it is also appropriate that, as shown in FIG. 40, the image composing means 4103 is placed on the reproduction terminal 4404 side. At this time, the internal processing of the image composing means 4103 is the same as that in the first embodiment, and the image decoding means 4104 decodes and reproduces the multi-image combined image stream composed by the image composing means 4103.

Figure 42:
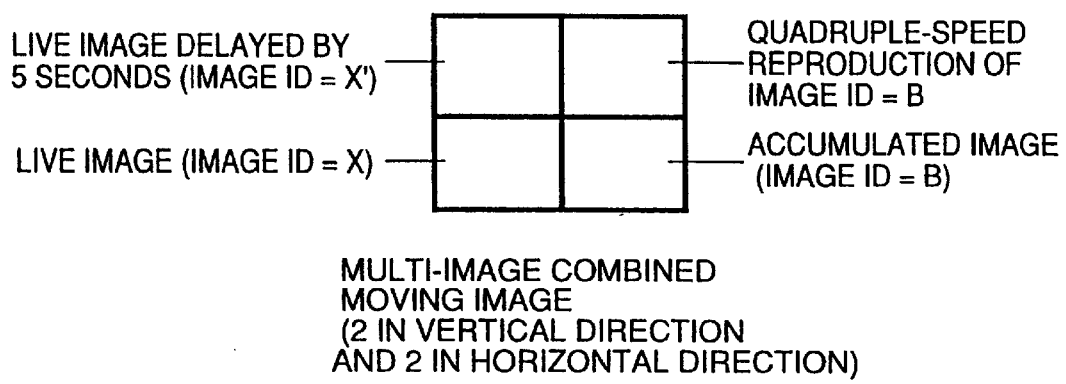
FIG. 42 is an illustration of a reproduced multi-image combined image in the sixth embodiment of this invention.

FIG. 42 is an illustration of an example of a multi-image combined image reproduced according to this embodiment. FIG. 42 shows a reproduced example in the case that various kinds of images such as a live picture, a delayed picture of the live picture, an accumulated image and a speed-changed image of the accumulated image are combined in image areas into a multi-image combined image.

With the above-described construction of the moving image composing system, a multi-image combined image such as a combination of a real-time live picture such as an image coming as an inputted image from a camera and an accumulated image can be displayed, and the delay reproduction of a live picture portion by the delay means is possible while the reproduction and display of a multi-image combined image undergoing the adjustment of the delay time due to the frame thinning processing are feasible.

(Seventh Embodiment)

A description will be made hereinbelow of a seventh embodiment of this invention. In the explanation of the seventh embodiment, the same numerals are given to the same parts or sections as those in the above-described embodiments, and the description thereof will be omitted for simplicity.

Figure 43:
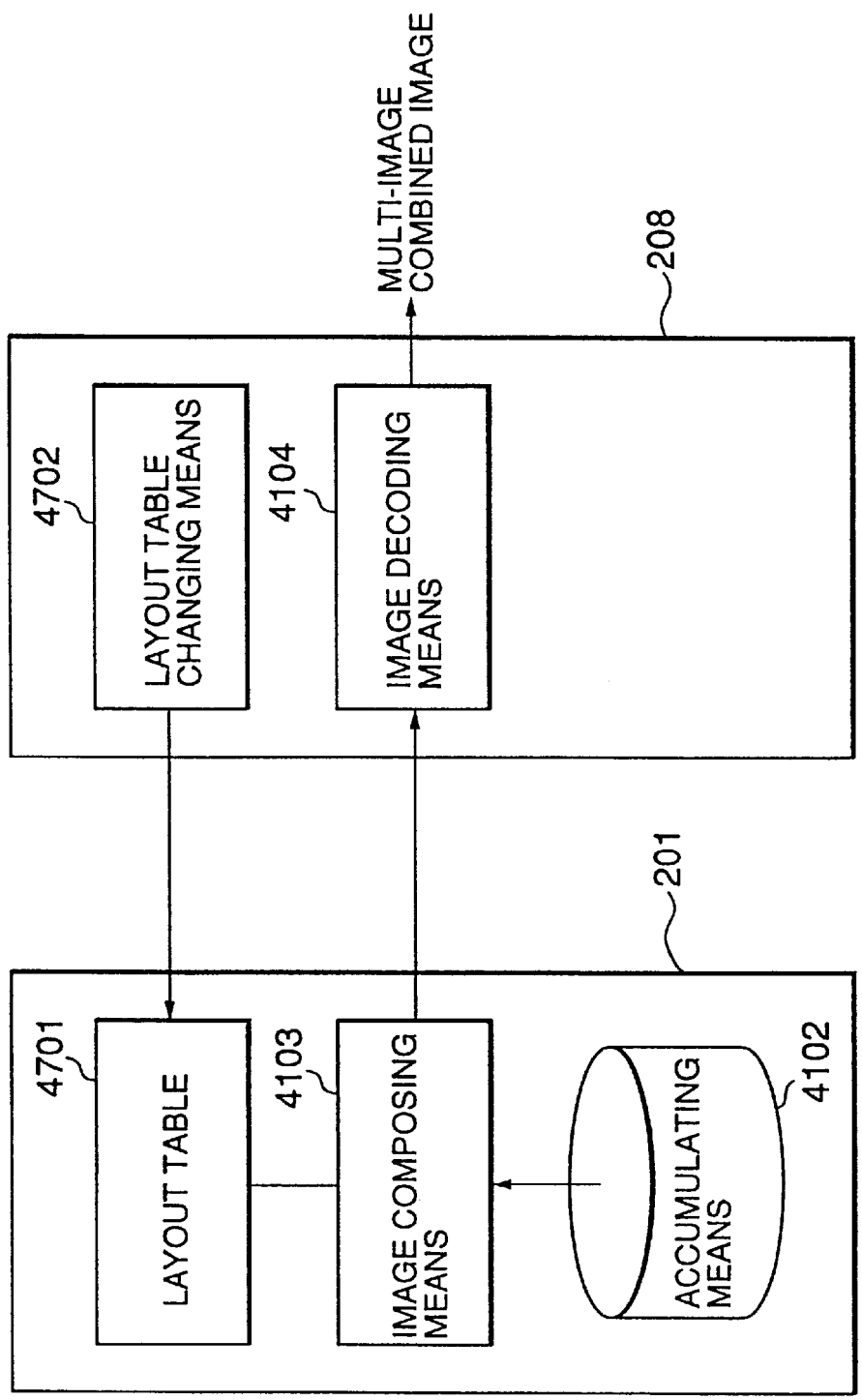
FIG. 43 is a block diagram showing a construction of a moving image composing system according to a seventh embodiment of this invention.

FIG. 43 is a block diagram showing a construction of a moving image composing system according to this embodiment.

In FIG. 43, numeral 4701 represents a layout table for retaining an arrangement of areas as image layout information in the case that an image obtained by the reproduction of a multi-image combined image is divided into more than one areas, and numeral 4702 denotes a layout table changing means for changing the value of multi-image layout information within the layout table.

A description will be made hereinbelow of an operation of the moving image composing system according to this embodiment.

In the explanation of this embodiment, the same parts as those in the third embodiment will be omitted from the description. That is, a thumbnail image is used as an inputted image while an encoded thumbnail moving image is employed as an encoded image. Further, the layout table 4701 is identical with the layout table in the third embodiment, and its structure is the same as described. Still further, the image composing means 4103 is the same as the moving image composing means 2503 in the third embodiment, and its internal operation is the same as described.

FIG. 44 shows an image structure of a multi-image combined image before and after the alternation of the contents of the layout table 4701 by the layout table changing means 4702.

Figure 45:
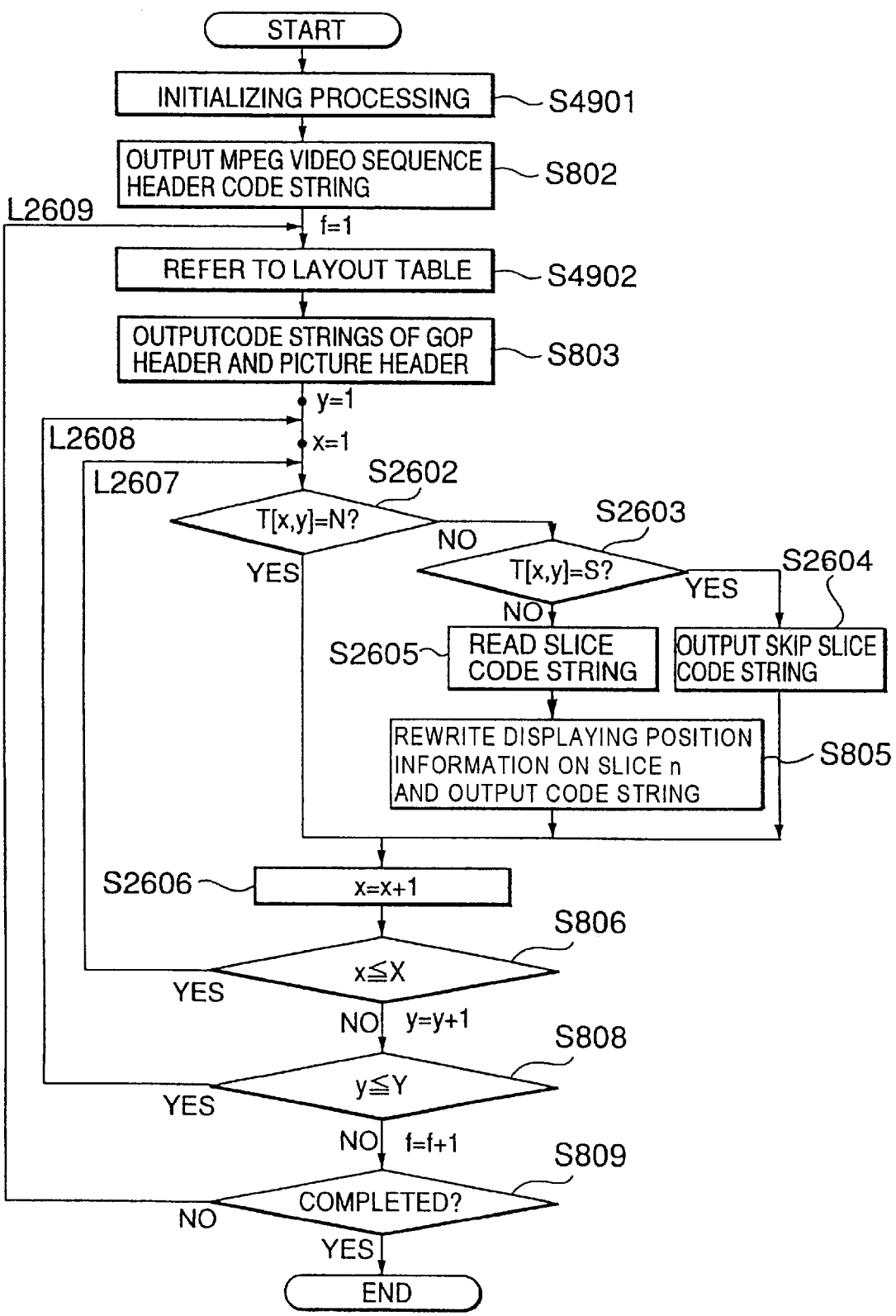
FIG. 45 is an illustration of combining processing among encoded images in an image composing means in the seventh embodiment of this invention.

With this embodiment, as shown in FIG. 44, the image composing means 4103 is capable of producing multi-image combined image streams fully different in image structure from each other. FIG. 45 is an illustration of processing for combination of encoded images by the image composing means 4103.

In FIG. 45, in a step 4901, the initializing processing is conducted like the step 2601 in the third embodiment to draw up a layout table having the image arrangement shown in the upper section of FIG. 44 as the initialized state, and then, in a step 4902, the image composing means 4103 refers to the layout table.

At the time of the start of the processing on frame levels in the multi-image combined image stream producing processing, the image composing means 4103 refers to the layout table at that time (step 4902) to perform the composing processing (step 803 to step 809 in FIG. 45) in accordance with the multi-image layout information within the layout table. Whereupon, the image structure change of the multi-image combined image by the layout table changing means 4702 is done on frame levels.

Thus, the above-described construction of the moving image composing system allows the dynamic change of the disposition of areas in a multi-image combined image, the sizes of the areas, the encoded images to be displayed in the areas and others.

(Eighth Embodiment)

A description will be made hereinbelow of an eighth embodiment of this invention. In the explanation of the seventh embodiment, the same numerals are given to the same parts or sections as those in the above-described embodiments, and the description thereof will be omitted for simplicity.

Figure 46:
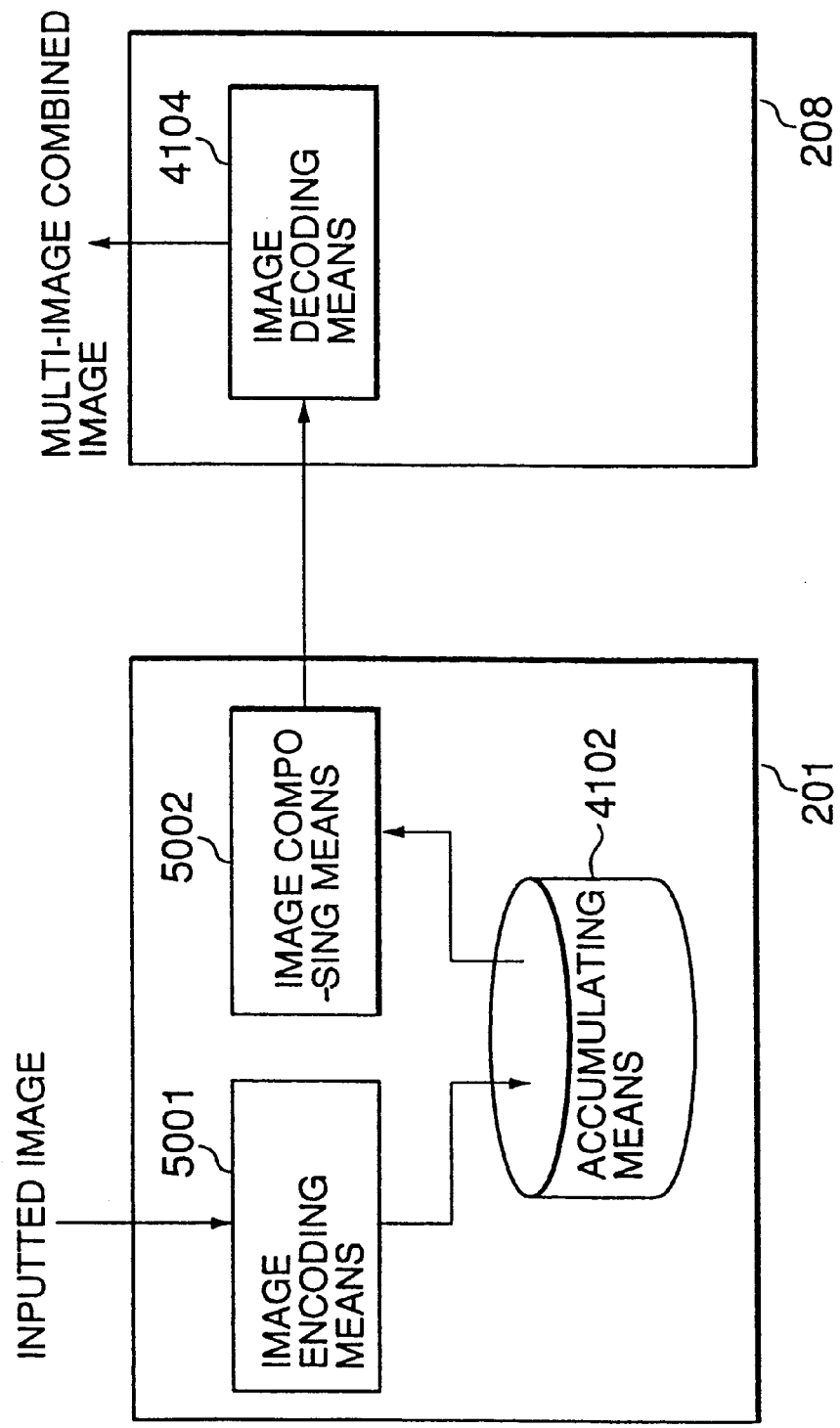
FIG. 46 is a block diagram showing a construction of a moving image composing system according to an eighth embodiment of this invention.

FIG. 46 is a block diagram showing a construction of a moving image composing system according to this embodiment.

In FIG. 46, numeral 5001 designates an image encoding means for performing the encoding processing of an inputted image on the basis of an image encoding format to output an encoded image, and numeral 5002 an image composing means for receiving at least one encoded image to produce a multi-image combined image stream.

Secondly, a description will be taken hereinbelow of an operation of the moving image composing system according to this embodiment.

The description of this embodiment begins at the inputted image encoding processing by the image encoding means 5001.

In this embodiment, the image encoding means 5001 conducts the encoding processing of an image inputted thereto according to an MPEG format, with the encoded image being accumulated in the accumulating means 4102. The MPEG encoding operational flow in the image encoding means 5001 is the same as that in the first embodiment described with reference to FIG. 3. Incidentally, the inputted image in this embodiment is treatable as being the same as the thumbnail moving image in the description using FIG. 3.

Figure 47:
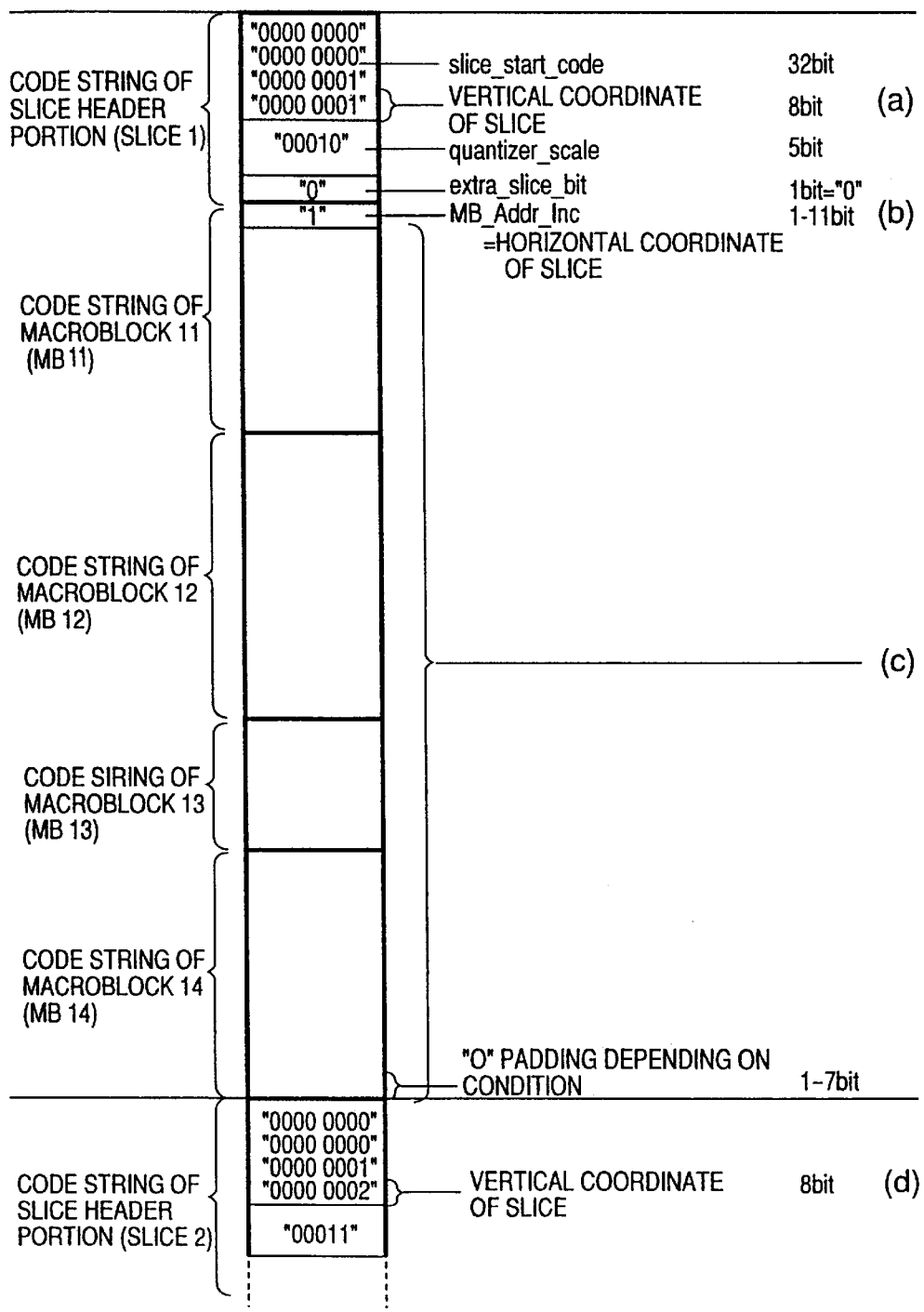
FIG. 47 is an illustration of an example of a code string to be outputted from an image encoding means in the eighth embodiment of this invention.

FIG. 47 is an illustration of an example of a code string in the case that the image encoding means 5001 MPEG-encodes an inputted image to output an encoded image in the steps 303, 305, 306 and 308.

In FIG. 47, the sections (a), (b), (c) and (d) correspond to (a), (c), (d) and (e) in FIG. 5, respectively. Thus, the code string of the encoded image in this embodiment is the same as that produced by a common MPEG encoding means or MPEG encoding unit (generally referred to as an MPEG encoder). Accordingly, a common MPEG encoding means can be used as the image encoding means 5001 in this embodiment.

Figure 48:
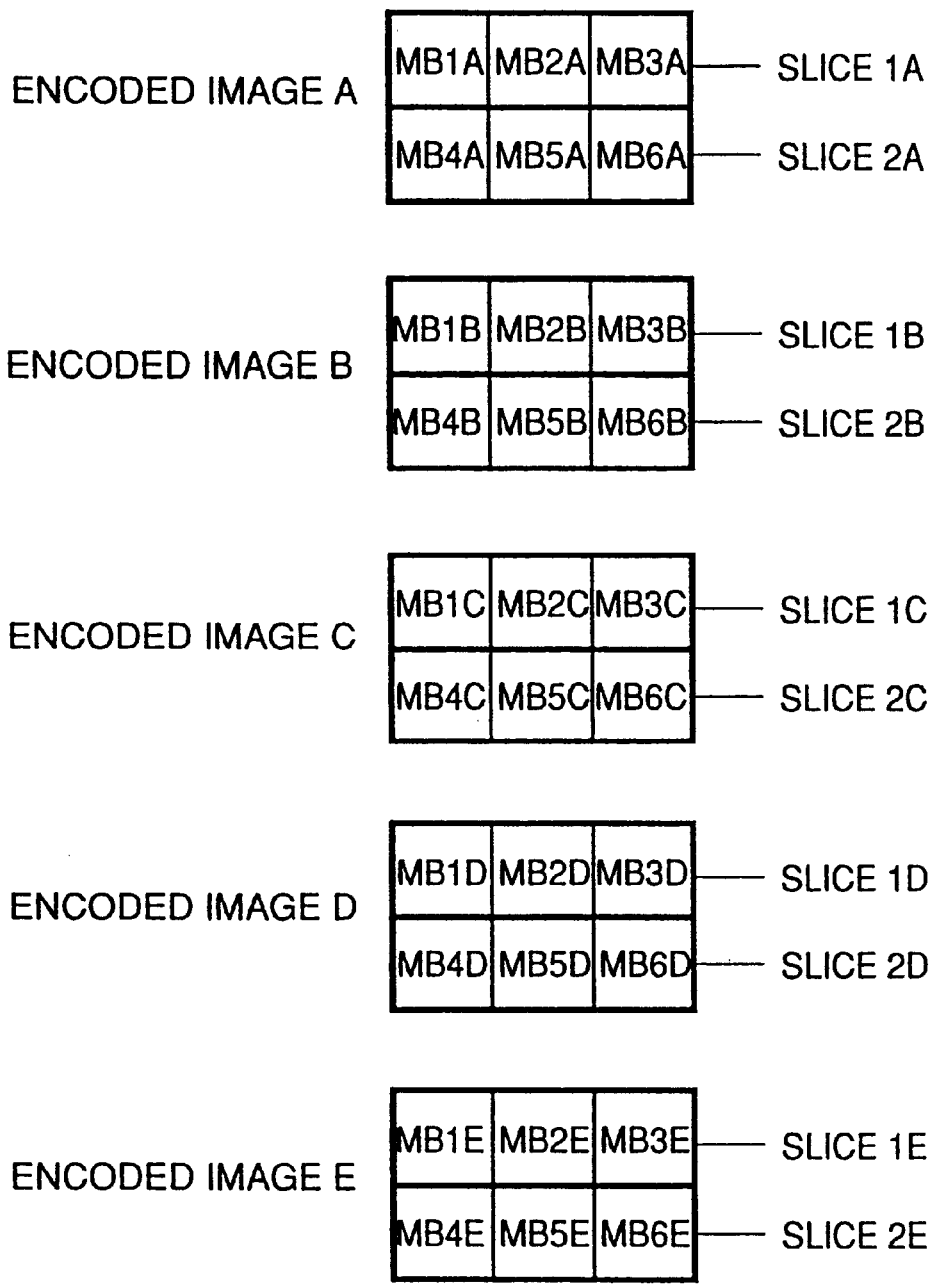
FIG. 48 is an illustration of a list of encoded images accumulated in an accumulating means in the eighth embodiment of this invention.

The encoded image outputted from the image encoding means 5001 is accumulated and managed by the accumulating means 4102. FIG. 48 is an illustration of encoded images accumulated in the accumulating means 4102. In FIG. 48, the encoded images respectively identified with the image IDs A, B, C, D and E are accumulated in the accumulating means 4102. Further, each of the encoded images is horizontally divided into two slices each of which is made up of three macroblocks.

Secondly, a description will be given hereinbelow of rewriting processing of an information value defined with a variable length of an encoded image in this embodiment. The description of this embodiment will be made, for example, in the case of composing such a multi-image combined image as shown in FIG. 38.

The multi-image combined image composing processing is conducted by the image composing means 5002, and its operational flow is the same as that of the first embodiment described with reference to FIG. 8. Incidentally, the encoded image in this embodiment is treatable as being identical with the encoded thumbnail moving image in FIG. 8.

Figure 49A:
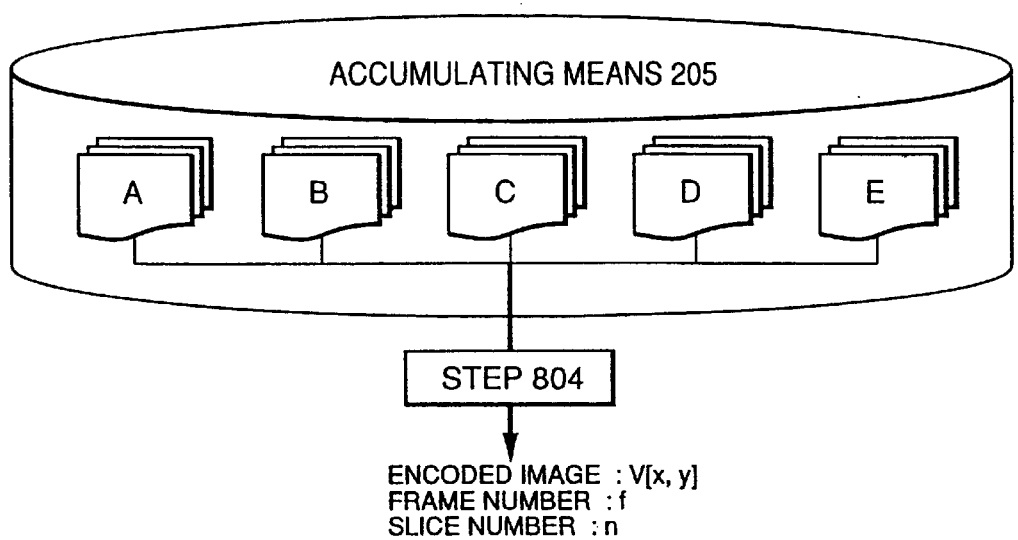
FIGS. 49A and 49B are illustrations of an example of slice code string readout processing from the accumulating means by an image composing means in the eighth embodiment of this invention.
Figure 49B:
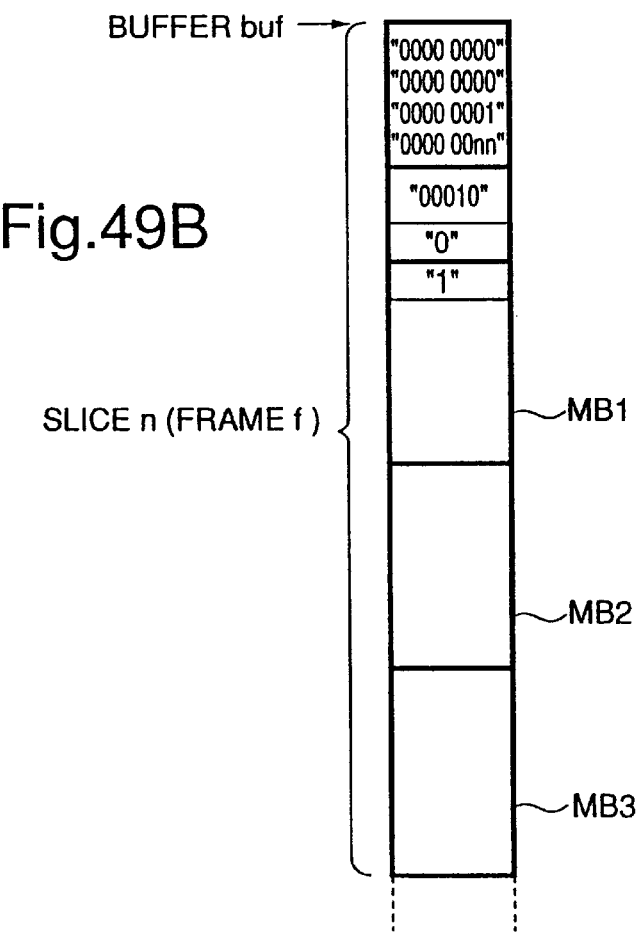

FIGS. 49A and 49B is an illustration of readout processing of a slice code string the image composing means 5002 conducts in the step 804. The slice code string read out is stored in a buffer whose head address is pointed to by a variable Buf.

The image composing means 5002 conducts the rewriting processing of the slice displaying position information as follows in the step 805. The description of the first embodiment made with reference to FIG. 11 applies to the rewriting of the vertical position.

The rewriting processing of the horizontal position information defined as a variable-length code in the step 805 will be described in the case that the value of the horizontal position varies from 1 to 4. In the condition stored in the accumulating means 4102, as shown in FIG. 47, the horizontal position information value of the encoded image is 1, and its code string is "1" being one-bit length. For rewriting this to the horizontal position 4, when being expressed with a variable-length code, the horizontal position 4 becomes "0011" of four-bit length. Accordingly, the lack of the code string of 3 bits occurs.

Figures 50A, 50B:
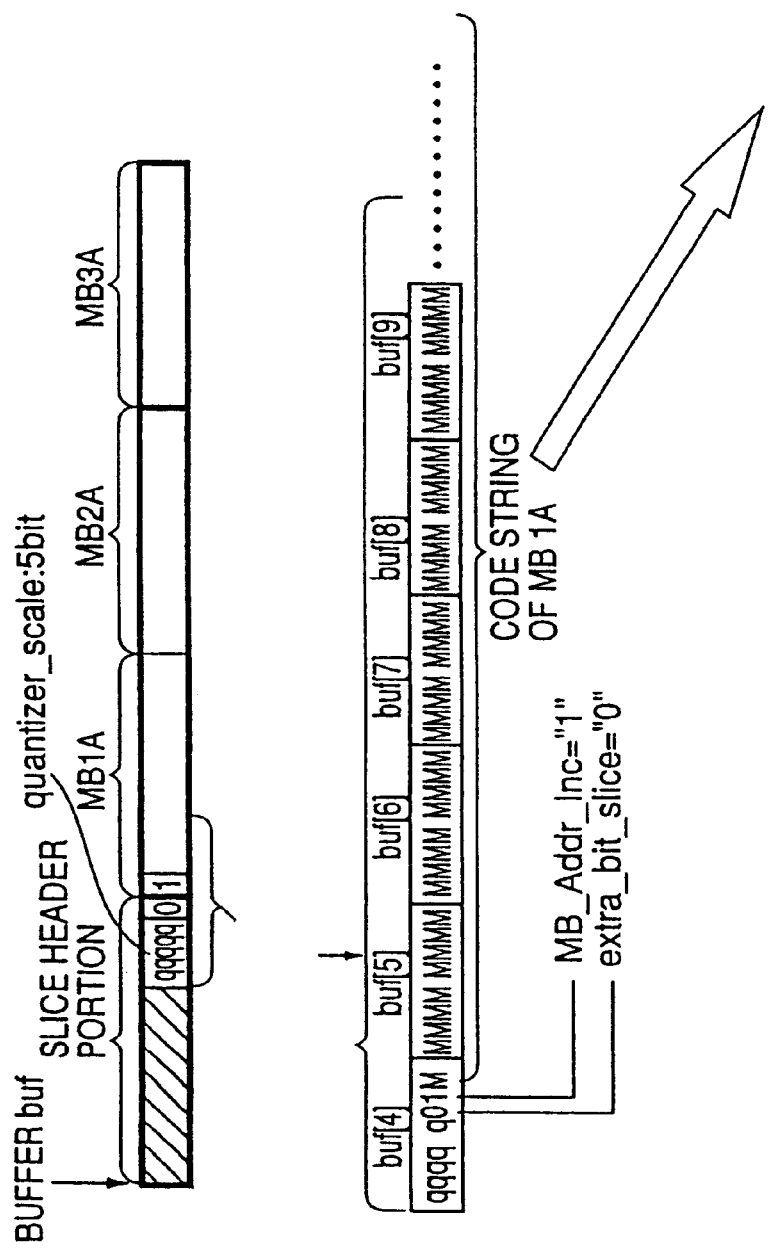
FIG. 50 consisting of FIGS. 50A to 50D, is an illustration of an example of rewriting processing of slice horizontal position information in the eighth embodiment of this invention.
Figures 50C, 50D:
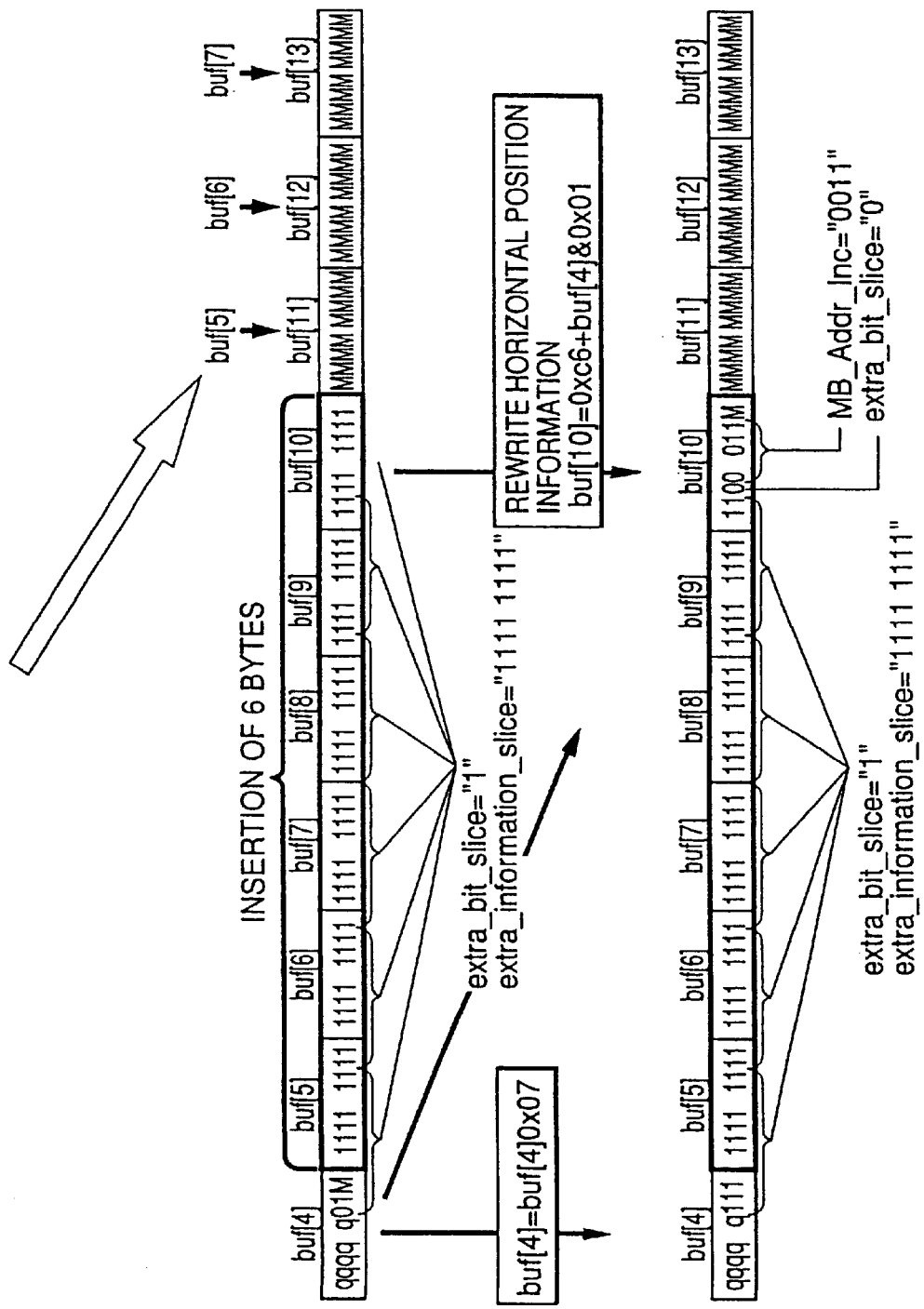
Figure 51:
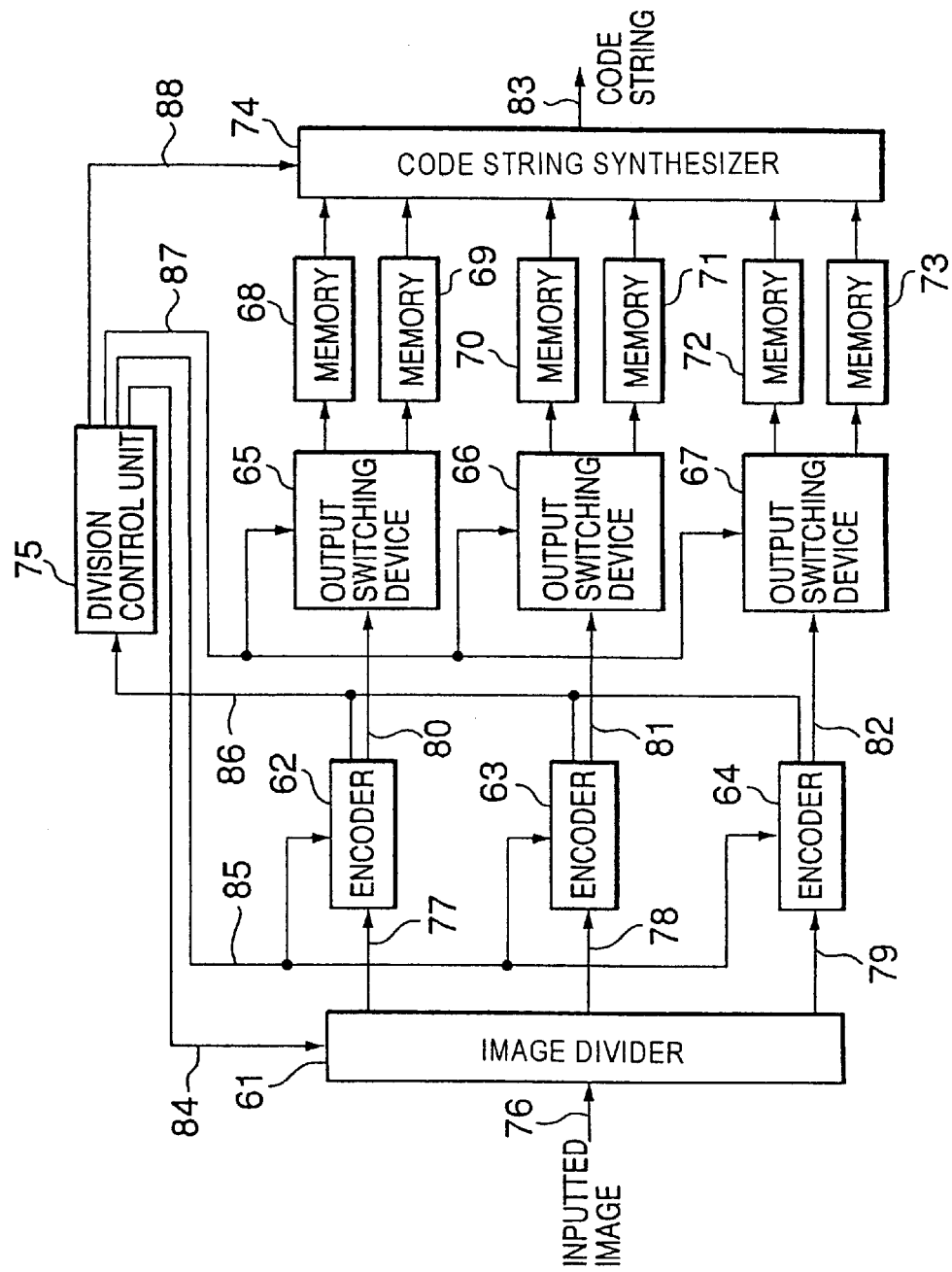
FIG. 51 is a block diagram showing an arrangement for obtaining a code string based on moving image division, identical in syntax with a code string produced with no moving image division in the related art.
Figure 53B:
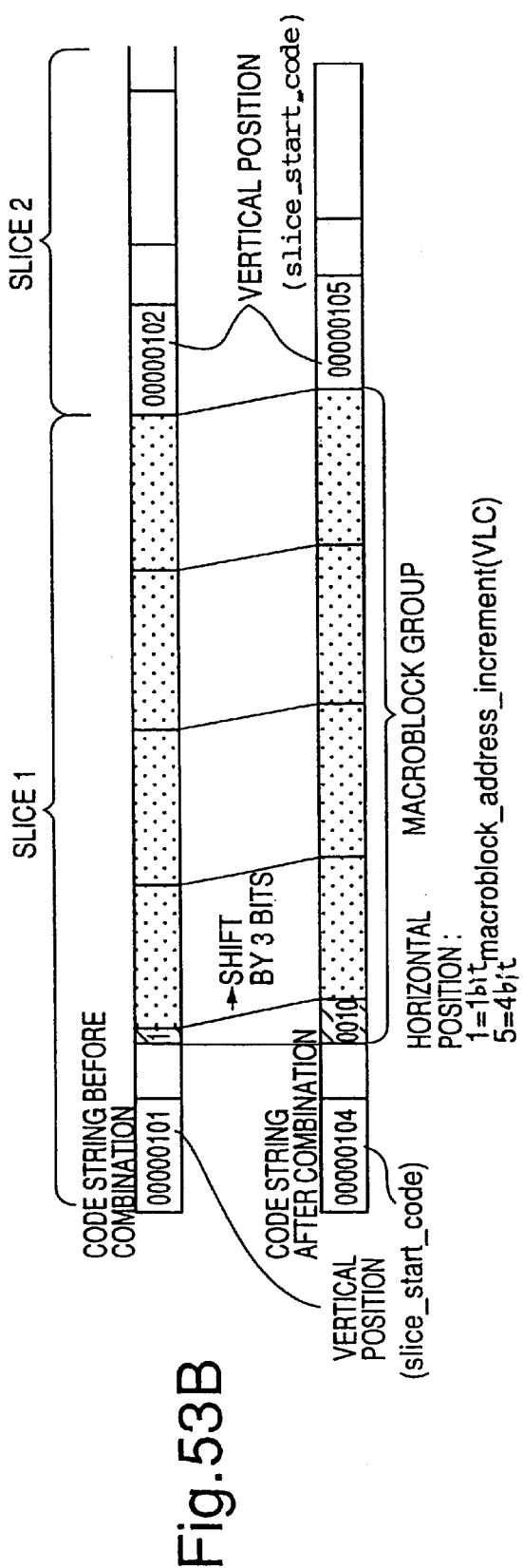
Figure 53C:
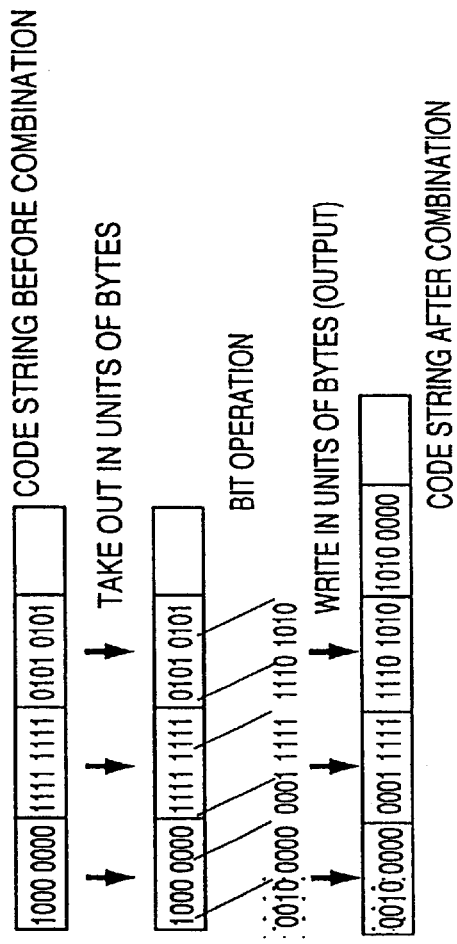

Referring to FIG. 50, a description will be given hereinbelow of a method of supplying a wanted code string and of rewriting the horizontal position information value defined as a variable-length code at a high speed.

In FIG. 50, FIG. 50A shows a state where the code string of a slice 1A is read into a buffer in the step 804, while FIG. 50B is a detailed illustration of the vicinity of a slice header at that time.

First, the image composing means 5002 rewrites the buf[4] portion. In this embodiment, the rewriting is done as buf[4]=buf[4]|0×07.

Following this, 5 bytes, from buf[0] to buf[4], are outputted as a code string of a multi-image combined image stream.

Subsequently, as 6-byte insertion processing, 6 bytes being 0×ff are outputted as a code string of the same multi-image combined image stream.

Finally, after the rewriting processing of the horizontal position information is done as buf[10]=0×c6+(buf[4] & 0×01), all the slice code strings succeeding buf[10] are outputted as code strings of the multi-image combined image stream.

Incidentally, strictly speaking, since the value of buf[4] is referred to at the rewriting processing of the horizontal position information, there is a need to temporarily store the value of buf[4] in a variable at the first rewriting of buf[4].

Through the above-described processing, the rewriting of the information value defined as a variable-length code can be completed by only making simple calculation several times. Accordingly, coping with the code length variation of the information occurring due to the variation of the information value defined as a variable-length code, the change of the information value is made possible without requiring an extremely large amount of processing such as bit shift operation, which greatly contributes to the speed-up of the multi-image combined image producing processing.

In addition, since the image encoding means for producing an encoded image to be inputted to the image composing means is not required to conduct particular processing for realizing the aforesaid speed-up, it is possible to use a general image encoding means which performs the encoding processing on the basis of the aforesaid image encoding format, and further to promote the speed-up of the combining processing among common encoded images based upon the aforesaid image encoding format.

As described above, according to this invention, in the moving image composition or combination, because of taking the order of the reduction of moving images taken, the encoding, (the accumulation), the composition and the decoding, as compared with the prior method in which the composition (the arrangement for display) is made after the decoding so that the decoding processing is needed by the images to be combined, when the decoding processing is conducted once after the composition, the decoding is completed, and therefore, naturally the time required for the composition processing is reducible to a minimum, and further, since the encoding is done to facilitate the change of the positional information at the composition in consideration of the case that the location of the reduced and encoded image within the image after the composition is unknown before the combination, it is possible to perform a variety of image composition (the disposition and display of a reduced image before the composition at an arbitrary position on a multi-image combined image after the composition).

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A moving image composing system comprising:
   moving image receiving means for receiving a moving image;
   moving image reducing means for reducing said moving image to produce a reduced moving image;
   moving image encoding means for encoding said reduced moving image to produce an encoded moving image;
   accumulating means for storing and accumulating said encoded moving image;
   moving image composing means for combining at least one encoded moving image accumulated in said accumulating means into a multi-image combined moving image;
   moving image decoding means for decoding said multi-image combined moving image; and
   moving image displaying means for displaying the decoded moving image,
   wherein said moving image encoding means conducts the encoding on the basis of positional information said reduced moving image has to facilitate a change of said positional information in consideration with a case that a variation of said positional information occurs due to a disposition of said reduced moving image at the moving image combination, and
   said moving image composing means changes said positional information to positional information required for its combining processing when a need for the change of the positional information said reduced moving image has takes place.

2. A moving image composing system comprising:
   moving image receiving means for receiving a moving image;
   moving image reducing means for reducing said moving image to produce a thumbnail moving image;
   moving image encoding means for encoding said thumbnail moving image according to an MPEG standard to produce an encoded thumbnail moving image;
   accumulating means for storing and accumulating said encoded thumbnail moving image;
   moving image composing means for combining one or more encoded moving images accumulated in said accumulating means into a multi-image combined moving image;
   moving image decoding means for decoding said multi-image combined moving image; and
   moving image displaying means for displaying the decoded moving image,
   wherein said moving image encoding outputs a supplementary code string for making up for a wanted bit in consideration with a case that the number of bits of an MB_Addr_Inc varies due to a change of a horizontal coordinate of a slice, and
   said moving image composing means rewrites a value of MB_Addr_Inc by supplying the wanted bit from said supplementary code string and produces a multi-image combined moving image code string.

3. A moving image composing system as defined in claim 2, wherein said moving image encoding means and said moving image composing means utilize, as said supplementary code string for making up for the wanted bit, extra_bit_slice and extra_information_slice of a slice header section in an MPEG video sequence.

4. A moving image composing system as defined in claim 3, wherein said moving image encoding means outputs 8 sets of extra_bit_slice and extra_information_slice as said supplementary code string, and said moving image composing means supplies an arbitrary number of wanted bits from said supplementary code string, and produces a macroblock_escape code string.

5. A moving image composing system as defined in claim 2, wherein said moving image composing means includes a layout table for, when a multi-image raster is divided in macroblock size into areas, retaining multi-image layout information on each of said areas, and layout table making means for drawing up said layout table, while said moving image composing means refers to said layout table to determine an encoded thumbnail moving image code string to be outputted as said multi-image combined moving image code string.

6. A moving image composing system comprising:
   moving image receiving means for receiving a moving image;
   moving image reducing means for reducing said moving image to produce a thumbnail moving image;
   moving image encoding means for encoding said thumbnail moving image according to an MPEG standard to produce an encoded thumbnail moving image;
   accumulating means for storing and accumulating said encoded thumbnail moving image;
   moving image composing means for combining one or more encoded moving images accumulated in said accumulating means into a multi-image combined moving image;
   moving image decoding means for decoding said multi-image combined moving image; and
   moving image displaying means for displaying the decoded moving image,
   wherein said moving image encoding means inserts a supplementary code string so that a head and end of each of macroblock code strings come into contact with a byte border, and
   said moving image composing means successively arranges said macroblock code strings in a raster scanning order to produce a desired multi-image combined moving image code string.

7. A moving image composing system as defined in claim 5, wherein said moving image encoding means and said moving image composing means utilize, as said supplementary code string to be used for making said head of said macroblock code string come into contact with said byte border, extra_bit_slice and extra_information_slice of a slice header section in an MPEG video sequence.

8. A moving image composing system as defined in claim 5, wherein said moving image encoding means and said moving image composing means inserts, as said supplementary code string to be used for making said end of said macroblock code string come into contact with said byte border, macroblock_stuffing in an MPEG video sequence into a head portion of said macroblock code string.

9. A moving image composing system comprising:

moving image receiving means for receiving a multi-image combined moving image;

multi-image combined moving image dividing means for extracting a slice code string of each of image area sections from a code string of said multi-image combined moving image;

image layout table making means for drawing up an image layout table which retains a size of each of image areas in a multi-image raster and positional information in a corresponding relation;

moving image re-encoding means for converting said slice code string into a re-encoded slice code string which is allowed to be re-combined within a different multi-image raster;

accumulating means for storing and accumulating encoded thumbnail images;

moving image composing means for re-combining said re-encoded slice code strings to produce a multi-image combined moving image code string providing a different image construction;

moving image listing means for drawing up a list of a combination and order of moving images constituting a multi-image combined moving image;

moving image decoding means for decoding said multi-image combined moving image; and moving image displaying means for displaying the decoded moving image, wherein said multi-image combined moving image dividing means fetches an identification code of an encoded thumbnail moving image, positional information on said encoded thumbnail moving image in a multi-image raster and positional information on said encoded thumbnail moving image in each of said image areas, which are required for re-encoding the extracted slice code string, from said layout table, and said moving image re-encoding means converts said slice code string into said code string to be re-combined within said different multi-image raster on the basis of the fetched results to produce said multi-image combined moving image different in image construction from the first-mentioned multi-image combined moving image.

10. A moving image composing system as defined in claim 9, wherein said moving image listing means selectively draws up a list of moving images from said encoded thumbnail moving images accumulated in said accumulating means and moving images composed of the re-encoded slice code strings, and said moving image composing means obtains a code string from said encoded thumbnail moving image code strings accumulated in said accumulating means and the re-encoded slice code strings on the basis of said moving image list drawn up by said moving image listing means.

11. A moving image composing system comprising:

image encoding means for encoding an inputted image on the basis of an image encoding format and for outputting an encoded image; and image composing means for receiving said one or more encoded images to produce a multi-image combined image stream, wherein said image encoding means outputs an extended code string, defined as a code string which does not affect an image in said image encoding format, into said encoded image in advance in consideration with a case that a change of an information value defined as a variable-length code in said image encoding format takes place, and said image composing means changes said information value of said encoded image to a different value through the use of said extended code string for producing said multi-image combined image stream.

12. A moving image composing system as defined in claim 11, wherein said image composing means rewrites said information value of each of said encoded image inputted to output said multi-image combined image stream in which a code string of each of said encoded images is a correct information value as said image encoding format and a code string sequence of each of said encoded images is a correct sequence as said image encoding format.

13. A moving image composing system as defined in claim 11, wherein, when receiving only one encoded image, said image composing means does not produce a multi-image combined image but changes said information value defined as a variable-length code in said encoded image and outputs an encoded image after the change of said information value.

14. A moving image composing system as defined in claim 11, wherein, in changing said information value defined as a variable-length code, said image composing means, when a basic operation unit length of said image composing means is taken to be N bits, takes out a bit code string corresponding an arbitrary multiple of N from said extended code string to adjust a bit string corresponding to a variation of the information code length occurring due to the change of said information value.

15. A moving image composing system as defined in claim 14, wherein said operation unit length is one of 4 bits, 8 bits forming 1 byte, 16 bits, 32 bits and 64 bits which are operation unit lengths of a central processing unit of a general-purpose computer, respectively.

16. A moving image composing system as defined in claim 11, further comprising delay means for outputting inputted data after said inputted data temporarily or long undergoes processing including an inputted data accumulation and an inputted data retention, wherein said image composing means receives said encoded image produced through said delay means.

17. A moving image composing system as defined in claim 16, wherein a process in which said delay means is not placed exists in a process on one of an input side of said image encoding means, a process between said image encoding means and said image composing means and both the processes, and said image composing means receives one or more encoded images produced without a single passage through said delay means.

18. A moving image composing system as defined in claim 11, further comprising a layout table for, when a reproduced image of a multi-image combined image to be outputted is divided into one or more areas, retaining, as multi-image layout information, a construction of said areas, with said layout table retaining, as said multi-image layout information, at least positional information on disposition of each of said areas in a multi-image combined image and size information of each of said areas, and with said image composing means changing an information value defined as a variable-length code and an information value defined as a fixed-length code to values retained in said layout table in producing said multi-image combined image stream.

19. A moving image composing system as defined in claim 18, wherein said encoded images are distinguishable by single identifiers, and said encoded images having arbitrary identifiers are obtainable through the use of said identifiers, and said layout table further retains said identifiers of said encoded images to be displayed in said areas as area image information in said multi-layout information, and said image composing means refers to said area image information to select said encoded image to be displayed in said area from the inputted images or to receive it as one of the inputted encoded images to change said information value of said encoded image.

20. A moving image composing system as defined in claim 18, further comprising layout table changing means for changing a value of said multi-image layout information in said layout table, with said layout table changing means changing said value of said multi-image layout information at an arbitrary timing, and with said image composing means refers to said multi-image layout information value changed to dynamically change a multi-image layout of said multi-image combined image to be outputted.

21. A moving image composing system as defined in claim 11, wherein said image encoding format is for a static image, and said encoded image is a static image.

22. A moving image composing system as defined in claim 11, wherein said image encoding format relates to moving images, and said encoded image is a moving image.

23. A moving image composing system as defined in claim 11, wherein, in said image composing means, said encoded image to be inputted and said multi-image combined image stream to be outputted are obtained by the encoding using image encoding formats different from each other.

24. A moving image composing system comprising an image composing means for receiving at least one encoded image, produced by encoding processing based upon an image encoding format to produce a multi-image combined image stream, wherein, when there is a need to change information value defined as a variable-length code in said image encoding format, said image composing means utilizes an extended code string defined as a code string which does not affect an image in said image encoding format to output said extended code string into said multi-image combined image for changing said information value in said encoded image to a different value.

25. A moving image composing system as defined in claim 24, wherein said image composing means rewrites said information value of each of said encoded image inputted to output said multi-image combined image stream in which a code string of each of said encoded images is a correct information value as said image encoding format and a code string sequence of each of said encoded images is a correct sequence as said image encoding format.

26. A moving image composing system as defined in claim 24, wherein, when receiving only one encoded image, said image composing means does not produce a multi-image combined image, but changes said information value defined as a variable-length code in said encoded image and outputs an encoded image after the change of said information value.

27. A moving image composing system as defined in claim 24, wherein, in changing said information value defined as a variable-length code, said image composing means, when a basic operation unit length of said image composing means is taken to be N bits, inserts a bit code string corresponding an arbitrary multiple of N into said extended code string to adjust a bit string corresponding to a variation of the information code length occurring due to the change of said information value.

28. A moving image composing system as defined in claim 24, wherein said operation unit length is one of 4 bits, 8 bits forming 1 byte, 16 bits, 32 bits and 64 bits which are operation unit lengths of a central processing unit of a general-purpose computer, respectively.

29. A moving image composing system as defined in claim 24, further comprising delay means for outputting inputted data after said inputted data temporarily or long undergoes processing including an inputted data accumulation and an inputted data retention, wherein said image composing means receives said encoded image produced through said delay means.

30. A moving image composing system as defined in claim 29, wherein a process in which said delay means is not placed exists in a process on one of an input side of said image encoding means, a process between said image encoding means and said image composing means and both the processes, and said image composing means receives at least one encoded image produced without a single passage through said delay means.

31. A moving image composing system as defined in claim 24, further comprising a layout table for, when a reproduced image of a multi-image combined image to be outputted is divided into one or more areas, retaining, as multi-image layout information, a construction of said areas, with said layout table retaining, as said multi-image layout information, at least positional information on disposition of each of said areas in a multi-image combined image and size information of each of said areas, and with said image composing means changing an information value defined as a variable-length code and an information value defined as a fixed-length code to values retained in said layout table in producing said multi-image combined image stream.

32. A moving image composing system as defined in claim 31, wherein said encoded images are distinguishable by single identifiers, and said encoded images having arbitrary identifiers are obtainable through the use of said identifiers, and said layout table further retains said identifiers of said encoded images to be displayed in said areas as area image information in said multi-layout information, and said image composing means refers to said area image information to select said encoded image to be displayed in said area from the inputted images or to receive it as one of the inputted encoded images to change said information value of said encoded image.

33. A moving image composing system as defined in claim 31, further comprising layout table changing means for changing a value of said multi-image layout information in said layout table, with said layout table changing means changing said value of said multi-image layout information at an arbitrary timing, and with said image composing means refers to said multi-image layout information value changed to dynamically change a multi-image layout of said multi-image combined image to be outputted.

34. A moving image composing system as defined in claim 24, wherein said image encoding format is for a static image, and said encoded image is a static image.

35. A moving image composing system as defined in claim 24, wherein said image encoding format relates to moving images, and said encoded image is a moving image.

36. A moving image composing system comprising:
first and second image encoding means each for encoding an inputted image on the basis of an image encoding format to output an encoded image; and
image composing means for receiving at least one encoded image outputted from said first image encoding means and at least one encoded image outputted from said second image encoding means to produce a multi-image combined image,
wherein said first image encoding means outputs an extended code string, defined as a code string which does not affect an image in said image encoding format, into said encoded image in advance in consideration with a case that a change of an information value defined as a variable-length code in said image encoding format takes place, and said second image encoding means does not output said extended code string into said encoded image, and said image composing means changes said information value to a different value through the use of said extended coded string for said encoded image outputted from said first image encoding means, and further, changes said information value to a different value by outputting said extended code string into said multi-image combined image for said encoded image outputted from said second image encoding means.

* * * * *